US008814616B2

(12) United States Patent
Riggs

(10) Patent No.: US 8,814,616 B2
(45) Date of Patent: *Aug. 26, 2014

(54) AUTONOMOUS VEHICLE WITH FUEL CELL AND AUTONOMOUS FLUSHING SYSTEM

(75) Inventor: Allan Riggs, Cocoa, FL (US)

(73) Assignee: Argopower, LLC, Cocoa, FL (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/406,370

(22) Filed: Feb. 27, 2012

(65) Prior Publication Data

US 2012/0214363 A1 Aug. 23, 2012

Related U.S. Application Data

(63) Continuation-in-part of application No. 12/500,586, filed on Jul. 9, 2009, now Pat. No. 8,123,577.

(51) Int. Cl.
*B63H 21/17* (2006.01)

(52) U.S. Cl.
USPC .............................................. 440/6

(58) Field of Classification Search
USPC .................................... 440/6, 88 M
See application file for complete search history.

(56) References Cited

U.S. PATENT DOCUMENTS

| 4,885,217 A | 12/1989 | Hoge |
| 4,906,535 A | 3/1990 | Hoge |
| 4,950,561 A | 8/1990 | Niksa et al. |
| 4,950,562 A | 8/1990 | Yoshida et al. |
| 5,032,473 A | 7/1991 | Hoge |
| 5,053,375 A | 10/1991 | Rao |
| 5,292,598 A | 3/1994 | Rosner |
| 6,009,823 A | 1/2000 | Gross |
| 6,250,235 B1 | 6/2001 | Oehr et al. |
| 6,706,432 B2 | 3/2004 | Oehr et al. |
| 6,854,406 B2 | 2/2005 | Cardoza et al. |
| 7,789,723 B2 | 9/2010 | Dane et al. |
| 7,938,077 B1 | 5/2011 | Dunn et al. |
| 8,123,577 B2 * | 2/2012 | Riggs ................... 440/6 |
| 2003/0054208 A1 | 3/2003 | Oehr et al. |
| 2005/0016430 A1 | 1/2005 | Cardoza et al. |

* cited by examiner

*Primary Examiner* — Stephen Avila
(74) *Attorney, Agent, or Firm* — Miles & Stockbridge P.C.; David R. Schaffer

(57) ABSTRACT

An autonomous aquatic vehicle with one or more fuel cells, a controller, a plurality of sensors, a battery, and at least one electric motor and propeller. The one or more fuel cells provide power to the battery, and the battery provides power for the vehicle. Seawater is provided to anodes of the fuel cell and air or oxygen is provided to the cathode to produce power for supply to the battery. The seawater-anode reaction creates waste or byproduct that tends to decrease output of the fuel cell. The waste or byproduct is automatically flushed from the fuel cell using seawater.

31 Claims, 60 Drawing Sheets

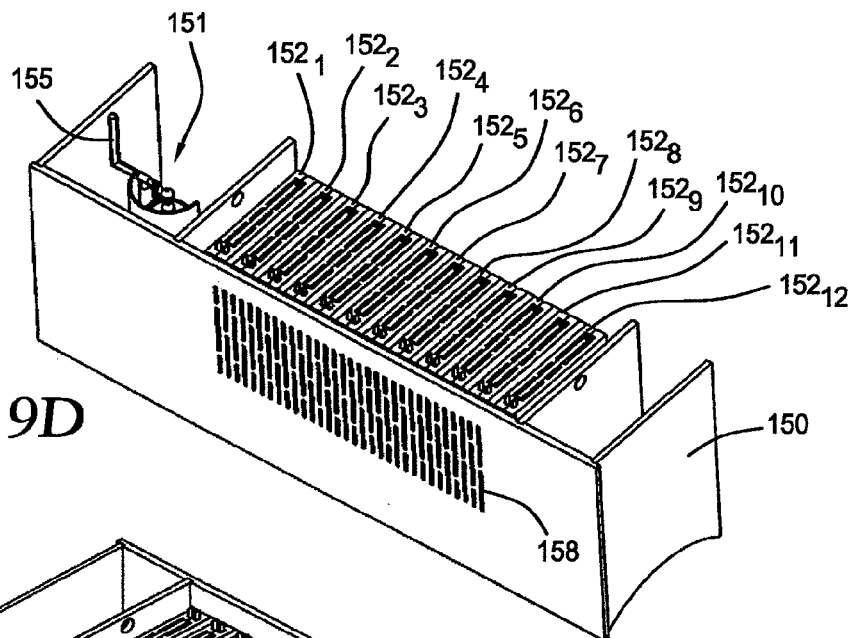
FIG. 19D
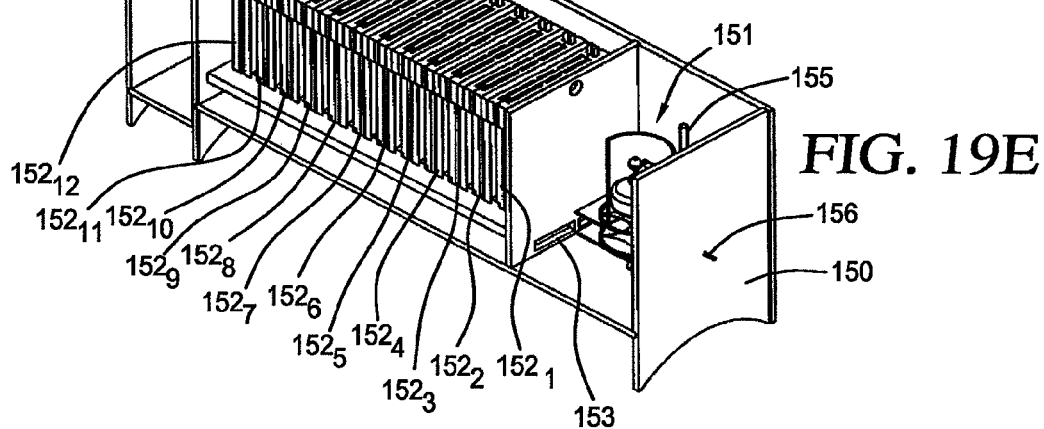
FIG. 19E
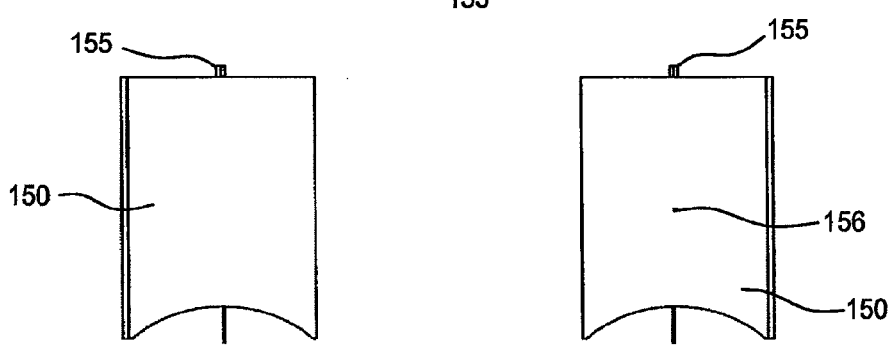
FIG. 19F     FIG. 19G

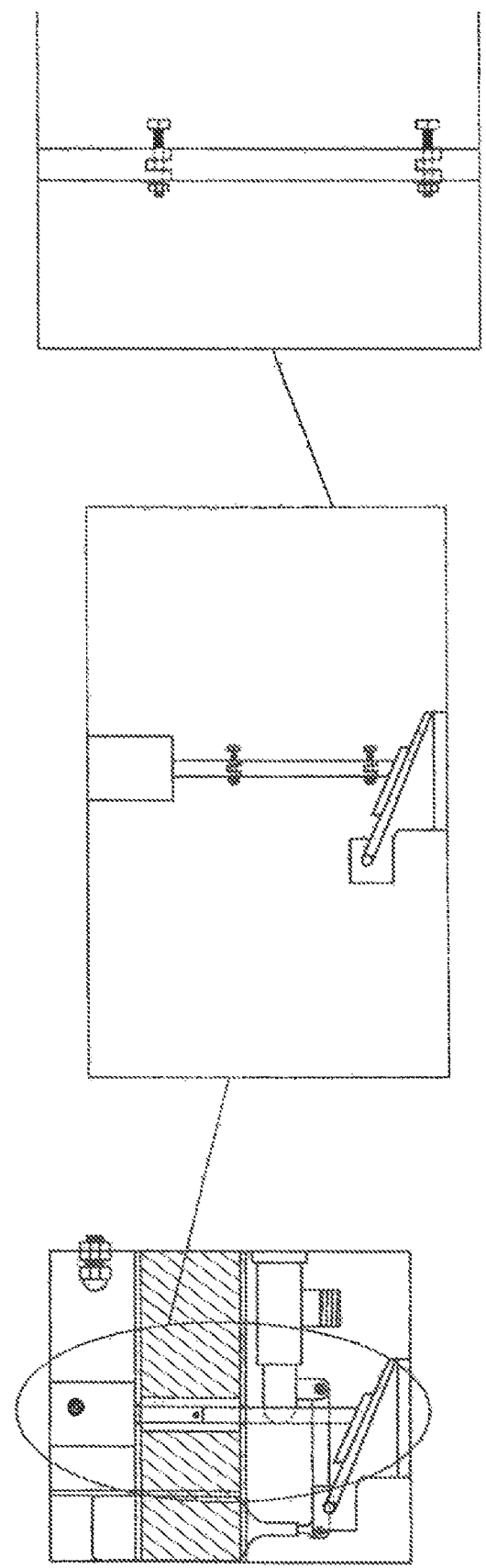

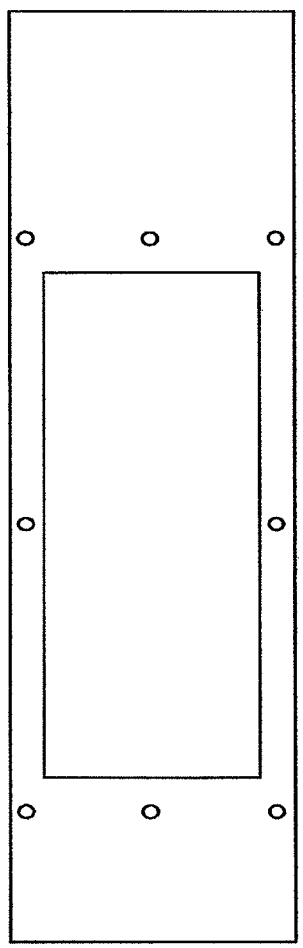
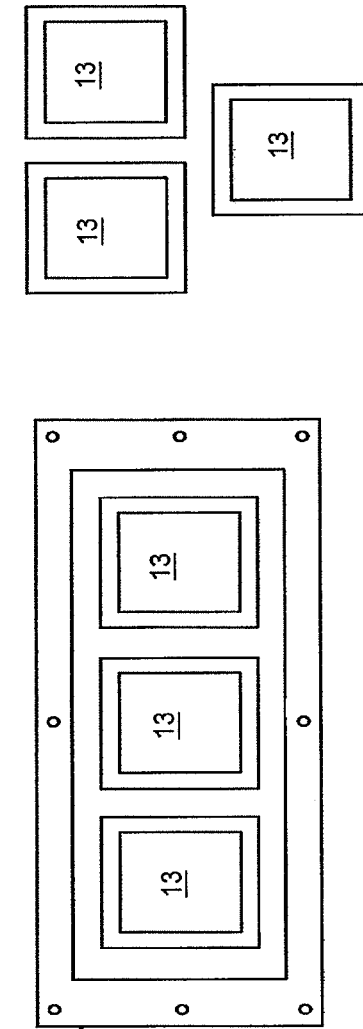
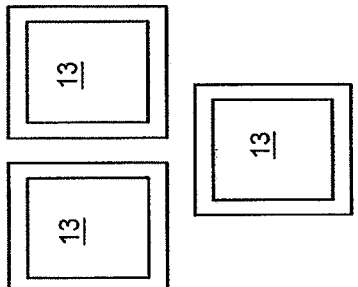
FIG. 34A
FIG. 34B
FIG. 34C

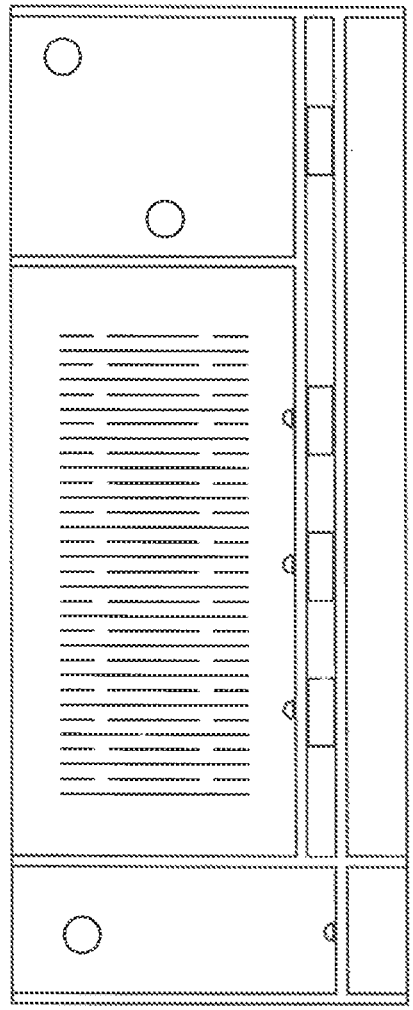
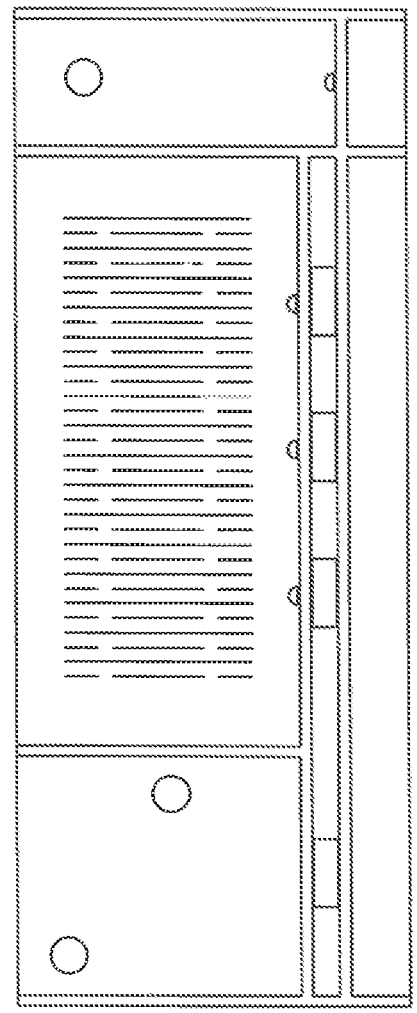
FIG. 37A
FIG. 37B

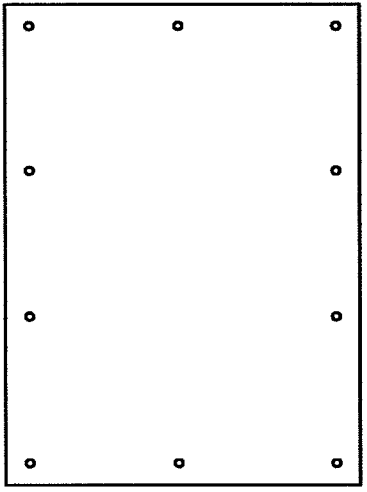
FIG. 39E
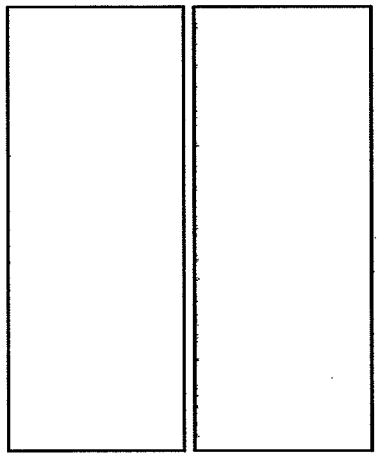
FIG. 39C
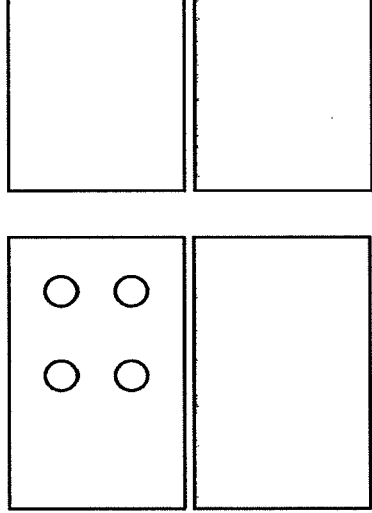
FIG. 39A
FIG. 39D
FIG. 39B
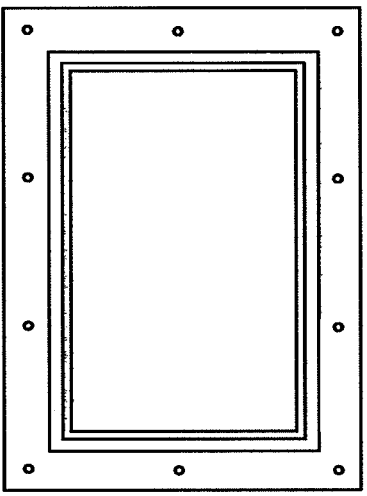
FIG. 39G
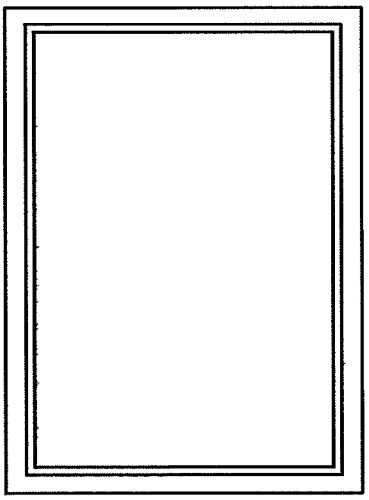
FIG. 39F

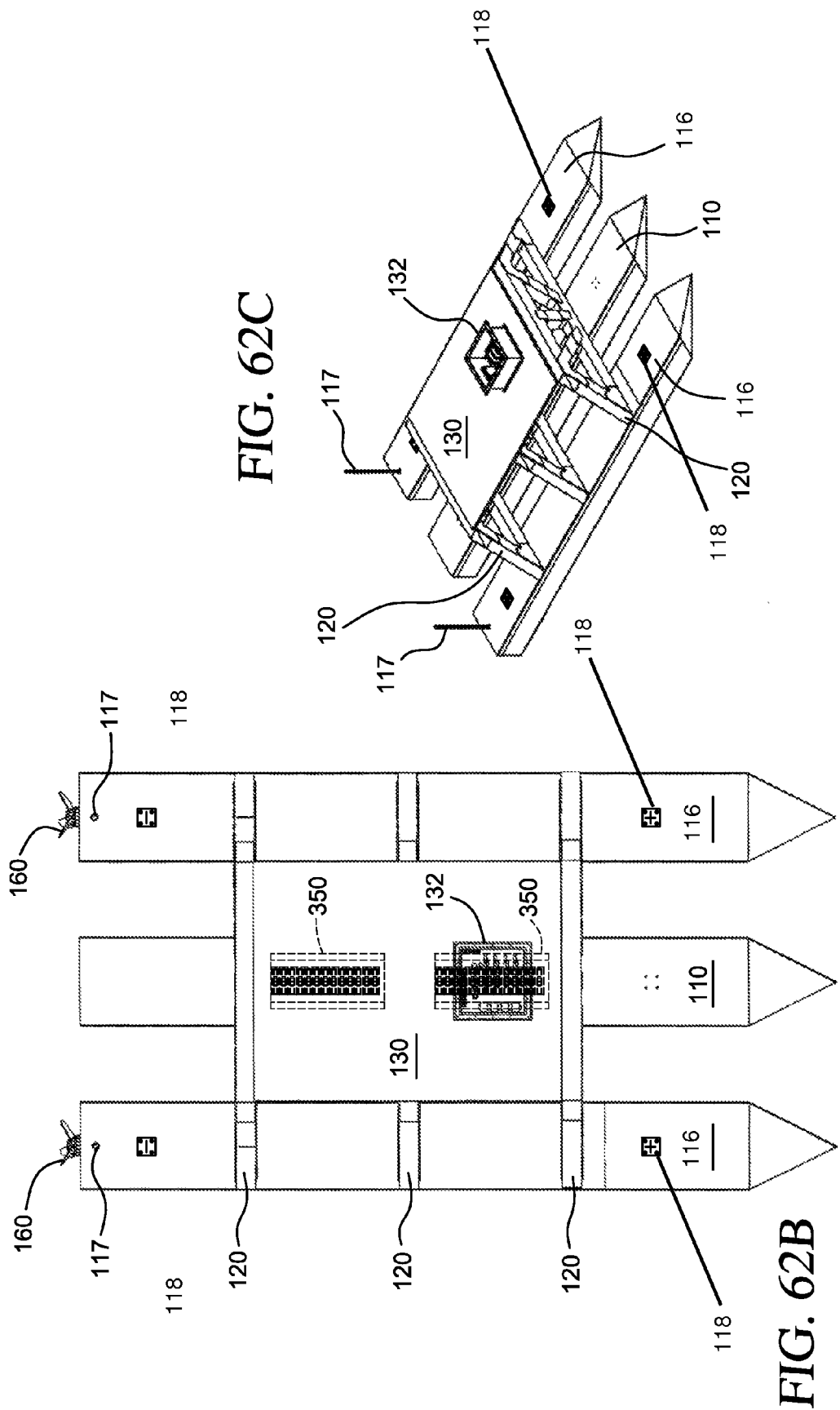

AUTONOMOUS VEHICLE WITH FUEL CELL AND AUTONOMOUS FLUSHING SYSTEM

CROSS REFERENCE TO RELATED APPLICATIONS

This application is a continuation-in-part of U.S. patent application Ser. No. 12/500,586 filed Jul. 9, 2009 now U.S Pat No. 8,123,577 issued on Feb. 28, 2012. This application also claims priority to U.S. Provisional Patent Application No. 61/079,432 filed Jul. 9, 2008. The entire content of each of the foregoing applications is hereby incorporated by reference into the present application.

FIELD OF THE INVENTION

This invention relates generally to autonomous vehicles, and more particularly, to an autonomous aquatic vehicle that uses a fuel cell with an autonomous flushing system.

BRIEF SUMMARY

In one aspect of the present invention, a buoyant autonomous aquatic vehicle comprises a base portion; a controller to control autonomous operations of the aquatic vehicle, wherein the controller is arranged on the base portion; one or more sensors; a power source to supply power for the aquatic vehicle; a plurality of fuel cell devices to supply power to the power source for recharging, wherein each fuel cell device includes a plurality of anode/cathode pairs; a first partially submersible hull portion, wherein the power source is housed by the first hull portion; a second partially submersible hull portion, wherein one of the fuel cell devices is housed by the second hull portion, and the second hull portion has a first plurality of apertures arranged on a bottom side thereof to allow entry of seawater to react with anodes of the one fuel cell device; and first, second, and third electric motors respectively coupled to the first, second, and third hull portions to propel the aquatic vehicle. The second hull portion is configured to allow air from outside the second hull portion to access and interact with the cathodes of the one fuel cell device, and the second hull portion is configured substantially to prevent seawater passed through the first plurality of apertures from contacting the cathodes of the one fuel cell. The third hull portion is configured to allow air from outside the third hull portion to access and interact with the cathodes of the another fuel cell device, and the third hull portion is configured substantially to prevent seawater passed through the second plurality of apertures from contacting the cathodes of the another fuel cell. The first and second plurality of apertures are configured to allow byproduct produced by reactions between the seawater and corresponding anodes to exit therethrough to outside the second hull portion and the third hull portion, respectively.

The vehicle may also be controlled based on an off-vehicle controller or based on a signal received from outside the vehicle. The second electric motor of the vehicle may be canted from the longitudinal axis of said second hull portion. Similarly, the third electric motor may be canted from the longitudinal axis of said third hull portion. For example, the second electric motor may be canted at five degrees inward, toward the first hull portion, and the third electric motor may be canted at five degrees inward, toward the first hull portion.

At least one aperture of the first plurality of apertures may be configured to facilitate intake of seawater, and at least one aperture of the first plurality of apertures may be configured to facilitate removal of the byproduct from the second hull portion therethrough. Similarly, at least one aperture of the second plurality of apertures may be configured to facilitate intake of seawater, and at least one aperture of the second plurality of apertures may be configured to facilitate removal of the byproduct from the third hull portion therethrough. The at least one aperture of the first plurality of apertures configured to facilitate intake of seawater may be a scoop, and the at least one aperture of the second plurality of apertures configured to facilitate intake of seawater may be a scoop. A filter extends over the opening of each of the apertures of the first and second plurality of apertures to prevent unwanted foreign objects from entering the second and third hull portions, respectively, and to allow the byproduct to exit the second and third hull portions, respectively.

The one fuel cell device may include a first support tray having a plurality of apertures formed by ribs to allow passage therethrough of the seawater having entered through the first plurality of apertures of the second hull portion, wherein the first support tray is sealingly coupled to the second hull portion to create a water-tight seal therewith and to create a first void therebetween. Similarly, the another fuel cell device may include a second support tray having a plurality of apertures formed by ribs to allow passage therethrough of the seawater having entered through the second plurality of apertures of the third hull portion, wherein the second support tray is sealingly coupled to the third hull portion to create a water-tight seal therewith and to create a second void therebetween. Each individual fuel cell of the fuel cell devices can be sealed to hold the seawater, but open at a top thereof to permit air to contact the cathode.

The second partially submersible hull portion may house a third one of the fuel cell devices, and the third partially submersible hull portion may house a fourth one of the fuel cell devices. Additionally, each fuel cell device may be configured to supply power for the aquatic vehicle.

The byproduct or waste of the aforementioned vehicle (i.e., of the anodes) may be substantially environmentally neutral and/or non-toxic to marine flora and fauna. For example, the byproduct or waste may be a slurry comprised of Magnesium. The plurality of fuel cell devices may be configured to facilitate extended-use anodes, wherein extended-use anodes initially are substantially longer than corresponding cathodes. Furthermore, the extended-use anodes may be physically biased by a biasing means for biasing the anodes. Each anode may be fixedly attached to a support structure of the corresponding fuel cell device. Alternatively, each anode may rest on a support structure of the corresponding fuel cell device.

In another aspect of the invention, a method for operating a buoyant aquatic vehicle having a base, a controller to control operations of the vehicle, at least one sensor, a battery, first and second fuel cell apparatuses coupled to the battery, a first motor, and a second motor, a first hull that houses the first fuel cell apparatus, and a second hull that houses the second fuel cell apparatus. The method can comprise providing seawater to anodes of the first fuel cell apparatus through a first plurality of openings in the first hull; providing air to cathodes of the first fuel cell apparatus through a first air-permeable and water-proof opening of the first hull; allowing discharge of a byproduct of the anodes of the first fuel cell through at least one of the openings of the first plurality of openings; providing seawater to anodes of the second fuel cell apparatus through a second plurality of openings in the second hull; providing air to cathodes of the second fuel cell apparatus through a second air-permeable and water-proof opening of the second hull; allowing discharge of a byproduct of the anodes of the second fuel cell through at least one of the openings of the second plurality of openings; and supplying to the battery, an output of at least one of the first fuel cell apparatus and the second fuel cell apparatus.

The method can further comprise autonomously controlling the vehicle, and the supplying to the battery may further comprise one of charging or recharging the battery, and/or maintaining an output level of the battery.

According to the method discussed above, the first fuel cell apparatus may include a first support tray to support a plurality of housing apparatuses housing respective anode/cathode pairs of the first fuel cell apparatus, wherein the first support tray may include a plurality of openings associated with each anode/cathode pair, each opening may be formed by rib portions. Furthermore, the providing seawater to anodes of the first fuel cell apparatus may further comprise providing the seawater through the plurality of openings of the first support tray. According to the method discussed above, the second fuel cell apparatus may include a second support tray to support a plurality of housing apparatuses housing respective anode/cathode pairs of the second fuel cell apparatus, wherein the second support tray may include a plurality of openings associated with each anode/cathode pair, each opening may be formed by rib portions. The providing seawater to anodes of the second fuel cell apparatus can further comprise providing the seawater through the plurality of openings of the second support tray.

In yet another aspect of the invention, a floating aquatic vessel can comprise means for floating the vessel; means for moving the vessel; means for controlling the vessel; means for sensing a characteristic of the environment in which the vessel is situated; means for supplying power to the vessel; means for supplying fuel to said power supplying means; means for providing salt water to said fueling means; means for providing oxygen to said fueling means; and means for removing a waste product created by said fueling means.

The floating aquatic vessel may further comprise means for sensing a characteristic of the vessel and/or means for supporting one or more anodes of the means for fueling. The means for providing salt water to the fueling means may include a scoop. Optionally, the means for providing salt water to the fueling means may include means for regulating unwanted objects with respect to the means for supplying fuel and for regulating exit of the waste product. The waste may be non-toxic to marine flora and fauna. The waste may be a slurry comprised of Magnesium.

Another aspect of the invention includes a buoyant autonomous aquatic vehicle having a base portion; a controller to control autonomous operations of the aquatic vehicle, the controller being arranged on the base portion; one or more sensors; a power source to supply power for the aquatic vehicle; a fuel cell device to supply power to the power source for recharging the power source, the fuel cell device including a plurality of anode/cathode pairs; a first partially submersible hull; a second partially submersible hull, the fuel cell device being housed by the second hull, and the second hull having a plurality of apertures arranged on a bottom side thereof to allow entry of seawater to react with anodes of the fuel cell device; a third partially submersible hull; and first and second electric motors respectively coupled to the first and third hulls to propel the aquatic vehicle. The second hull is configured to allow air from outside the second hull to access and interact with the cathodes of the fuel cell device, and the second hull is configured substantially to prevent seawater passed through the plurality of apertures from contacting the cathodes of the fuel cell device, and the plurality of apertures are configured to allow byproduct produced by reactions between the seawater and corresponding anodes to exit therethrough to outside the second hull.

Regarding the buoyant autonomous aquatic vehicle as set forth in the paragraph above, the byproduct is substantially environmentally neutral. Further, the fuel cell device may be configured to facilitate extended-use anodes, the extended-use anodes initially being substantially longer than corresponding cathodes, and the extended-use anodes may be physically biased by a biasing means for biasing the anodes. Optionally, each anode is fixedly attached to a support structure of the corresponding fuel cell device. Optionally, each anode rests on a support structure of the corresponding fuel cell device.

The first electric motor can be canted from the longitudinal axis of the second hull, and the second electric motor can be canted from the longitudinal axis of the third hull. For example, the first electric motor is canted at five degrees inward, toward the second hull, and said second electric motor is canted at five degrees inward, toward the third hull.

The autonomous aquatic vehicle can be configured to be controlled based on an off-vehicle controller and/or the autonomous aquatic vehicle can be configured to be controlled based on a signal received from outside the vehicle.

The fuel cell device may be configured to supply power for components of the aquatic vehicle other than the power source.

Optionally, the fuel cell device includes a first fuel cell device portion and a second fuel cell device portion physically separated from the first fuel cell device portion, wherein the first fuel cell device portion has a first support tray having a plurality of apertures formed by ribs to allow passage therethrough of the seawater having entered through a first set of the plurality of apertures of the second hull, the first support tray being sealingly coupled to the second hull to create a water-tight seal therewith and to create a first void therebetween, and wherein the second fuel cell device portion includes a second support tray having a plurality of apertures formed by ribs to allow passage therethrough of the seawater having entered through a second set of said plurality of apertures of the second hull, the second support tray being sealingly coupled to the second hull to create a water-tight seal therewith and to create a second void therebetween.

The second hull can be removably attached to the base portion such that the second hull can be removed from the base portion and replaced with another second hull. Further, at least one aperture of the plurality of apertures can be configured to facilitate intake of seawater, and at least one aperture of the plurality of apertures can be configured to facilitate removal of the byproduct from the second hull therethrough. Optionally, the at least one aperture of the plurality of apertures configured to facilitate intake of seawater is configured as a scoop.

Optionally, a filter extends over the opening of each of the apertures of the plurality of apertures to prevent unwanted foreign objects from entering the second hull and to allow the byproduct to exit the second hull. Furthermore, optionally, each individual fuel cell of the fuel cell device may be sealed to hold the seawater, but open at a top portion thereof to permit air to contact the cathode.

Embodiments of the present invention also include a method for operating a buoyant aquatic vehicle having a base, a controller to control operations of the vehicle, at least one sensor, a battery, at least one fuel cell apparatuses coupled to the battery, a first motor, and a second motor, a first hull that houses the at least one fuel cell apparatus, wherein the method includes providing seawater to anodes of the at least one fuel cell apparatus through a plurality of openings in the first hull; providing air to cathodes of the at least one fuel cell apparatus through a first air-permeable and water-proof opening of the first hull; allowing discharge of a byproduct of the anodes of the at least one fuel cell apparatus through at least one of the openings of the plurality of openings; and supplying to the battery, an output of the at least one fuel cell apparatus.

Optionally, for the foregoing method, the at least one fuel cell apparatus can include a first support tray to support a plurality of housing apparatuses housing respective anode/cathode pairs of the at least one fuel cell apparatus, the first support tray including a plurality of openings associated with each anode/cathode pair, each opening being formed by rib portions, and the providing seawater to anodes of the at least one fuel cell apparatus further comprises providing the seawater through the plurality of openings of the first support tray.

The method can further comprise autonomously controlling the vehicle. Further, the supplying to the battery can further comprise one of charging or recharging the battery. Optionally, the supplying to the battery further can comprise maintaining an output level of the battery.

Aspects of the present invention also include a floating aquatic vessel comprising: means for floating the vessel, the means for floating including a first float, a second float, and a third float; means for moving the vessel, the means for moving including a first motor operatively coupled to a first propulsion apparatus and a second motor operatively coupled to a second propulsion apparatus, the first motor and propulsion apparatus being operatively coupled to the first float, and the second motor and propulsion apparatus being operatively coupled to the third float; means for controlling the vessel; means for sensing a characteristic of the environment in which the vessel is situated; means for supplying power to the vessel; means for supplying fuel to the power supplying means, the means for supplying fuel being provided in the second float; means for providing salt water to the fuel supplying means; means for providing oxygen to the fuel supplying means; and means for removing a waste product created by the fuel supplying means.

The vessel can further comprise means for sensing a characteristic of the vessel and/or means for supporting one or more anodes of the fuel supplying means.

Optionally, the waste is a slurry comprised of Magnesium and/or is non-toxic to marine flora and fauna. Further, in embodiments, the means for providing salt water to the fuel supplying means can include a scoop. The means for providing salt water to the fuel supplying means can include means for regulating unwanted objects with respect to the fuel supplying means and for regulating exit of the waste product thereof.

In embodiments, the second float can be removably attached to the vessel such that the second float can be removed within a first predetermined time period. Optionally, the second float can be removed and replaced with another second float within a second predetermined time period greater than the first predetermined time period.

BRIEF DESCRIPTION OF DRAWINGS

Non-limiting and non-exhaustive embodiments of the present invention are described with reference to the following figures, wherein like reference numerals refer to like parts throughout the various views unless otherwise precisely specified.

FIGS. 19A-G are various views of the power unit with flush mechanism of FIG. 9, in accordance with an embodiment of the present invention.

FIGS. 30A-C are a side view of the float box using the solenoid and timer of FIG. 28, and expanded views of coupling elements, respectively, in accordance with an embodiment of the invention.

FIGS. 34A-C show top elements of the power unit, in accordance with an embodiment of the invention.

FIGS. 37A-B show long side elements of the power unit, in accordance with an embodiment of the invention.

FIGS. 39A-G various elements of a control box for attaching to the deck plate of FIG. 38, in accordance with an embodiment of the invention.

FIGS. 62B and 62C are overhead and front, overhead perspective views, respectively, of the aquatic surface vehicle of FIG. 62A.

DETAILED DESCRIPTION OF ILLUSTRATED EMBODIMENTS

Figure 1:
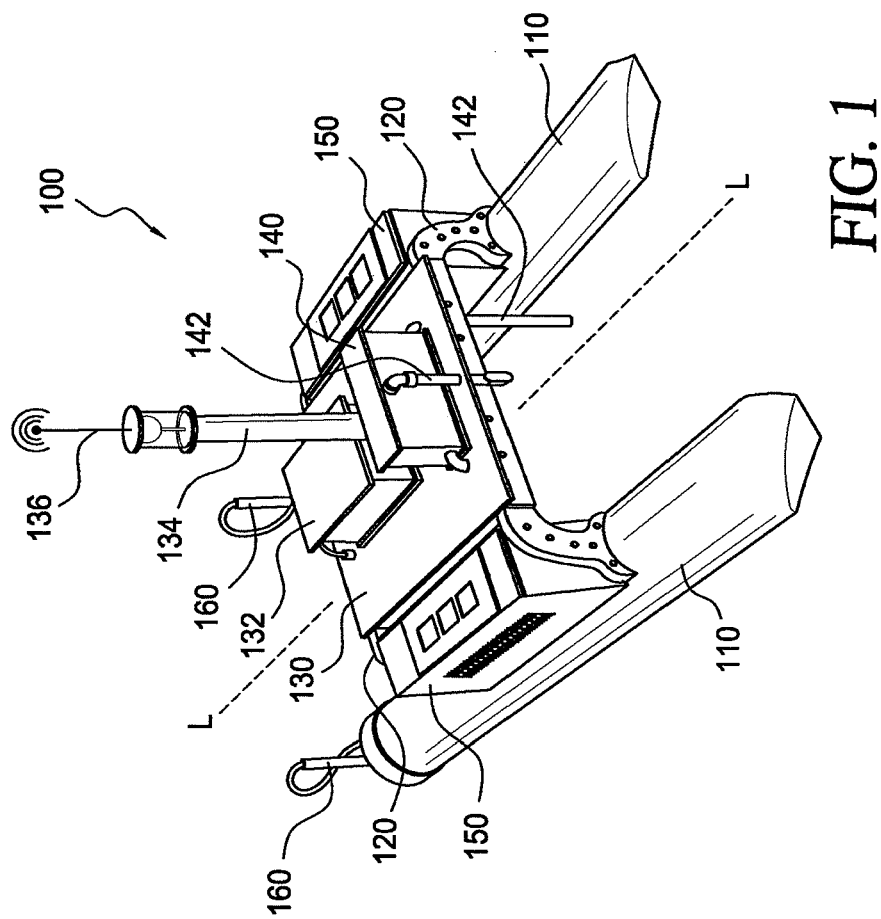
FIG. 1 is a top, front perspective view of an autonomous aquatic surface vehicle with dual cylindrical hulls, in accordance with an embodiment of the present invention.
Figure 2:
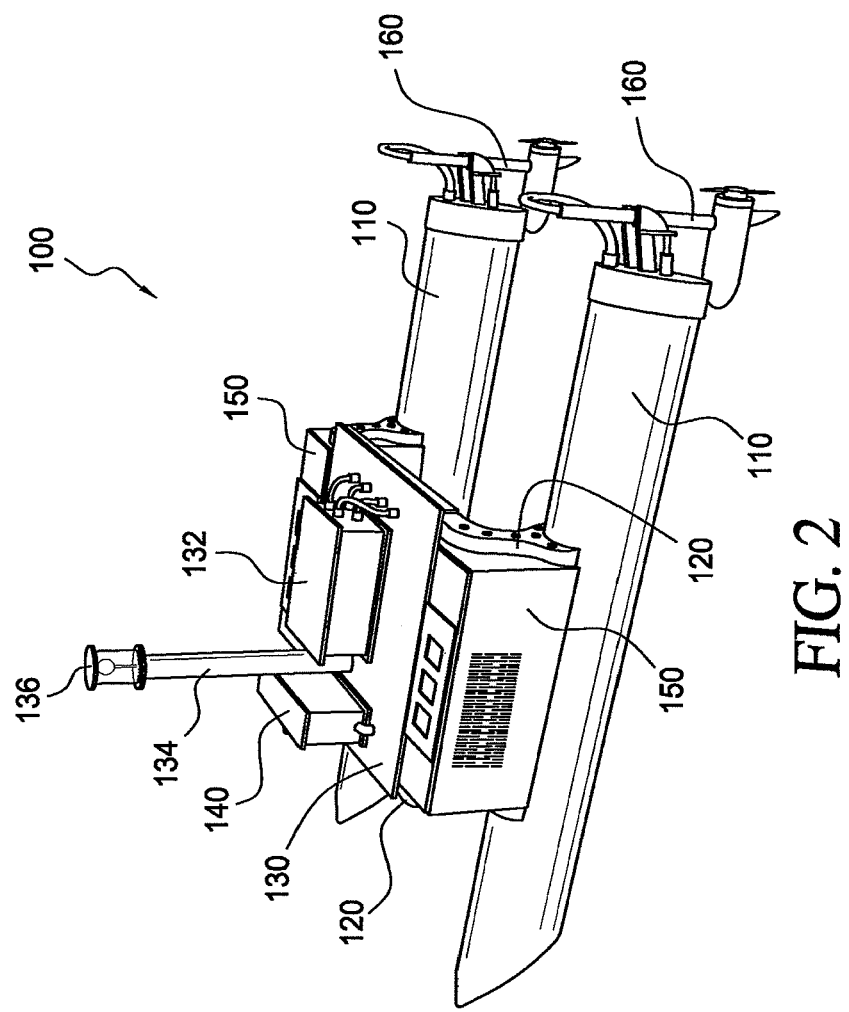
FIG. 2 is a left side perspective view of the autonomous aquatic surface vehicle of FIG. 1, in accordance with an embodiment of the present invention.
Figure 3:
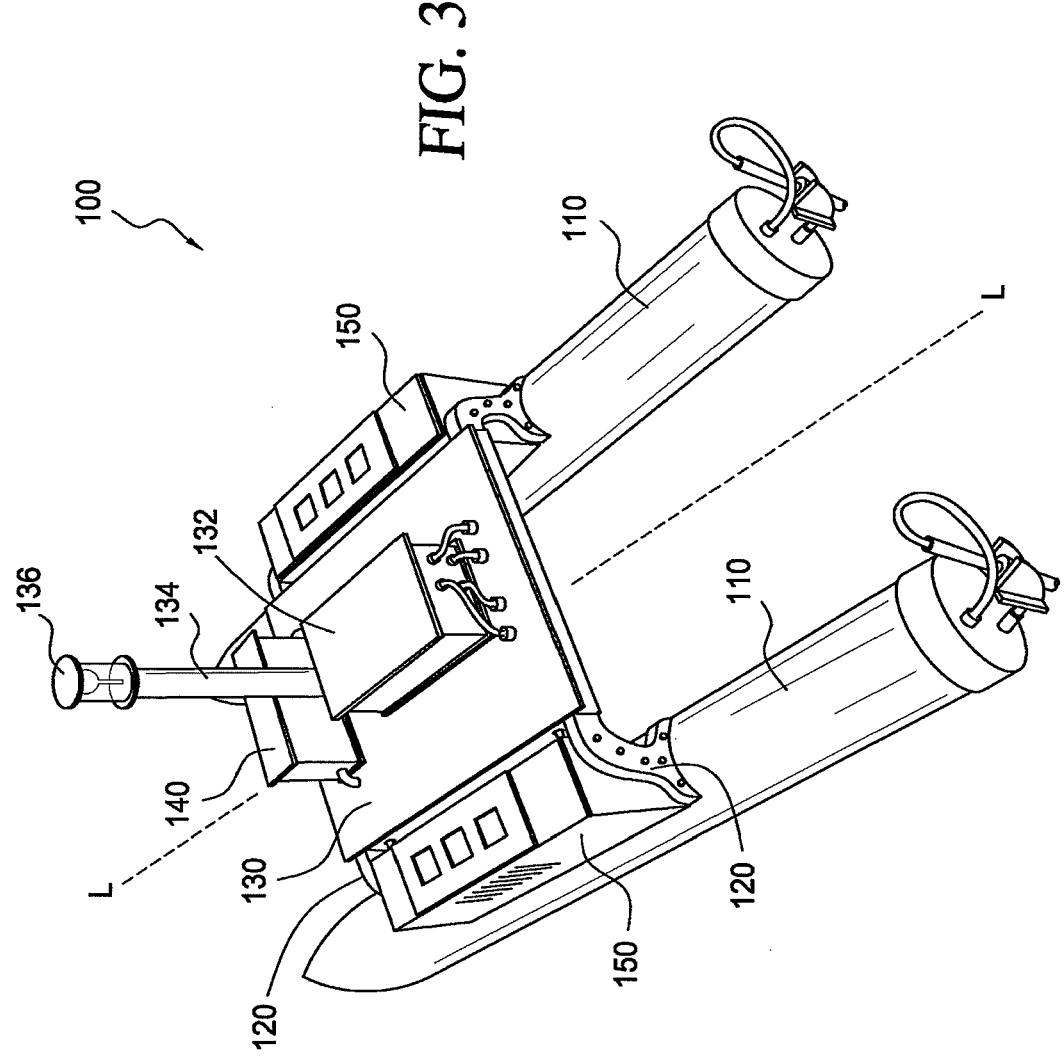
FIG. 3 is a top, rear perspective view of the autonomous aquatic surface vehicle of FIG. 1, in accordance with an embodiment of the present invention.
Figure 4:
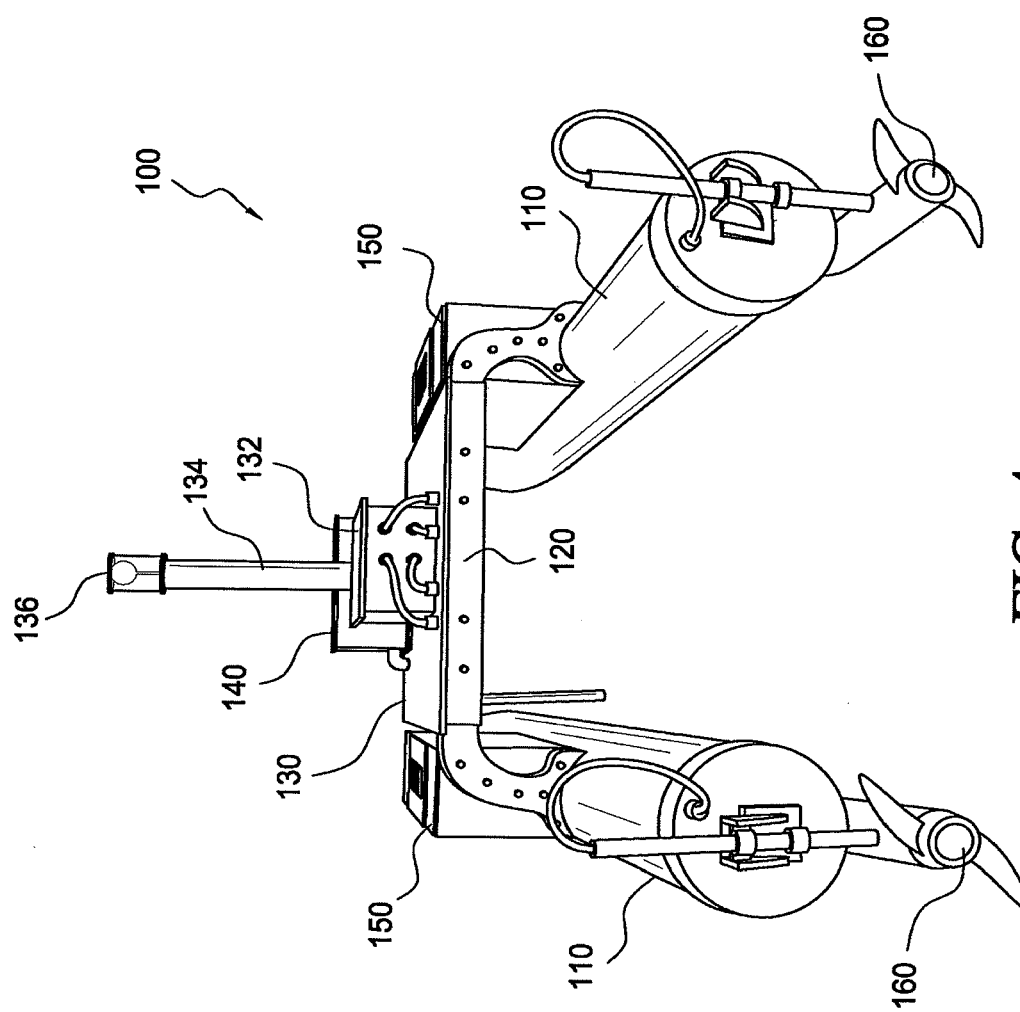
FIG. 4 is a rear perspective view of the autonomous aquatic surface vehicle of FIG. 1, in accordance with an embodiment of the present invention.
Figure 5:
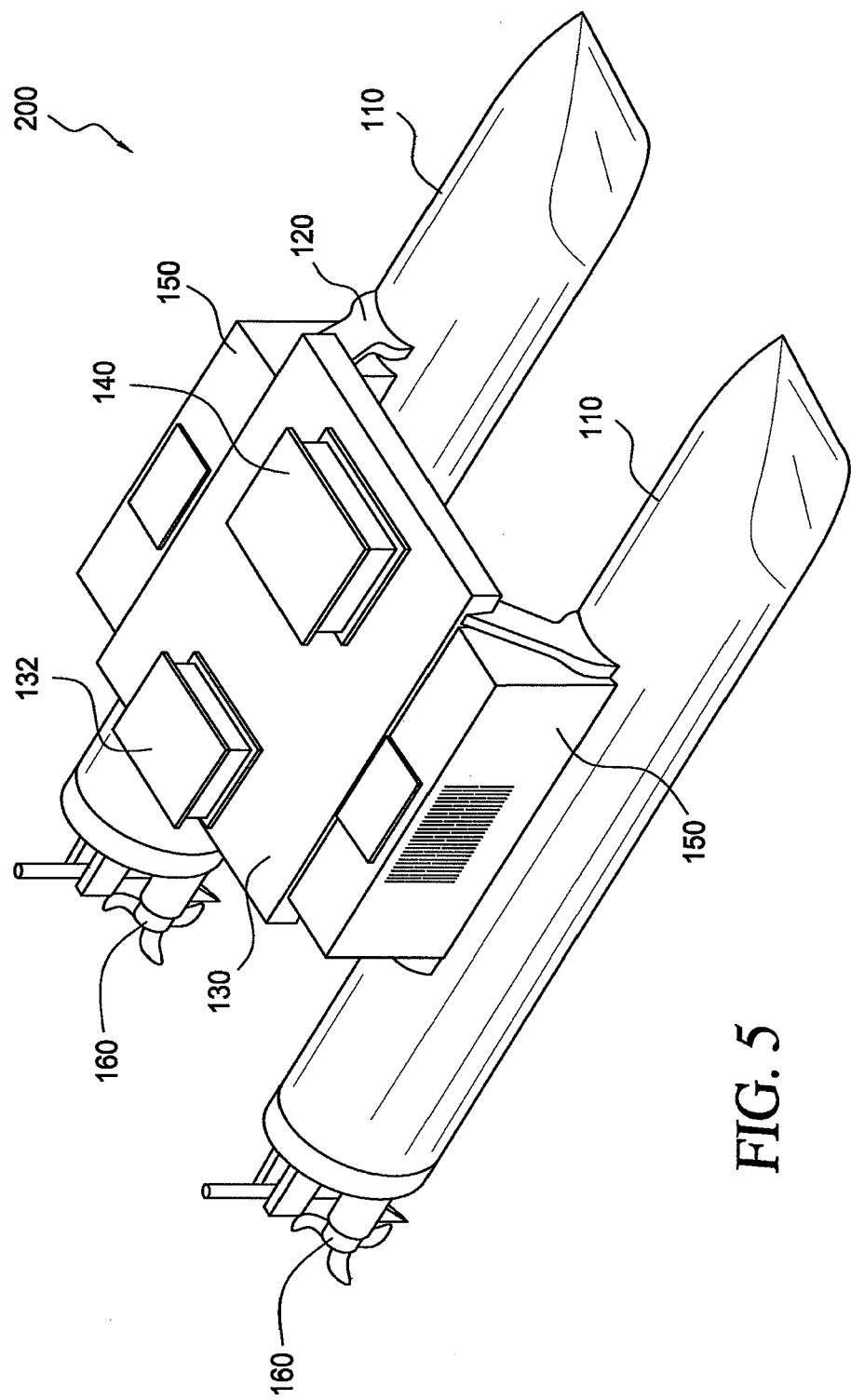
FIG. 5 is a top, front perspective view of an autonomous aquatic surface vehicle with a dual faceted hull design, in accordance with yet another embodiment of the present invention.
Figure 6:
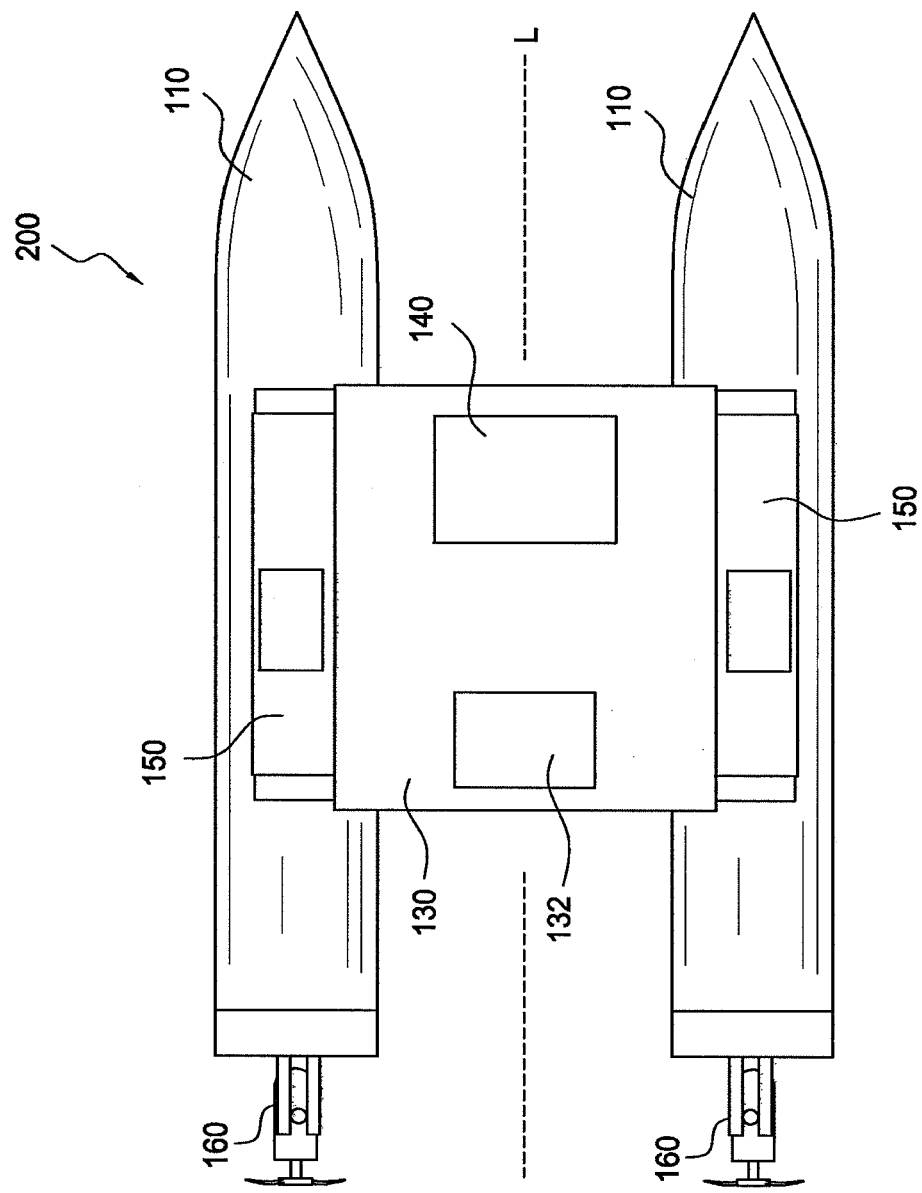
FIG. 6 a top view of the autonomous aquatic surface vehicle of FIG. 5, in accordance with an embodiment of the present invention.
Figure 7:
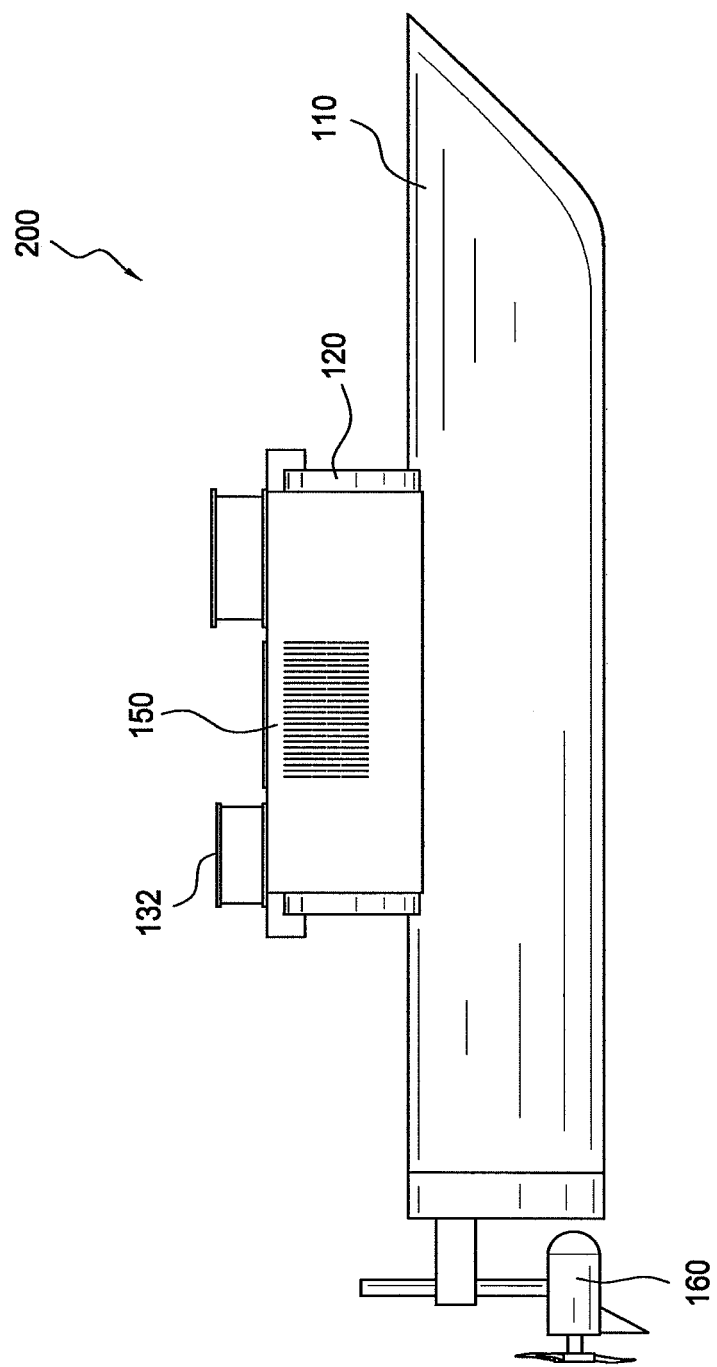
FIG. 7 is a right side view of the autonomous aquatic surface vehicle of FIG. 5, in accordance with an embodiment of the present invention.
Figure 8:
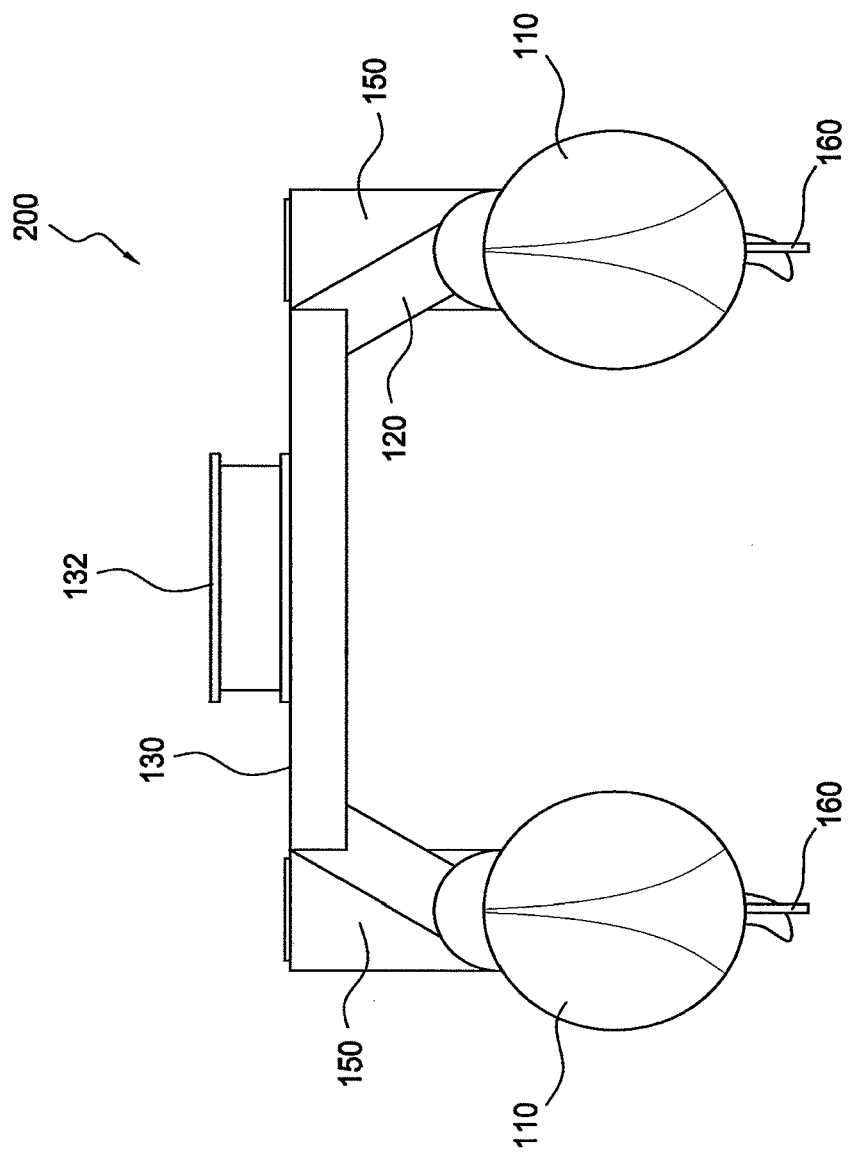
FIG. 8 is a rear view of the autonomous aquatic surface vehicle of FIG. 5, in accordance with an embodiment of the present invention.
Figure 9:
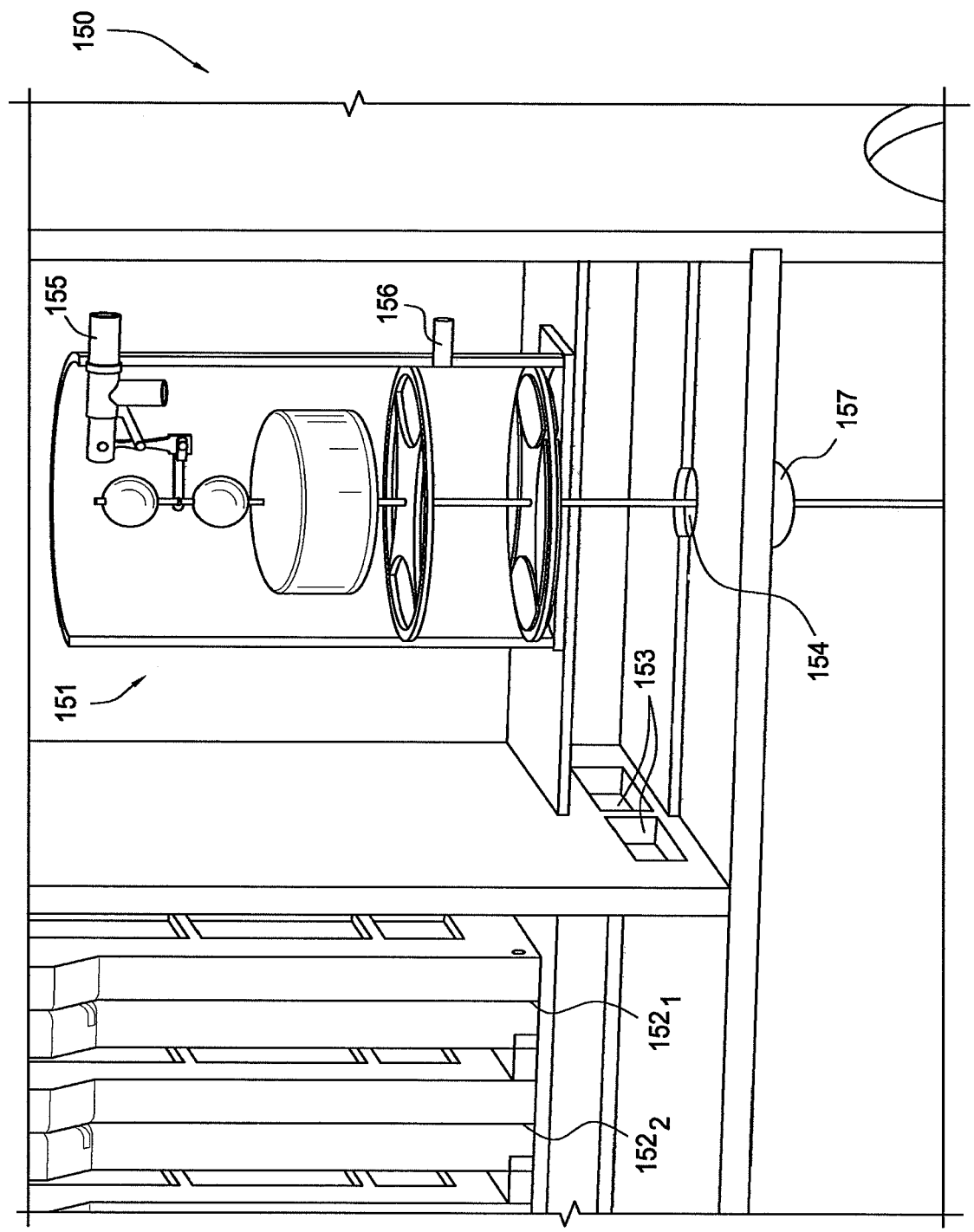
FIG. 9 is a partial cross-sectional, internal view of a portion of a power unit with flush mechanism, showing the sides of some of the cells in the power unit and the internal workings of the flush mechanism, in accordance with an embodiment of the present invention.
Figure 10:
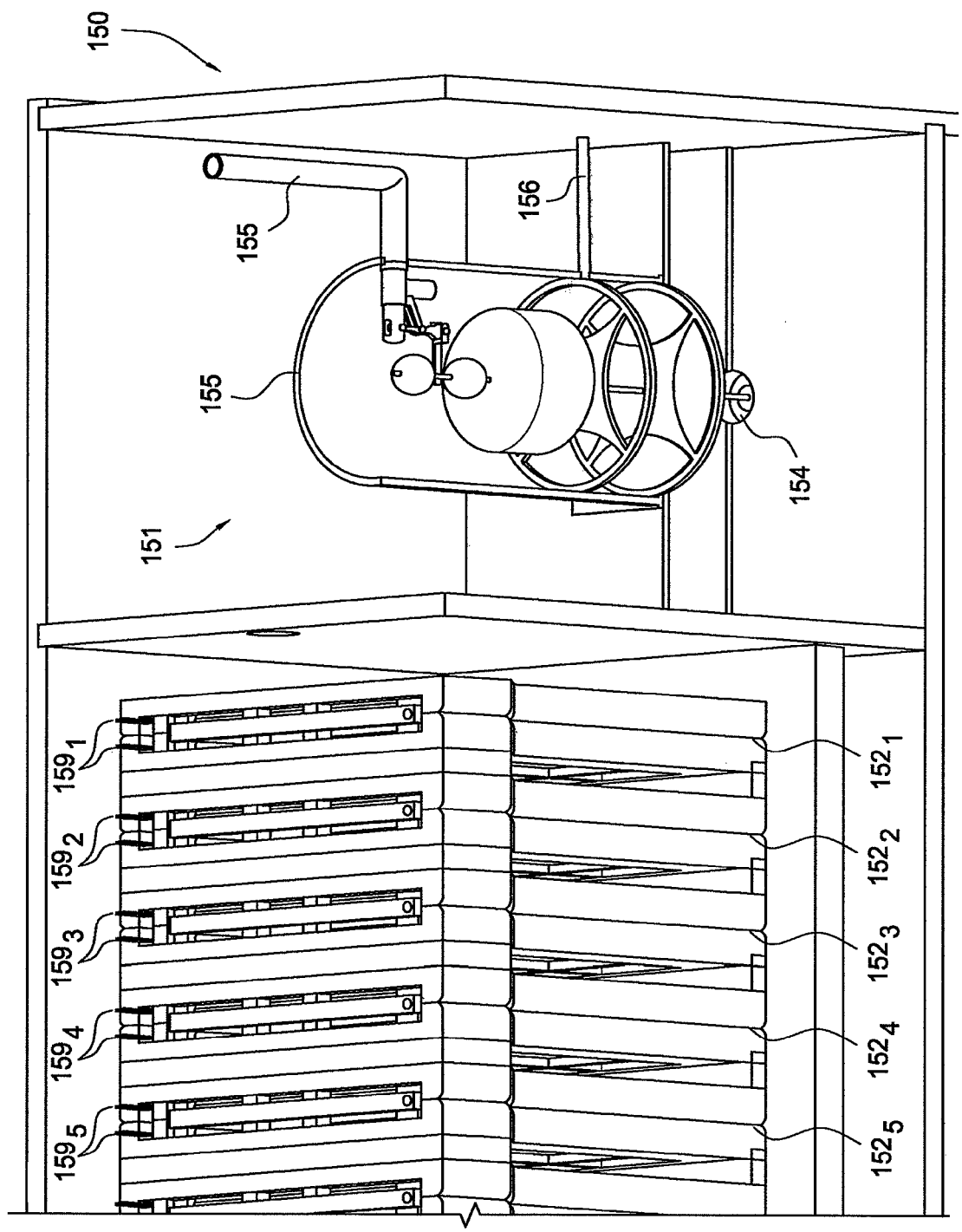
FIG. 10 is a top, front side perspective and partial cross-sectional, internal view of the portion of a power unit with flush mechanism of FIG. 9, showing the sides of some of the cells in the power unit and the internal workings of the flush mechanism, in accordance with another embodiment of the present invention.
Figure 11:
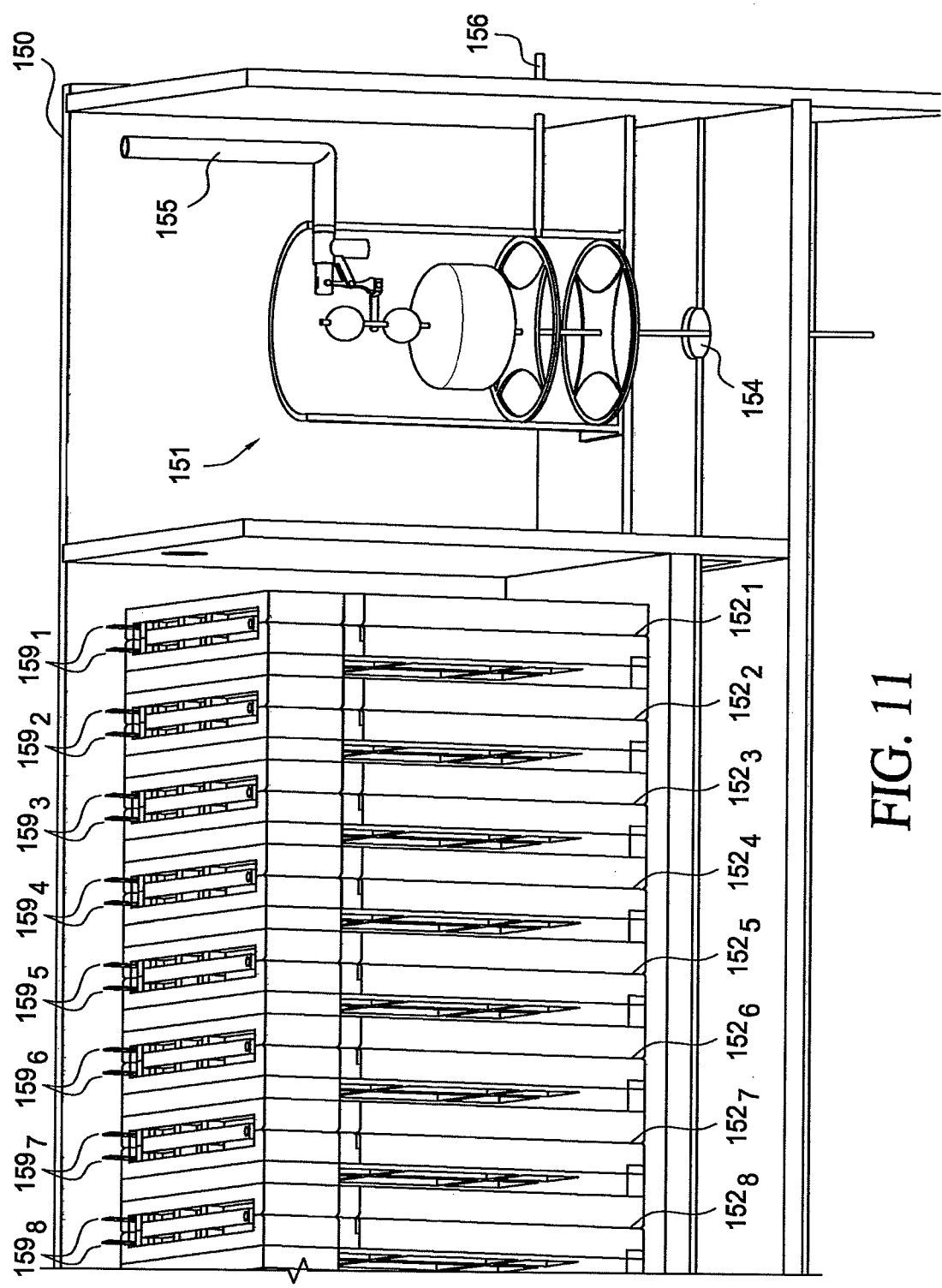
FIG. 11 is a front perspective and partial cross-sectional, internal view of the portion of a power unit with flush mechanism of FIG. 9, showing the sides of some of the cells in the power unit and the internal workings of the flush mechanism, in accordance with an embodiment of the present invention.
Figure 12:
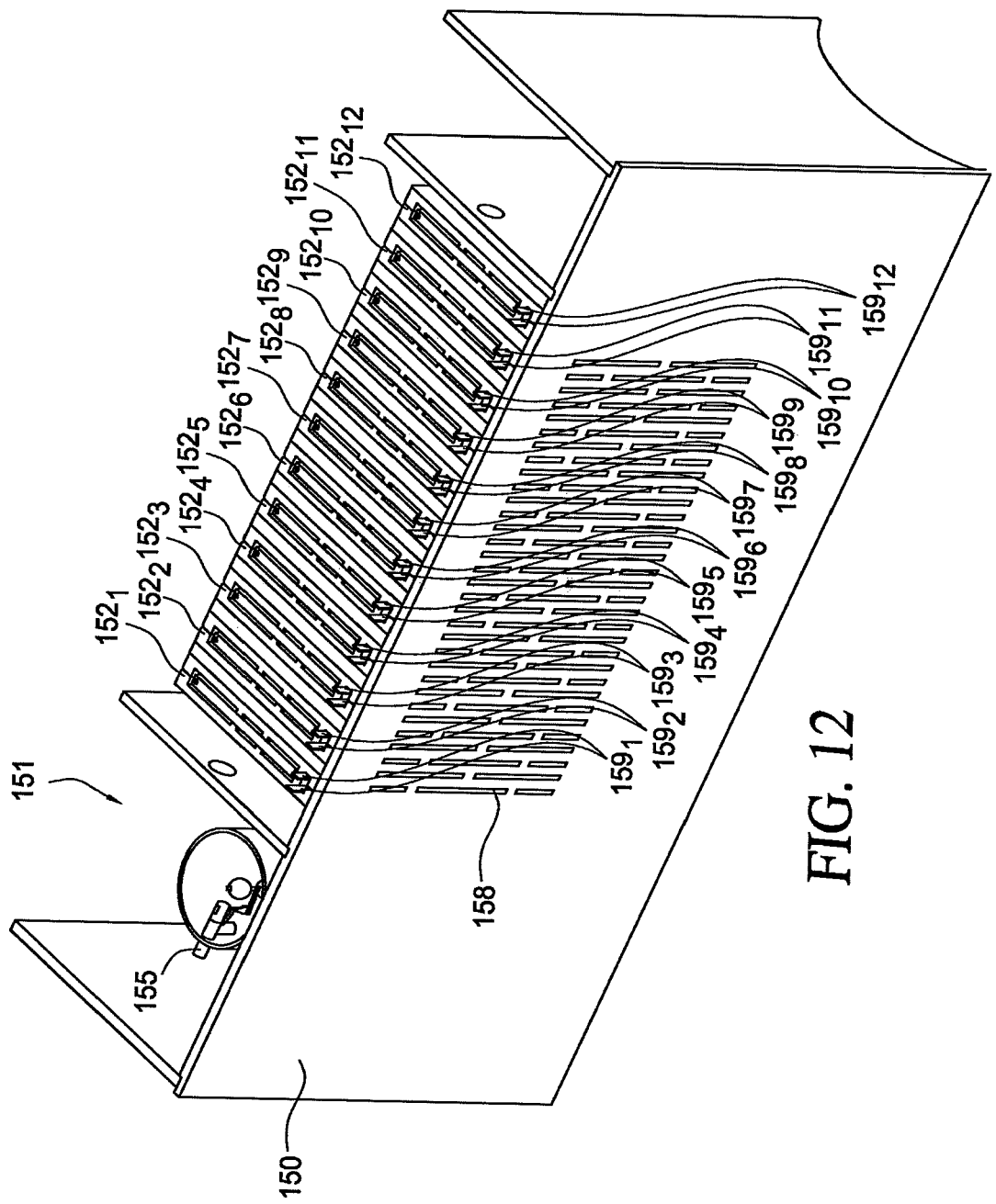
FIG. 12 is a top, rear side perspective and partial cross-sectional, internal view of the portion of a power unit with flush mechanism of FIG. 9, showing the sides of some of the cells in the power unit and the internal workings of the flush mechanism, in accordance with an embodiment of the present invention.
Figure 13:
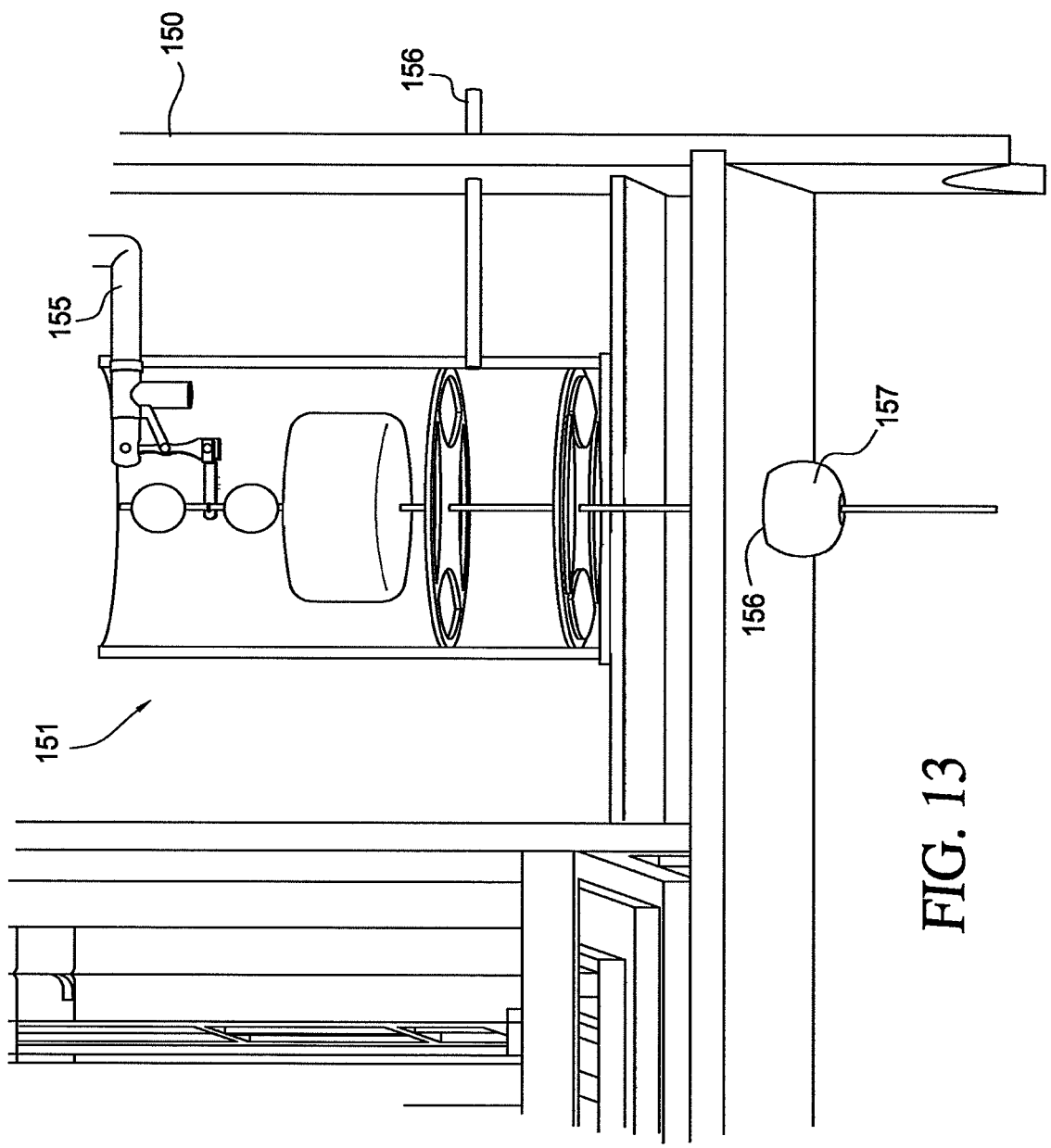
FIG. 13 is a bottom, front perspective and partial cross-sectional, internal view of the portion of a power unit with flush mechanism of FIG. 9, showing the sides of some of the cells in the power unit and the internal workings of the flush mechanism, in accordance with an embodiment of the present invention.
Figure 14:
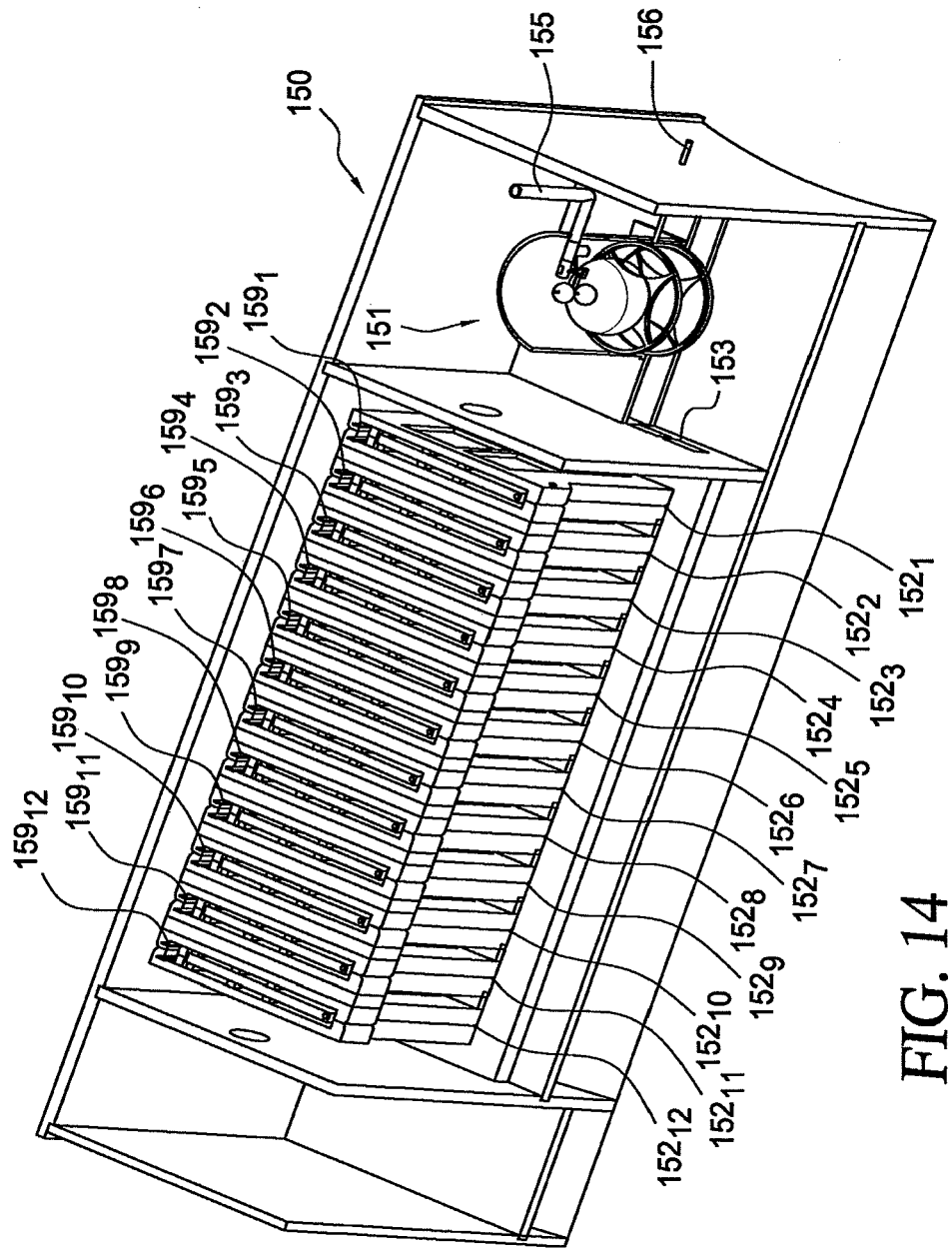
FIG. 14 is a top, front side perspective and partial cross-sectional, internal view of the portion of a power unit with flush mechanism of FIG. 9, showing the sides of some of the cells in the power unit and the internal workings of the flush mechanism, in accordance with an embodiment of the present invention.
Figure 15:
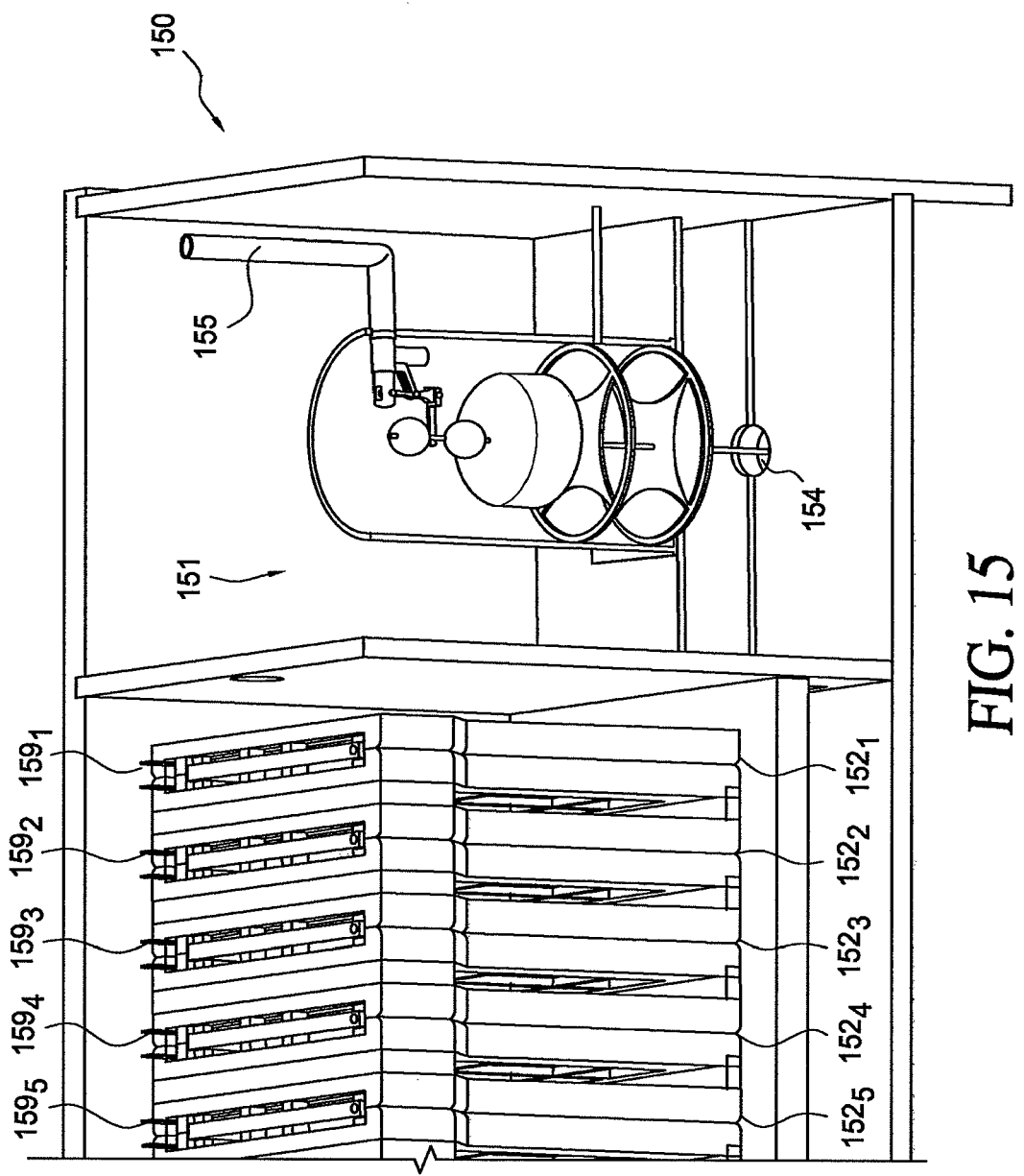
FIG. 15 is a close-up, top, front side perspective and partial cross-sectional, internal view of the portion of a power unit with flush mechanism of FIG. 9, showing the sides of some of the cells in the power unit and the internal workings of the flush mechanism, in accordance with an embodiment of the present invention.
Figure 16:
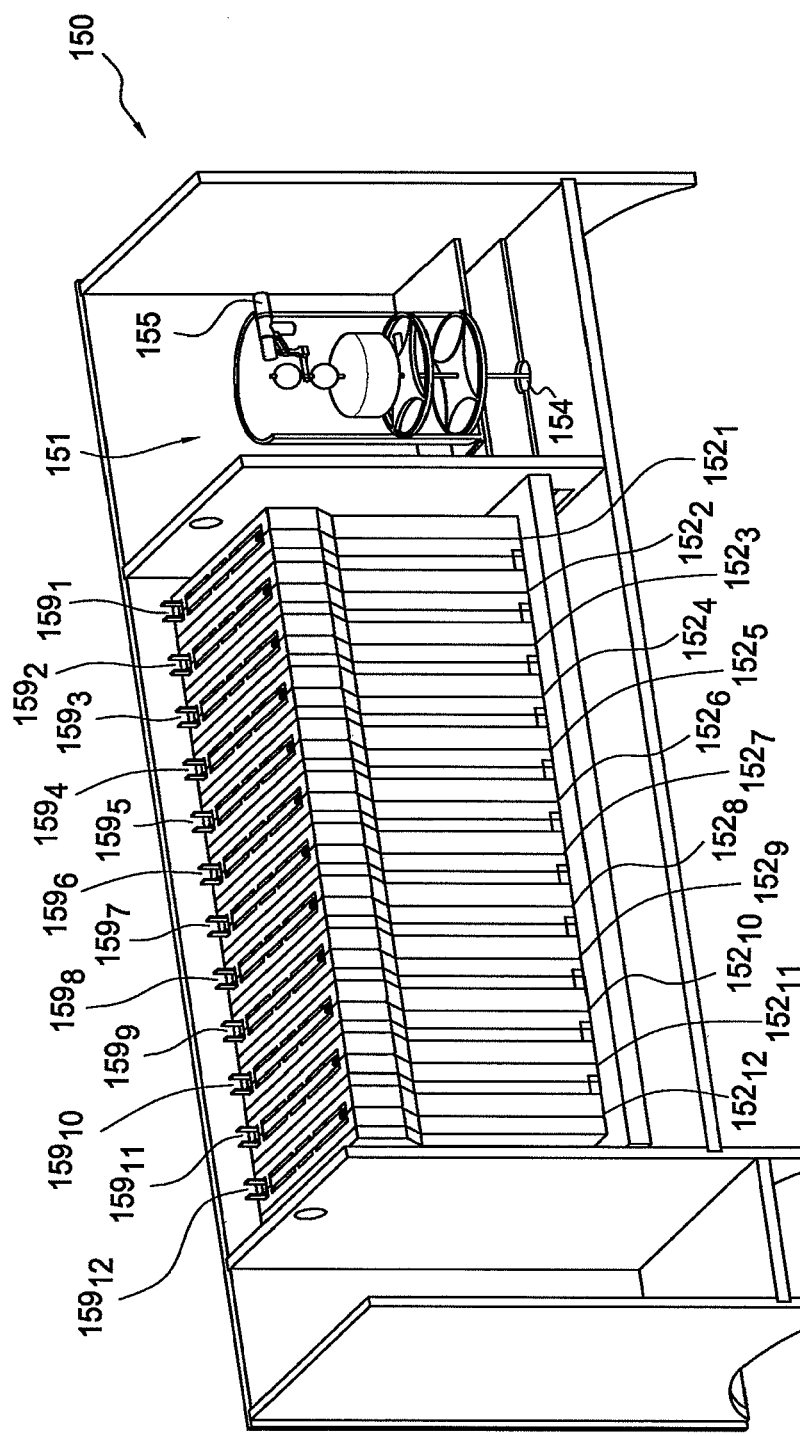
FIG. 16 is a front perspective view with partial cross-sectional, internal view of the portion of a power unit with flush mechanism of FIG. 9, showing the sides of some of the cells in the power unit and the internal workings of the flush mechanism, in accordance with an embodiment of the present invention.
Figure 17:
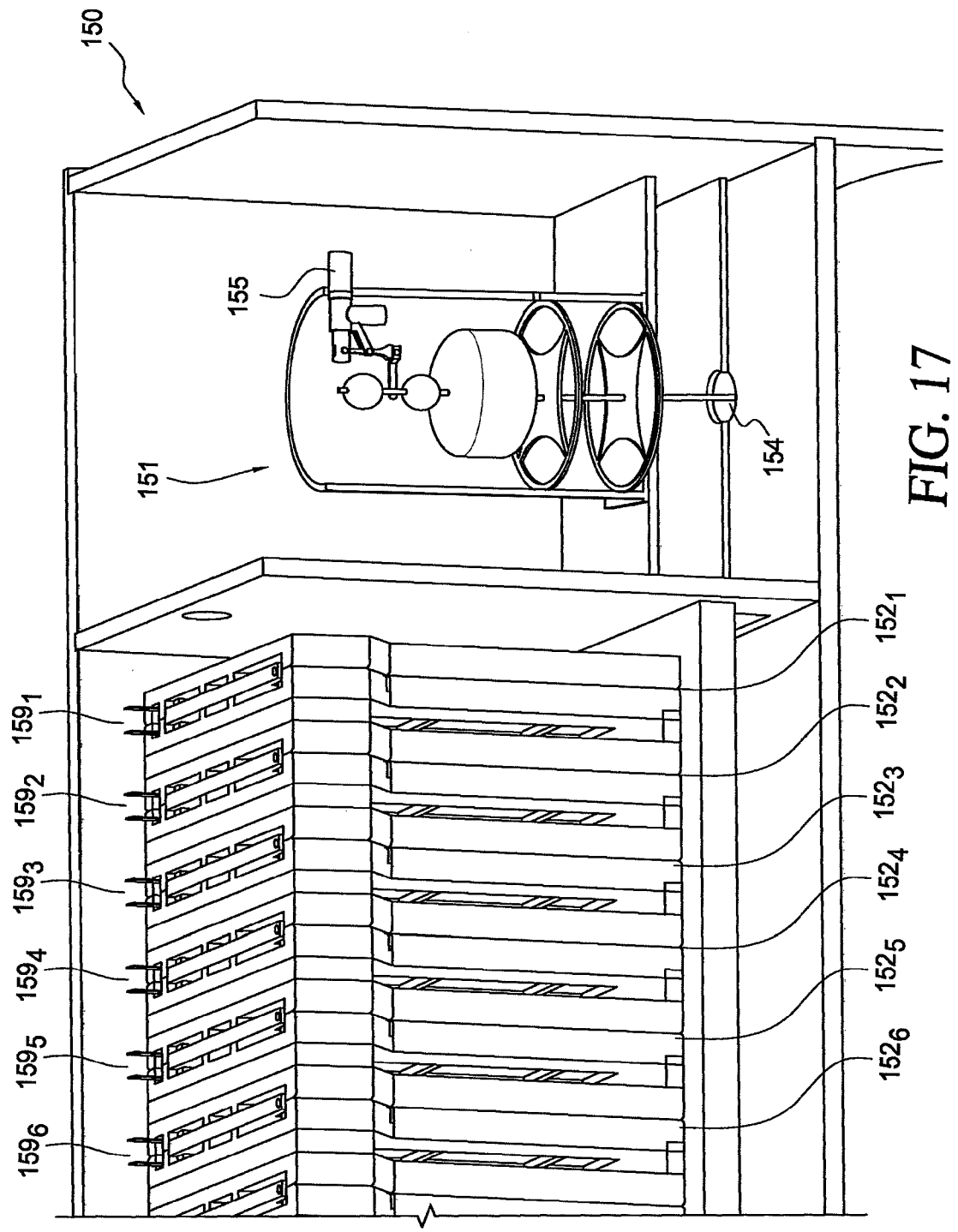
FIG. 17 is a close-up, front perspective view with partial cross-sectional, internal view of the portion of a power unit with flush mechanism of FIG. 9, showing the sides of some of the cells in the power unit and the internal workings of the flush mechanism, in accordance with an embodiment of the present invention.
Figure 18:
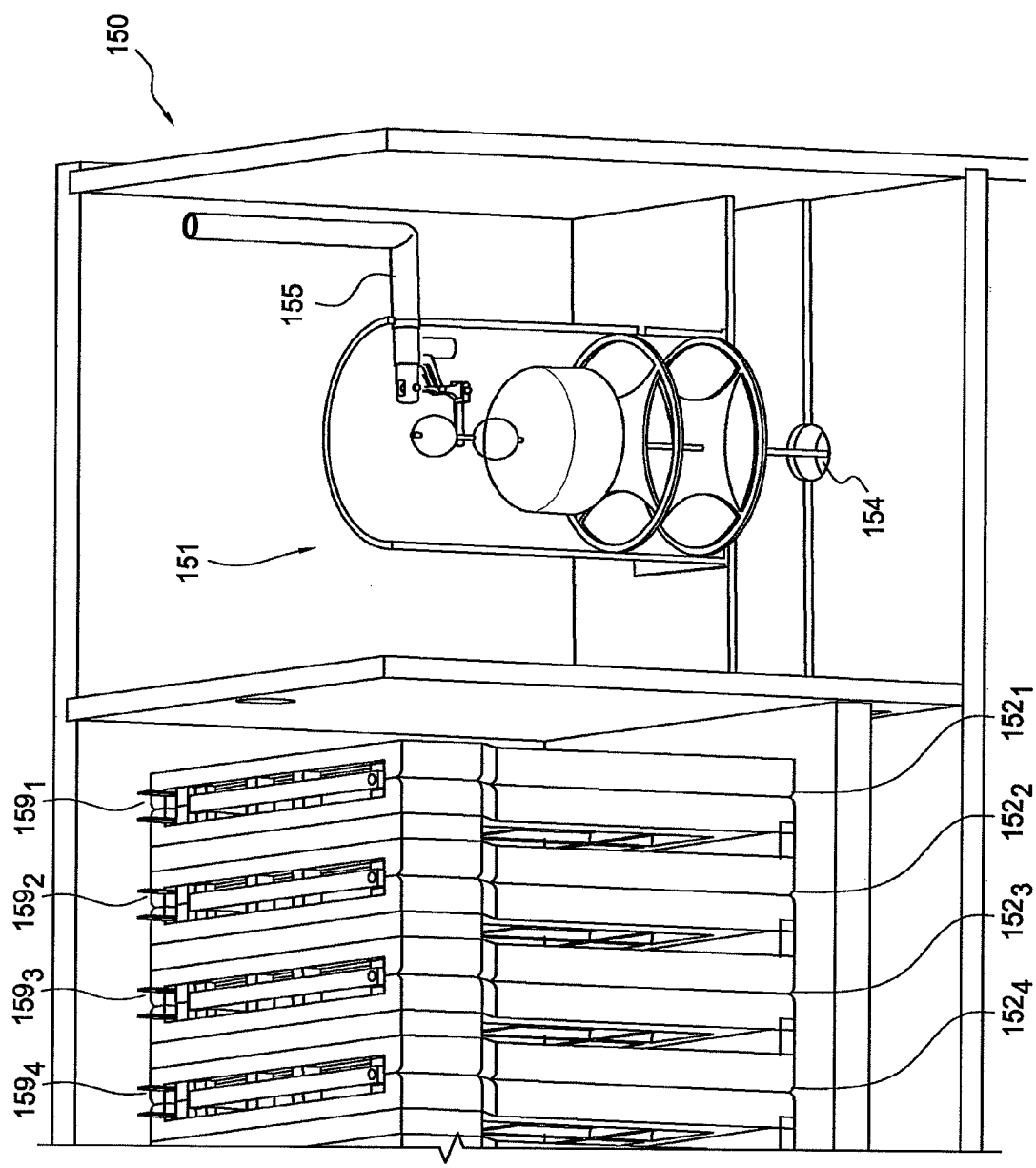
FIG. 18 is a close-up of the close up, front perspective view with partial cross-sectional, internal view of the portion of a power unit with flush mechanism of FIG. 9, showing the sides of some of the cells in the power unit and the internal workings of the flush mechanism, in accordance with an embodiment of the present invention.
Figure 19A:
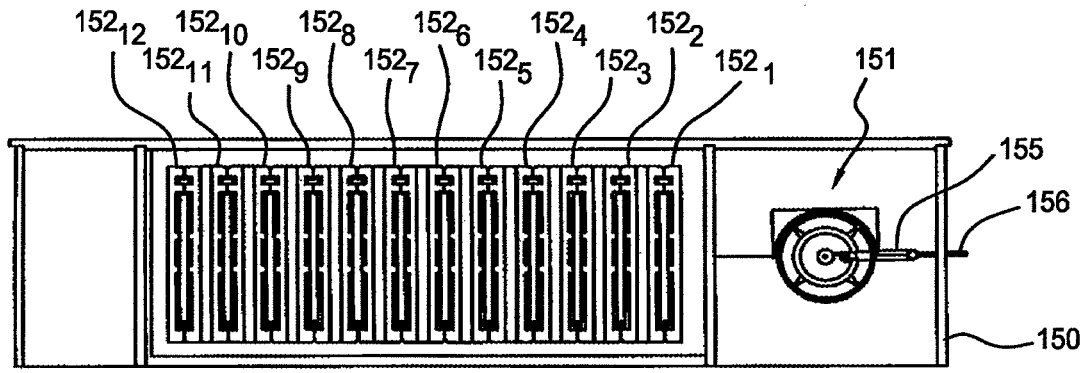
Figure 19B:
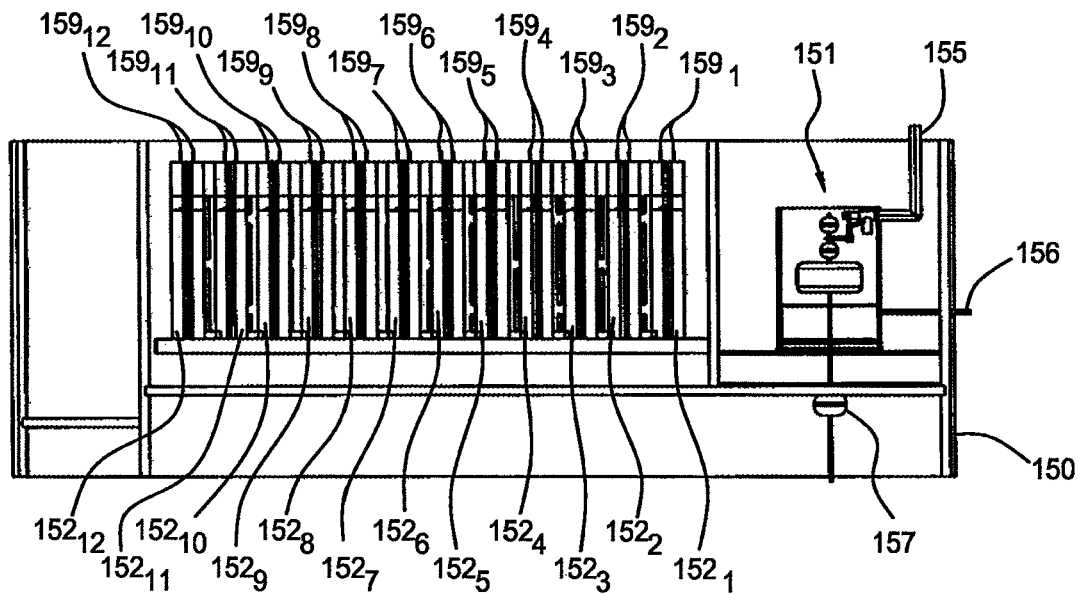
Figure 19C:
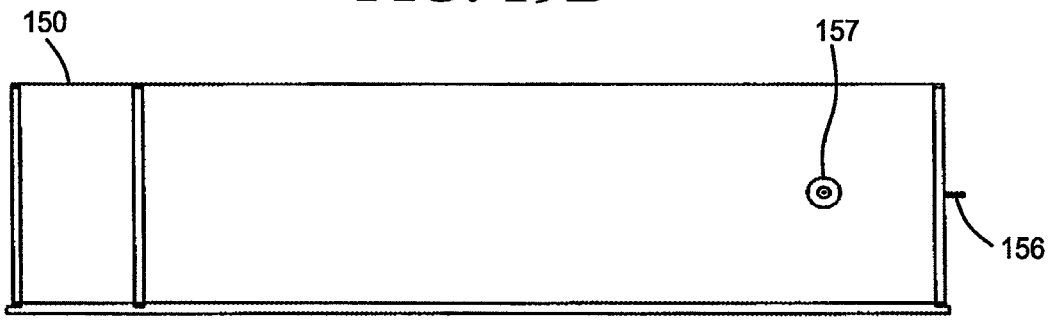
Figure 20:
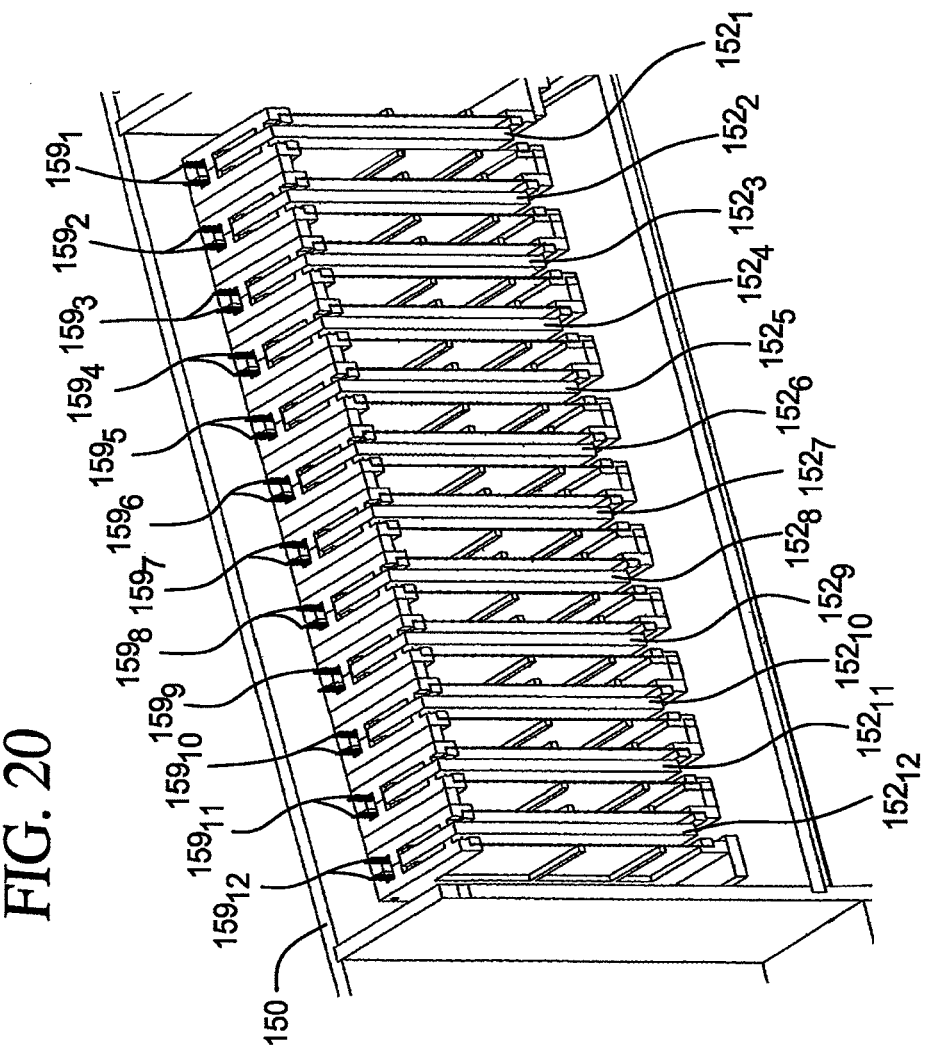
FIG. 20 is a top, front perspective, cross-sectional view of a portion of the power unit with flush mechanism of FIG. 9, showing the internal structure of the cells, in accordance with an embodiment of the present invention.
Figure 21A:
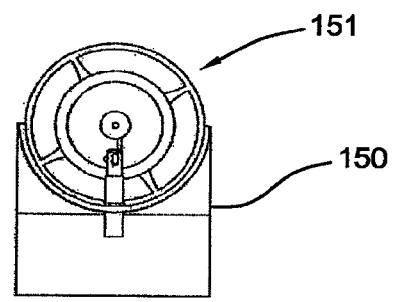
FIGS. 21A-D are various views of a float valve assembly of a flush mechanism of a power unit, in accordance with an embodiment of the present invention.
Figures 21B, 21C, 21D:
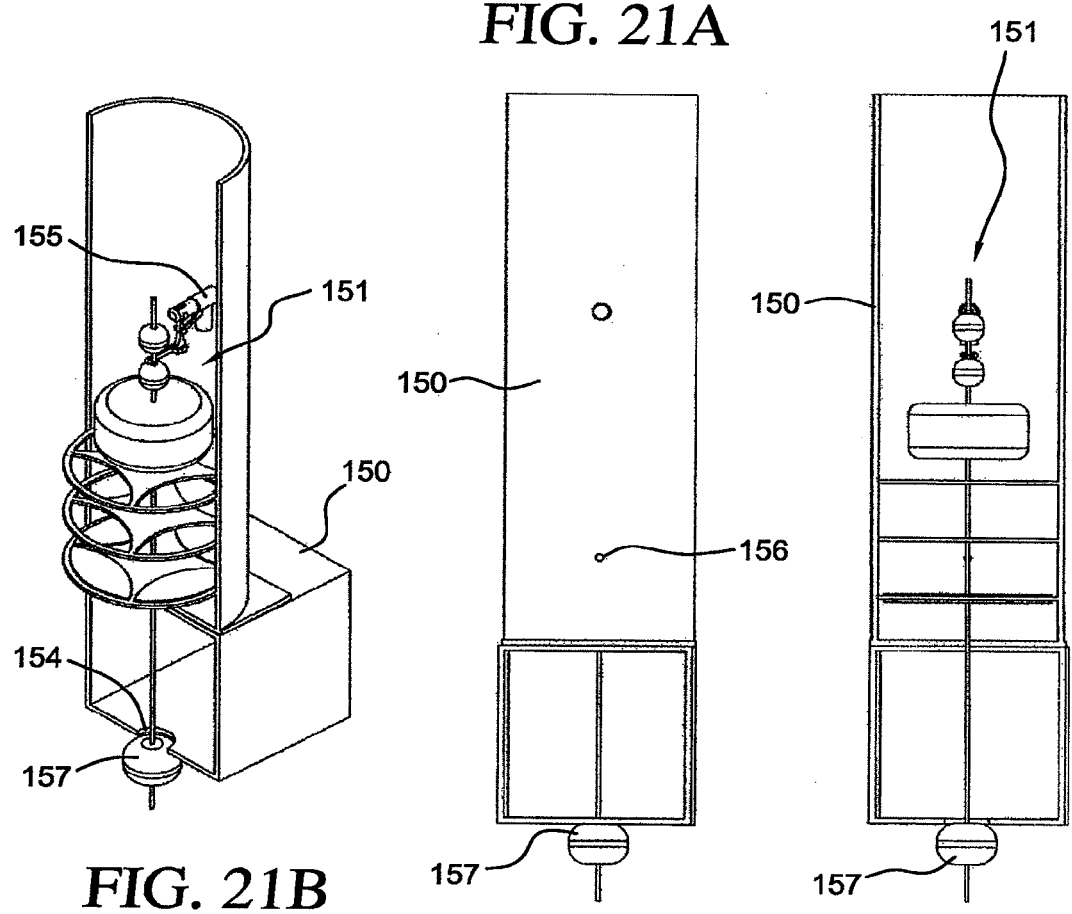

In accordance with one or more embodiments of the present invention, a new and inventive vehicle design for use in patrolling, policing, monitoring, etc. a specific area is provided. For example, the vehicle may be an aquatic surface vehicle that may operate autonomously based on a predetermined (i.e., preprogrammed) course, autonomously based on sensor input (e.g., but not limited to, sonar, radar, optical, infrared, etc.) predetermined (i.e., preprogrammed) logic, be operated remotely by an operator at a control center, and/or a combination of any of the above. For example, the vehicle could be initially navigating autonomously based on a predetermined course, but when a sensor input indicates there is an object or condition in the vicinity of the vehicle that needs further investigation, the predetermined logic may take over to move the vehicle toward the object or condition for closer inspection. In addition, when the object or condition is detected, a remote operator may be alerted to the presence of the object or condition and the remote operator may decide to override the predetermined logic and take control of navigating the vehicle to investigate the object or condition. Although the sensors may be used for navigation and collision avoidance, their main function is to collect real-time data on the environment surrounding the vehicle and transmit the data back to the control center for further analysis and processing to determine if additional action is required. Embodiments of the present invention may also include an analysis capability on board the vehicle to provide for a quicker response than can be achieved if the data has to be transmitted back to the control center for processing and analysis, a decision made on a course of action, and then transmitting instructions back to the vehicle to implement the decision.

FIGS. 1-4, 35, and 47-52 show an autonomous aquatic surface vehicle 100 with dual cylindrical hulls, in accordance with an embodiment of the present invention.

The autonomous aquatic surface vehicle 100 can include (i.e., comprise) two or more hull sections 110 (e.g., if two hulls, then vehicle is a dual hull and/or a regular catamaran; if three hulls, then the vehicle is a tri hull and/or a trimaran; etc.) that are, in general, coaxially aligned with a longitudinal line L that runs along the center of the autonomous aquatic surface vehicle 100. However, an alternative single hull (i.e., monohull) configuration is also contemplated such that the center of the hull may be centered along the longitudinal line L. Most or all of the structural portions of the vehicle 100 are made from a thermo-formable and weldable plastic, for example, but not limited to, Type 2 PVC. In general, each hull section 110 is filled with a buoyant material, for example, but not limited to, buoyant foam and other buoyant materials, so that even if an outer shell of the hull section 110 is punctured, the hull section 110 will still remain afloat and operational. Each hull also may be configured with a water pump, such as a bilge pump, to remove unwanted water, such as seawater or rainwater, that may enter a portion of the hull section 110 not intended to receive water. Such removal of unwanted water also can assist the vehicle with buoyancy and operation. In addition, each hull section 110 may have a cleaving bow. Alternative hull designs are also contemplated, for example, a faceted design as seen in FIGS. 5-8, as well as a hull with a cross-sectional shape similar to a home plate on a baseball field, where the pointed back end acts as a keel in the water. A wider hull design for each hull section also is contemplated.

Figure 22:
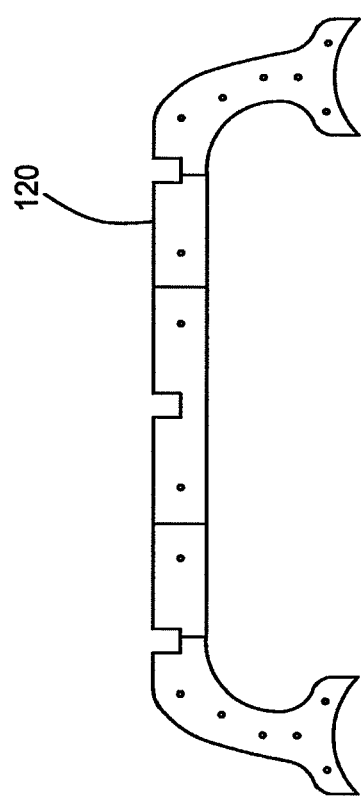
FIG. 22 is a front view of a truss used to fasten two hulls of the autonomous aquatic surface vehicle of FIG. 1, in accordance with an embodiment of the invention.
Figure 23:
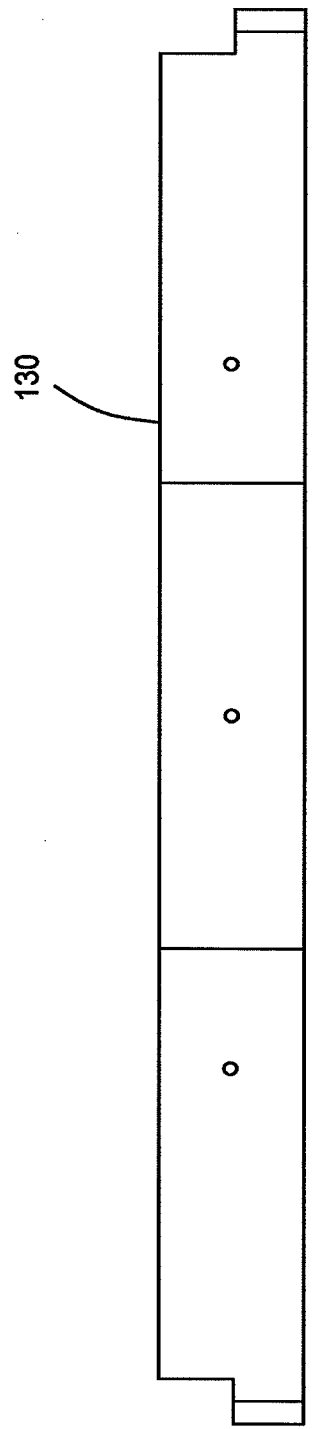
FIG. 23 is a front view of a deck support used to fasten two hulls of the autonomous aquatic surface vehicle of FIG. 1, in accordance with an embodiment of the invention.
Figure 24:
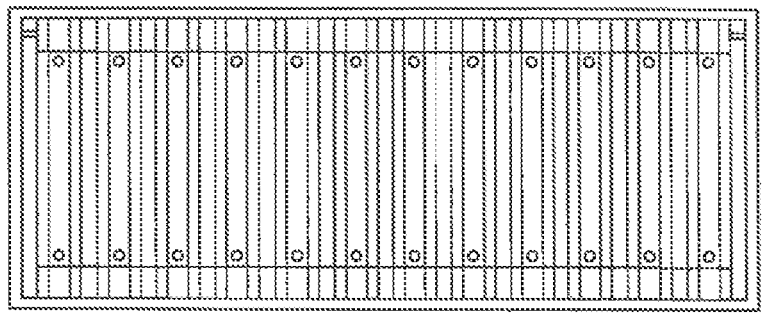
FIG. 24 is a top view of the individual cells in the power unit of FIG. 9, in accordance with an embodiment of the invention.
Figure 25:
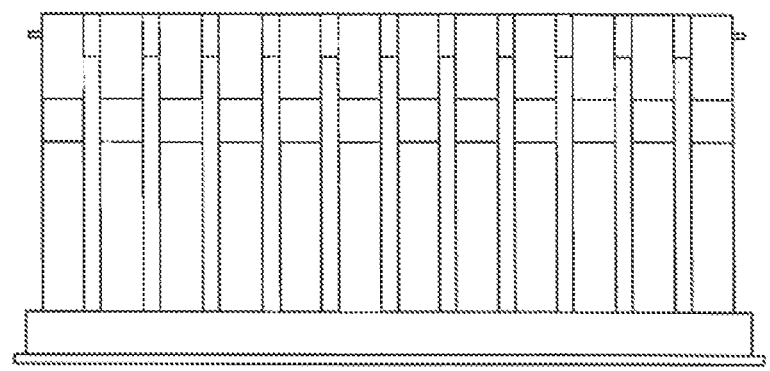
FIG. 25 is a side view of the individual cells in the power unit of FIG. 9, in accordance with an embodiment of the invention.
Figure 38:
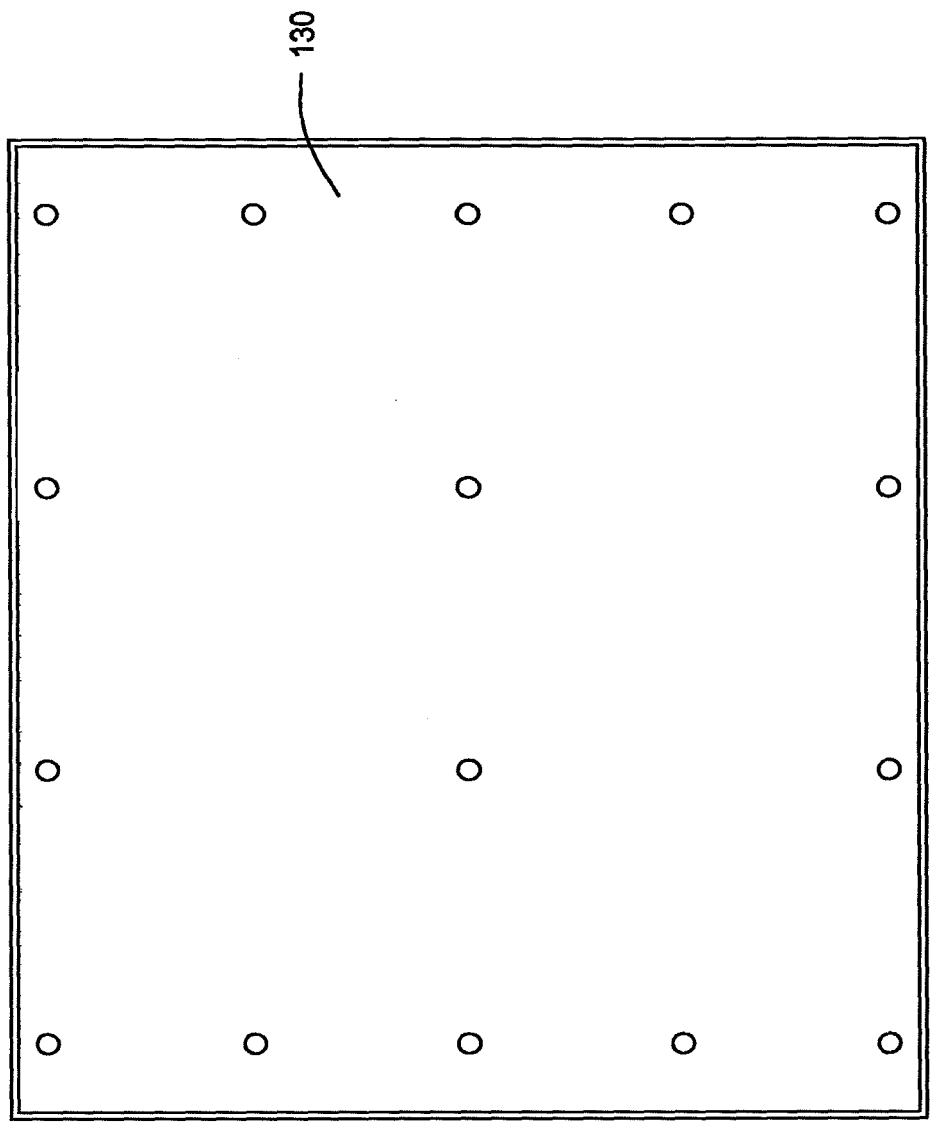
FIG. 38 is a deck plate for attaching to the truss of FIG. 22, in accordance with an embodiment of the invention.
Figure 40A:
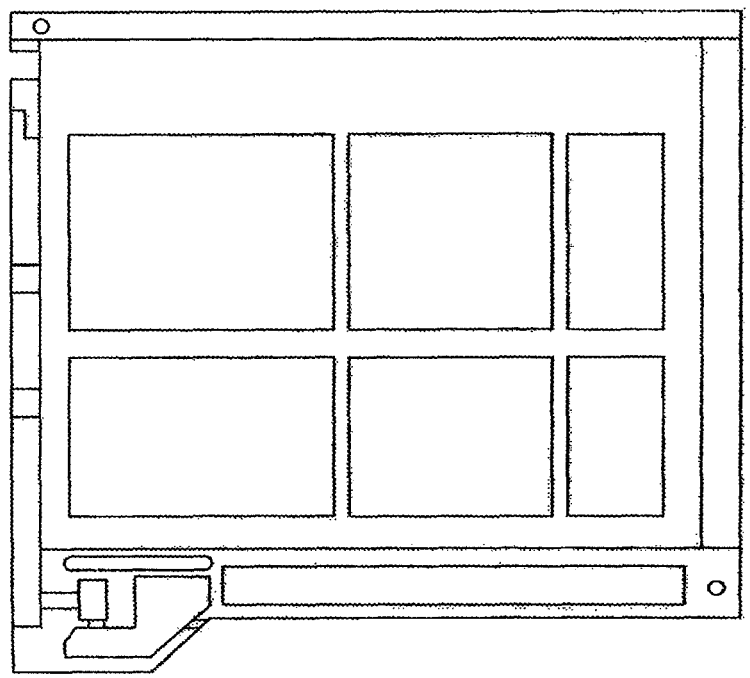
FIGS. 40A-B are cathode and anode sides, respectively, of the individual fuel cell casing for use in the power unit, in accordance with an embodiment of the invention.
Figure 40B:
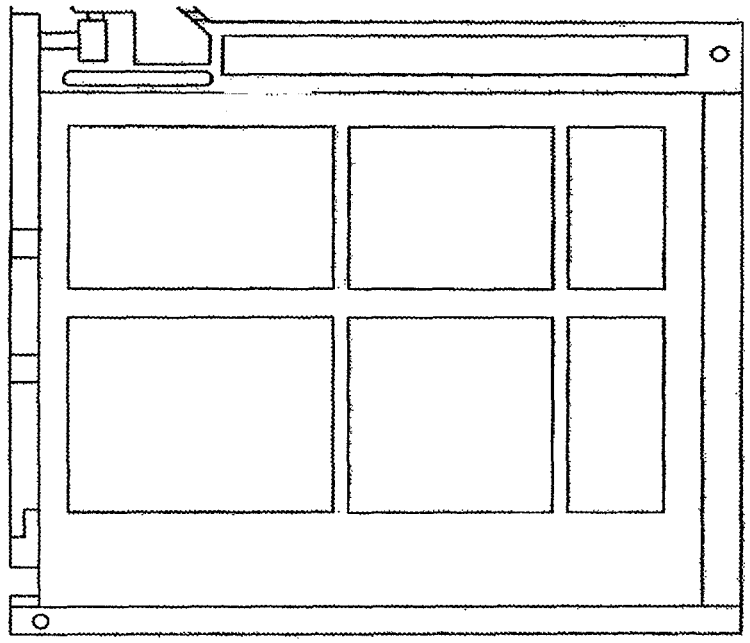
Figure 41:
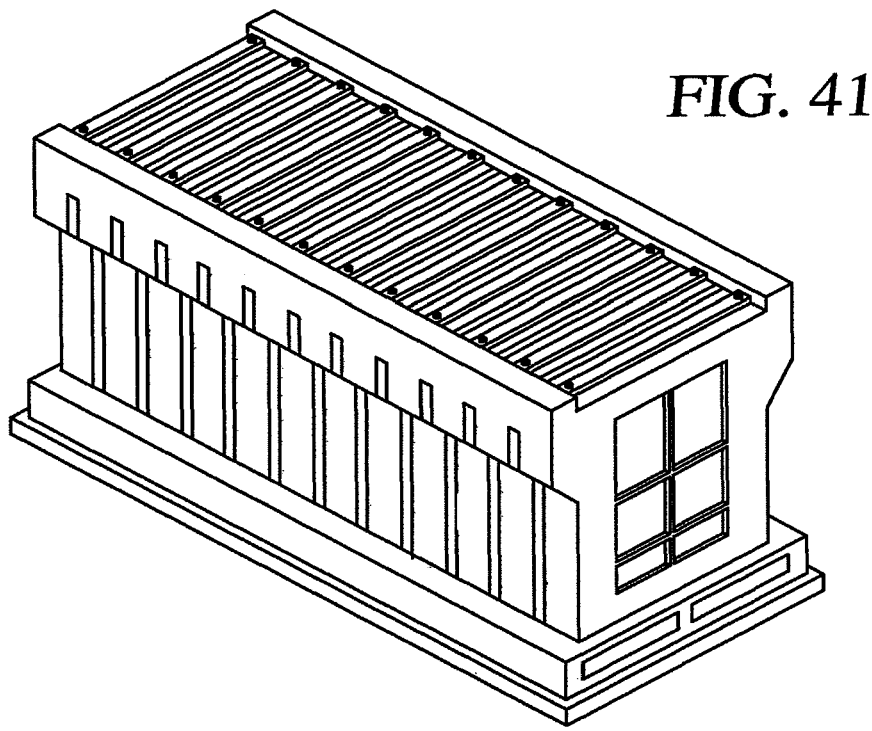
FIG. 41 is an overhead perspective view of a power unit, in accordance with an embodiment of the invention.
Figure 42:
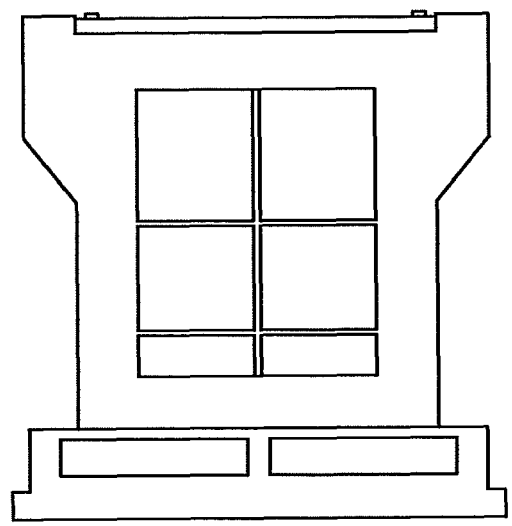
FIG. 42 is a rear view of the power unit of FIG. 41, in accordance with an embodiment of the invention.
Figure 43:
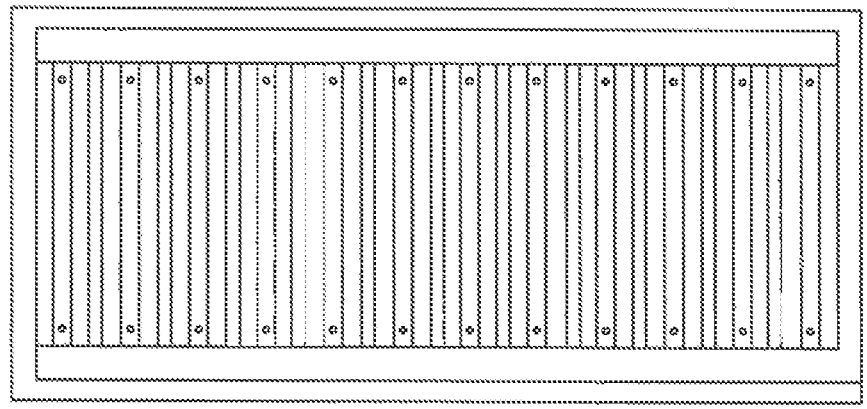
FIG. 43 is an overhead view of the power unit of FIG. 41, in accordance with an embodiment of the invention.
Figure 44:
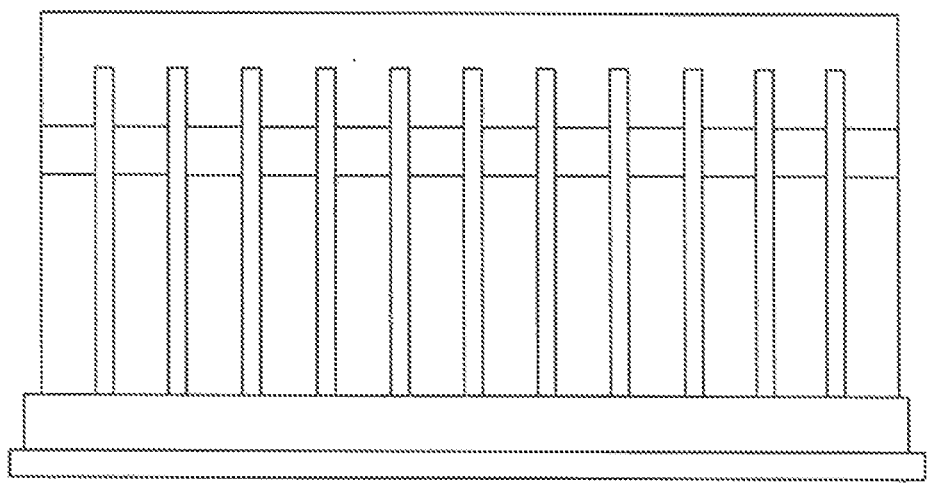
FIG. 44 is a side view of the power unit of FIG. 41, in accordance with an embodiment of the invention.
Figure 45B:
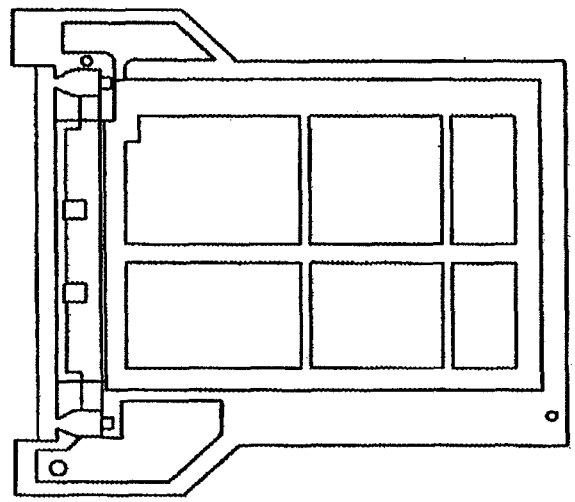
FIGS. 45A-B are front and rear views of the power unit of FIG. 41, in accordance with an embodiment of the invention.
Figure 45A:
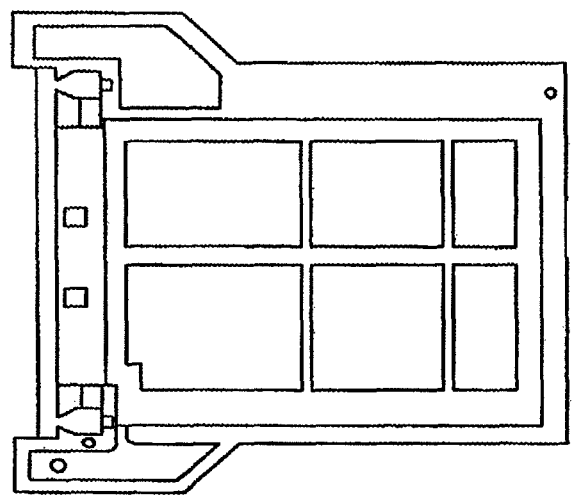
Figure 46:
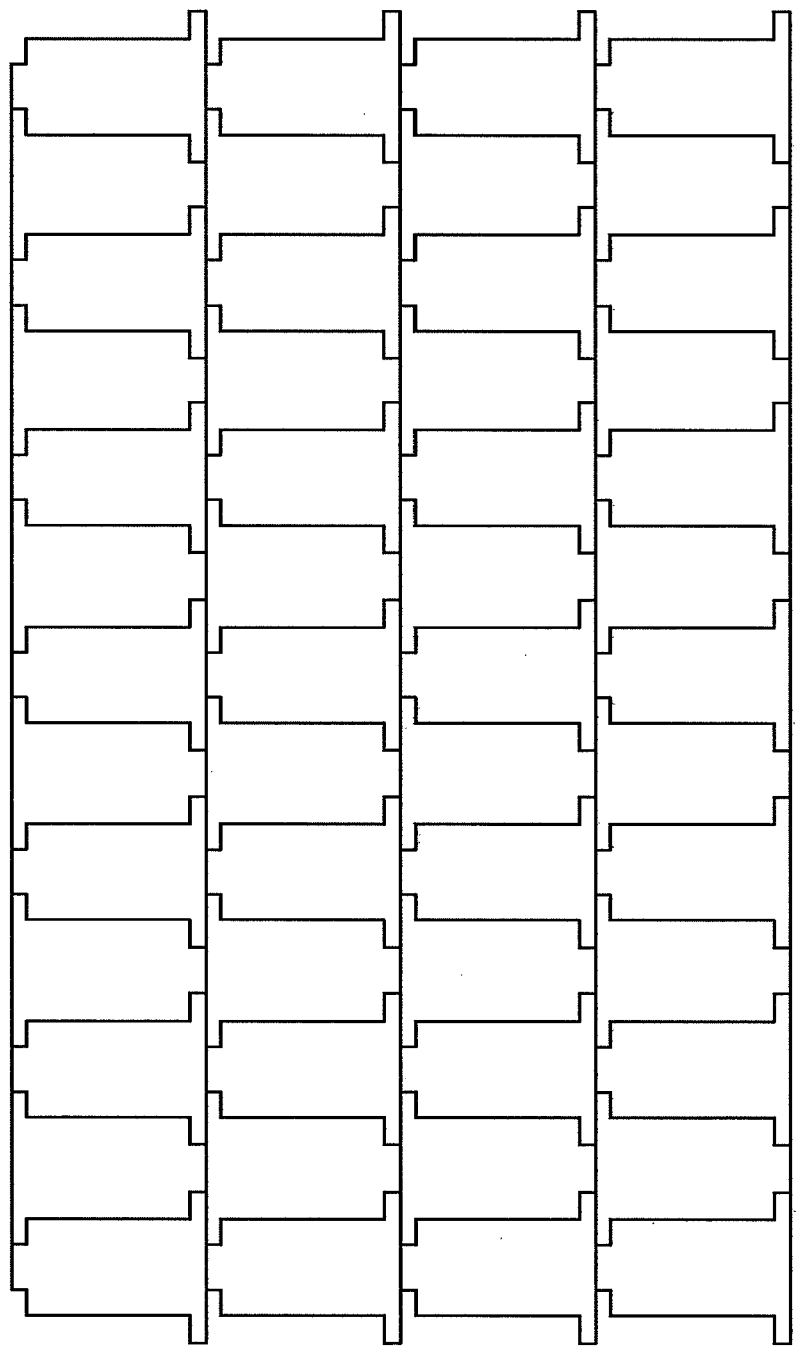
FIG. 46 is a top view of a sheet of anode material showing the cutting pattern for multiple anodes.
Figure 47:
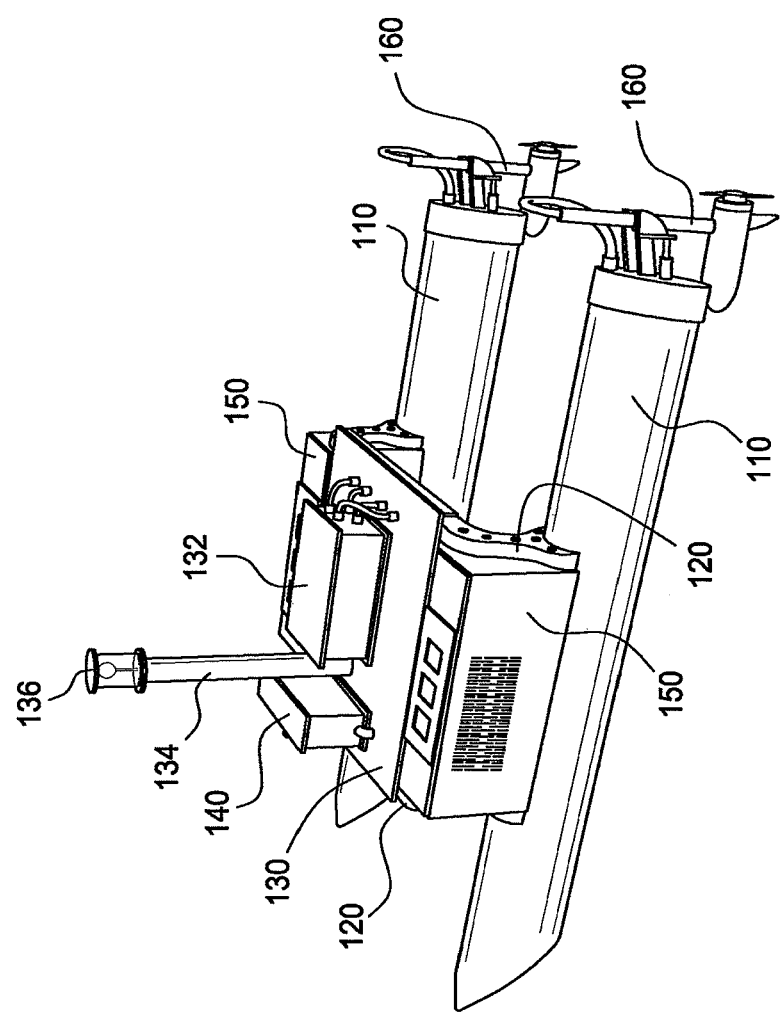
FIG. 47 is a top, side perspective view of the autonomous aquatic surface vehicle of FIG. 1, in accordance with yet another embodiment of the present invention.
Figure 48:
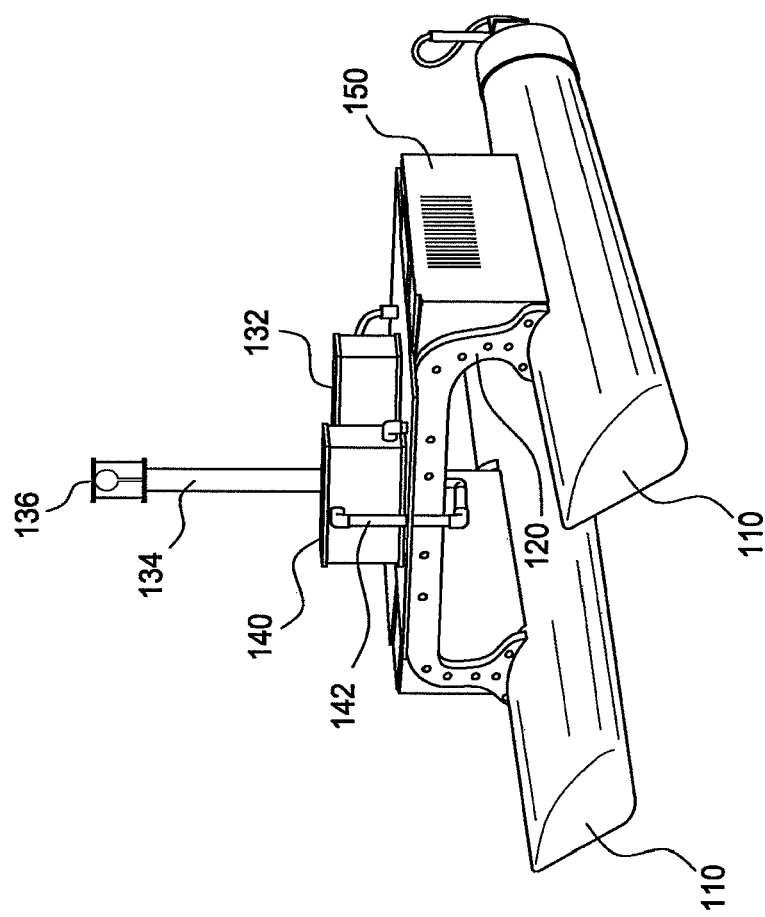
FIG. 48 is a front, side perspective view of the autonomous aquatic surface vehicle of FIG. 1, in accordance with yet another embodiment of the present invention.
Figure 49:
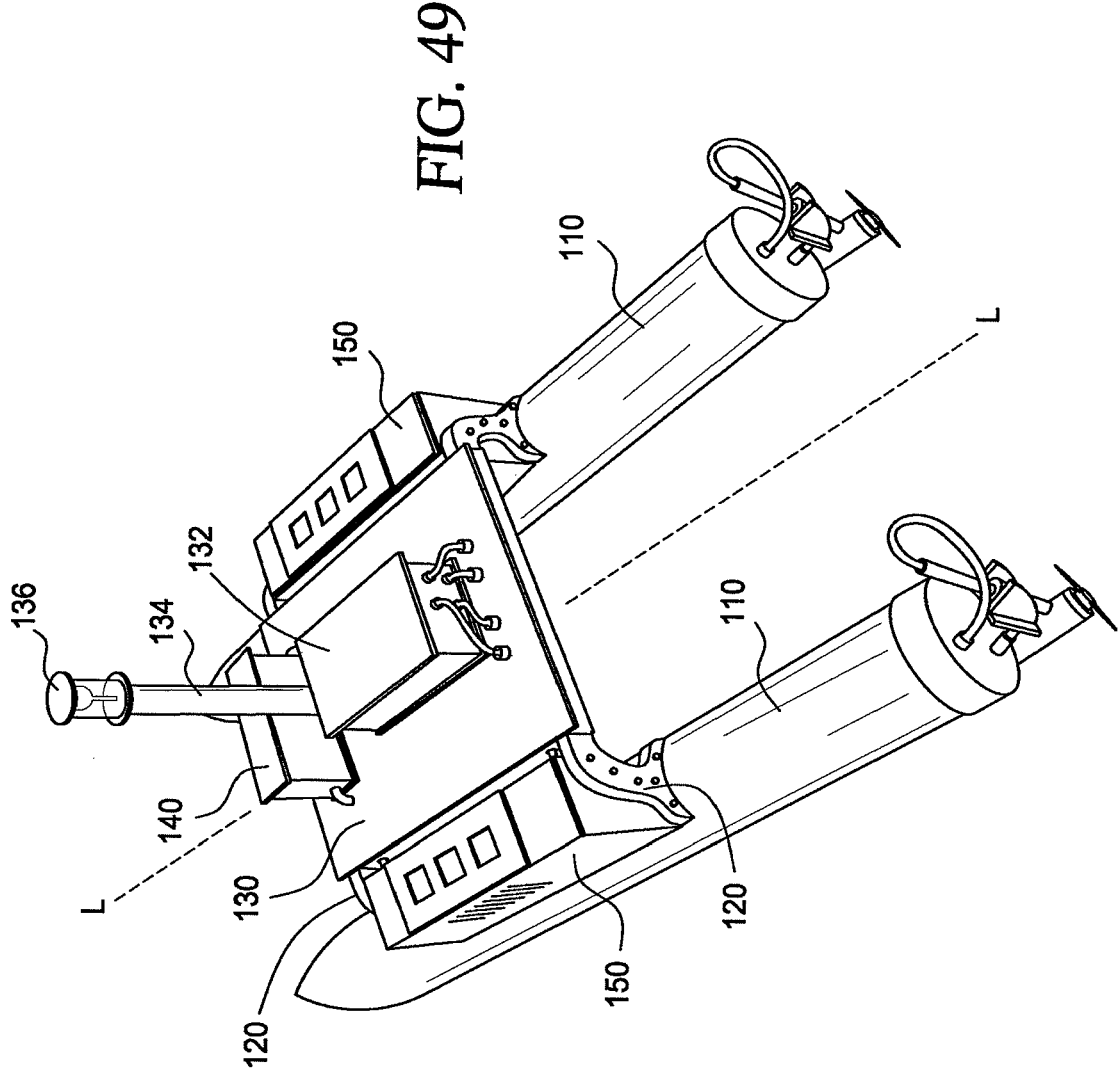
FIG. 49 is a top, rear perspective view of the autonomous aquatic surface vehicle of FIG. 1, in accordance with an embodiment of the present invention.
Figure 50:
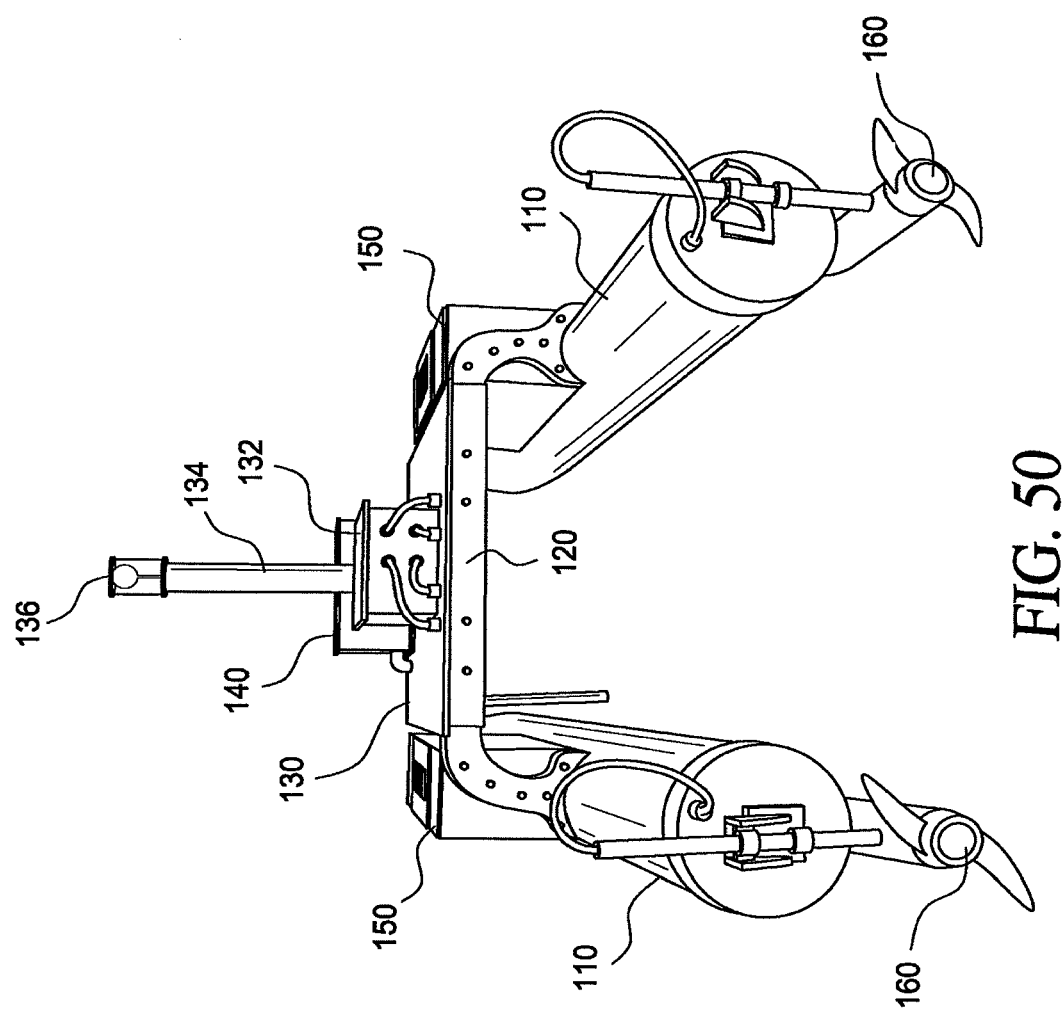
FIG. 50 is a rear perspective view of the autonomous aquatic surface vehicle of FIG. 1, in accordance with an embodiment of the present invention.
Figure 51:
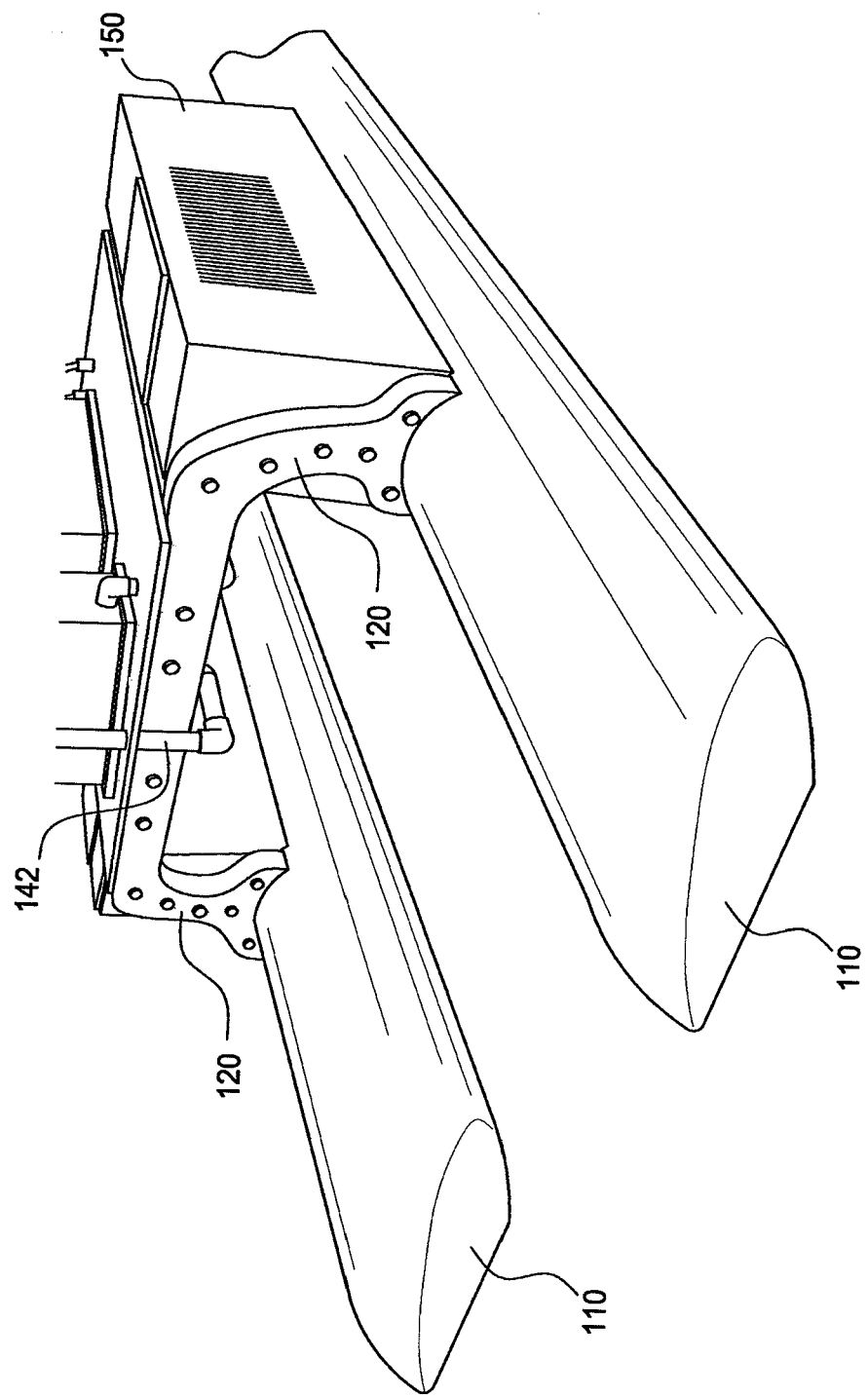
FIG. 51 is a front and side partial view of the autonomous aquatic surface vehicle of FIG. 1, in accordance with an embodiment of the present invention.
Figure 52:
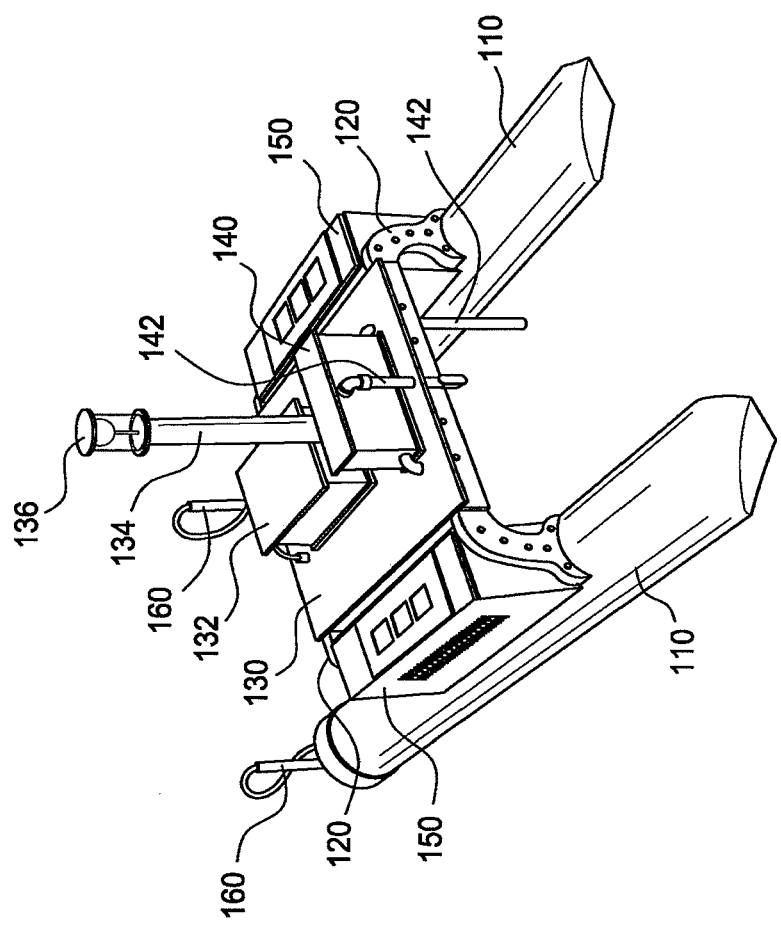
FIG. 52 is a front, overhead and side perspective view of the autonomous aquatic surface vehicle of FIG. 1, in accordance with an embodiment of the present invention.
Figure 53:
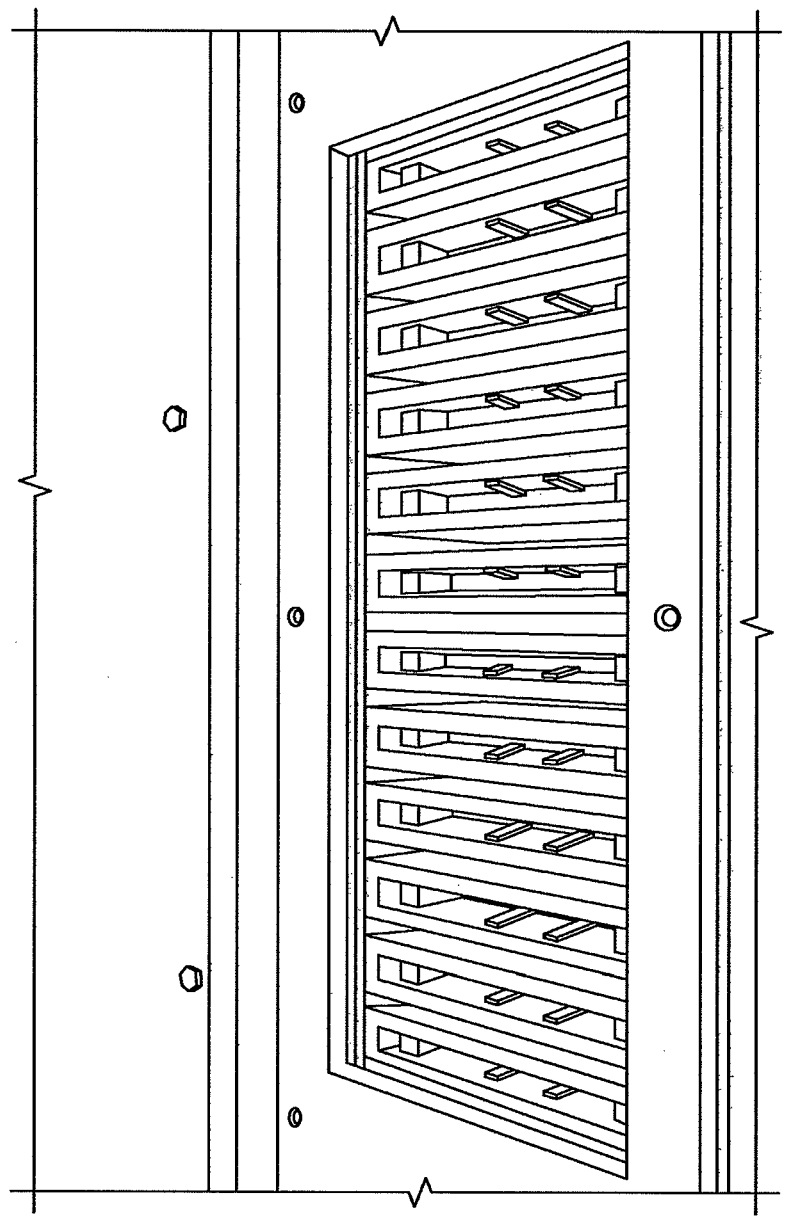
FIG. 53 is a partial view of a power unit, in accordance with an embodiment of the present invention.

Vehicle 100 also can include a pair of structural trusses 120 positioned substantially parallel to each other and perpendicular to and rigidly connected to the hull sections 110 approximately equidistantly on either side of the center of each hull section 110. FIG. 22 shows an example of a truss 120. A deck 130 (also shown in FIGS. 23 and 38) is rigidly connected to and on top of each of the structural trusses 120 to provide a platform for various components including a control component 132 that contains some or all of the onboard processing and control hardware and logic (not explicitly shown), a sensor tower 134 and a communications mast 136 to permit one-way and/or two-way communications and remote control of the vehicle 100 using, for example, but not limited to, Radio Frequency (RF), broadband, satellite, and/or digital communication. The sensor tower 134 may include one or more of a variety of sensors, including, but not limited to, a visible light sensor, an infrared sensor, an optical sensor, a still camera, a video camera, an audio sensor, a chemical sensor, a gas sensor, a laser sensor, a biological sensor, an air sensor, a nuclear sensor, and a temperature sensor. In addition, other sensors, for example, but not limited to, radar, acoustic sonar sensors (both active and passive and either hull mounted or towed), salinity sensors, position sensors (e.g., Global Positioning System (GPS)) may be located on other parts of the vehicle. A towed delivery and recovery system may be affixed to a bottom side of the deck for covert delivery and recovery of autonomous sensors and/or other devices. The aforementioned sensors are not limited to being arranged on the sensor tower 134 and may be arranged at any suitable position on the vehicle 100.

Vehicle 100 also can include a reservoir 140 affixed to the top of the deck 130, or alternatively, it may also be affixed to a bottom of the deck 130 and associated therewith is a pump (not visible in FIG. 1, as it is positioned under the deck 130) that is attached to a water intake pipe 142 that extends downwardly and far enough away from the bottom of the deck 130 to be below the water line when the vehicle 100 is in water. The pump operates to fill the reservoir 140 so that the reservoir 140 may automatically supply water, such as seawater, to power supply units 150. Power supply units 150 may be, for example, a magnesium-air power unit 150. In the embodiment shown in for vehicle 100, the power supply units 150 can each produce about 2000 Watt-hours of power. As will be discussed later, the duration and quantity of power output by each power supply unit 150 can be increased or decreased based on the number of fuel cells (e.g., twelve, thirteen, etc.) in the power supply unit 150 and the size of the fuel cells (e.g., size of the anodes). Details of a power unit according to an embodiment of the present invention are provided below in relation to FIGS. 9 through 21. Note explicitly shown, vehicle 100 can include one or more batteries to provide power to components of the vehicle 100, such as the electric motors and propellers 160, sensors, a controller, etc. Power supply units 150 are to charge, recharge, or maintain an output of the one or more batteries. Optionally, power supply units 150 can provide power to some or all of the components of the vehicle 100, say, for example, if one or more of the batteries become inoperable.

Vehicle 100 also includes a pair of electric motors and propellers 160 mounted, one each, on a back end of each hull section 110 to provide for the propulsion and directional control of the vehicle 100 using, for example, but not limited to, differential steering or thrust displacement steering, since the vehicle 100 does not have any rudders. Thrust displacement steering involves the canting of each motor inwardly away from the longitudinal axis of each hull, for example, but not limited to about 5° inward. To turn the vehicle using thrust displacement steering, one motor is turned off, for example, if the right motor is turned off, the vehicle will turn to the right, and, if the left motor is turned off, the vehicle will turn to the left. The canting of the motors permits faster turns and in less space than with differential steering. Thrust displacement steering may cause a slight loss of inline thrust due to the canting of the motors. In general, the motors 160 will enable the vehicle to attain speeds of between 7 and 12 knots or more, especially in embodiments with three or more hulls where each hull has its own motor. Other optional features include a wireless, rotating motor control mechanism for steering; emergency/recovery features, including strobe light(s), emergency location broadcasting using a backup battery to transmit the vehicle's current GPS location; anti-theft systems that may disable the vehicle, emit a warning message, take photos and/or video of the thieves and transmit to the remote operator at the control center, and/or begin broadcasting a continuous locator beacon and/or GPS location message. Each motor and propeller 160 may be moveable such that it can be extended and retracted. Specifically, each motor and propeller 160 may be moved upward, into a hollowed out portion of its corresponding hull section 110, for example. The motors may be locked into this retracted position. Such feature may be advantageous for storage and transport of the vehicle 100. When in the water and ready for operation, the motors 160 can be moved downward to an extended position and locked into place for operation. Any suitable type of propeller or similar apparatus may be coupled to the motor for propulsion.

The vehicle 100 may optionally include a variety of lighting options, including, but not limited to, running lights, search lights, head lights, infrared lights, strobe lights, and the like to permit a variety of uses. In general, the vehicle 100 will not be required to have any lights, since it is shorter than the twelve foot minimum requirement set by the Coast Guard. The vehicle 100 may also have one or more below-deck mounted delivery and/or recovery system for autonomous systems, markers, and personnel. For those embodiments adapted to handle the delivery and/or recovery/rescue of personnel (e.g., divers, etc.) the propellers on the motors will generally be shrouded in a safety cage. In the embodiments designed to carry personnel (i.e., divers, etc.) it is also contemplated that a slightly larger deck area and/or area between the hulls will be provided. In addition, harnessing means may also be provided to enable the personnel to be attached to the vehicle 100 so they do not have to hold on with their hands, arms and/or legs.

FIGS. 5-8 show an autonomous aquatic vehicle 200 according to another embodiment of the present invention. Vehicle 200 is similar to vehicle 100, but does not include a sensor tower and communications mast. Vehicle 200 may be configured as a personnel transport to tow one or more persons and/or their equipment. Note, however, that vehicle 200 may have other means to send and/or receive communications as well as other sensors, including, but not limited to, sonar, radar, temperature, biological and/or chemical sensors, none of which are explicitly shown. Also not explicitly shown is a pump and reservoir.

Figure 26:
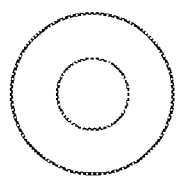
FIG. 26 is an O-Ring for sealing in accordance with an embodiment of the invention.
Figure 27A:
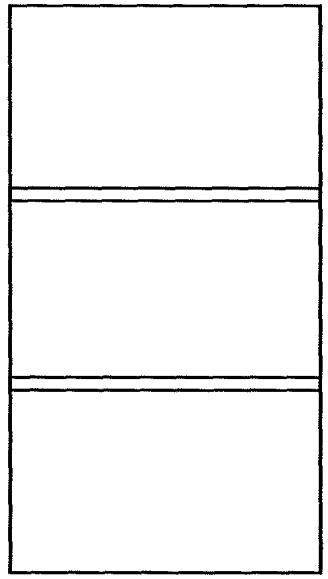
FIGS. 27A-H show various individual parts of and an assembled reservoir for holding and preconditioning water for use in the power unit of FIG. 9, in accordance with an embodiment of the invention.
Figure 27B:
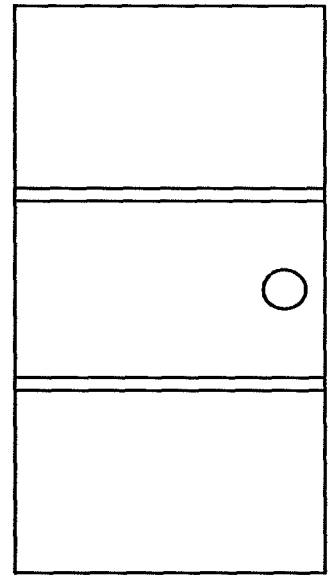
Figure 27C:
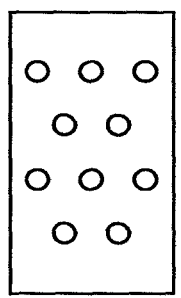
Figure 27D:
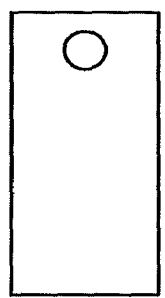
Figure 27E:
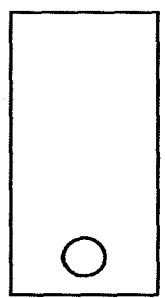
Figure 27F:
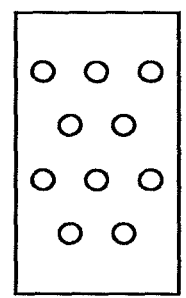
Figure 27G:
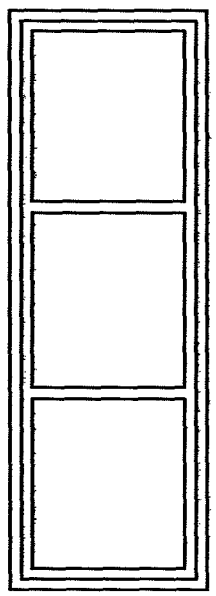
Figure 27H:
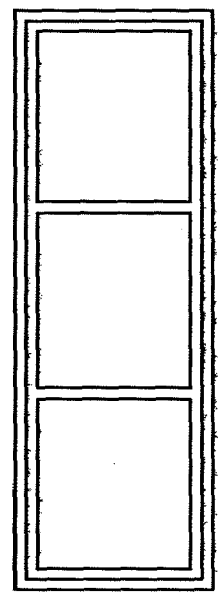

The electrical connections for the vehicles 100, 200 are substantially water resistant and water proof. An O-ring, such as that shown in FIG. 26 may be used.

A power unit 150 and a flush mechanism 151 are shown in FIGS. 9-21.

The power unit 150 and flush mechanism 151 can be housed a housing. The housing can have a plurality of apertures 158 to allow air or oxygen to access cathodes of the fuel cells 152 of the power unit 150. The power unit 150 can implement one or more anode and cathode pairs 152 (often referred to herein as individual fuel cells). A magnesium anode can be used, such as an anode made from AZ31B magnesium tooling plate. The cathode may be produced using a variety of methods including, but not limited to, those disclosed in the following U.S. Pat. No. 4,885,217, Air Cathodes and Materials Therefor, to Hoge; U.S. Pat. No. 4,906,535, Electrochemical Cathode and Materials Therefor, to Hoge; U.S. Pat. No. 5,032,473, Electrochemical Cathode, to Hoge; U.S. Pat. No. 5,053,375, Electrochemical Cathode and Materials Therefor, to Hoge. The entire content of each of the foregoing U.S. patents is hereby incorporated by reference into the present application.

In FIGS. 9-12, a flush mechanism 151 permits the fuel cells 152 of the power unit 150 to be drained separate and apart from being filled. The operation of the fuel cells 152 of the power unit 151 produces byproduct or waste product. For anodes comprised of magnesium, a slurry of MgOH is generated and can accumulate at the bottom of the power unit 150 and can foul the individual fuel cells and reduce the power output of the fuel cells if the MgOH is allowed to solidify. As seen in FIGS. 9-12, a housing of the flush mechanism 151 is shown cut away to reveal the internal elements. The flush mechanism 151 operates by being filled with water via fill tube 155 until the float is at a level where the stopper 157 securely seals the drain hole 154 in the bottom of the power unit 150. A weep tube 156 allows water to slowly drip out of the flush mechanism 151 and the power unit 150 until the float has dropped down to a level where the stopper 157 no longer seals the drain hole 154 and the slurry of MgOH and seawater from the power unit 150 can escape out the drain. Optionally, at about the same time the drain opens and the slurry begins draining out, the fill tube is opened and fresh, filtered water begins pouring back into the flush mechanism 151 until the float again reaches a height that causes the stopper 157 to seal the drain hole 154. At this point, the fill tube 155 is closed and the process begins again with the weep tube 156 allowing the water to slowly drip out. The byproduct or waste product from the anodes is allowed to exit through apertures 153 and out drain hole 154.

In general, the power unit is allowed to drain for about 2 seconds and then water from the reservoir is gravity fed into the power unit 150 to refill the power unit 150 to the appropriate level. Since there are two power units 150 for the vehicles 100, 200, they can be on a staggered schedule as to when they are drained, flushed, and refilled, so that the vehicle always has power from at least one power unit 150.

The discharge of the MgOH slurry is environmentally benign or neutral, as it has approximately the same pH as the water into which it is discharged, and it may naturally react with any heavy metals dissolved in the water to precipitate these metals out of the water. In general, the salinity of the water in the power unit 150 is between 3.5%-5%, with 5% being the most desirable. Furthermore, the waste or byproduct is substantially non-toxic to marine flora and fauna.

The reservoir may have three separate compartments separated by walls with limber holes drilled in them to prevent splashing and sloshing of the water when it is in the reservoir (see, e.g., FIGS. 27A-H). In general, the center compartment may contain salt to help adjust the salinity of the water before it is provided to the power unit. After water is provided to the power unit, a pump siphons water up and into the reservoir in preparation for the next flushing and refilling cycle.

Figure 28B:
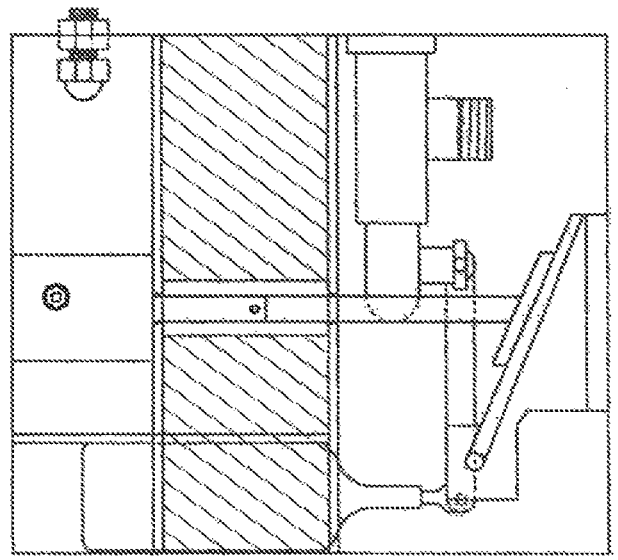
FIGS. 28A-B are top and side views, respectively, of a float box using a solenoid and timer in place of the weep and fill tube mechanism in the fuel cell unit of FIG. 9, in accordance with an embodiment of the invention.
Figure 28A:
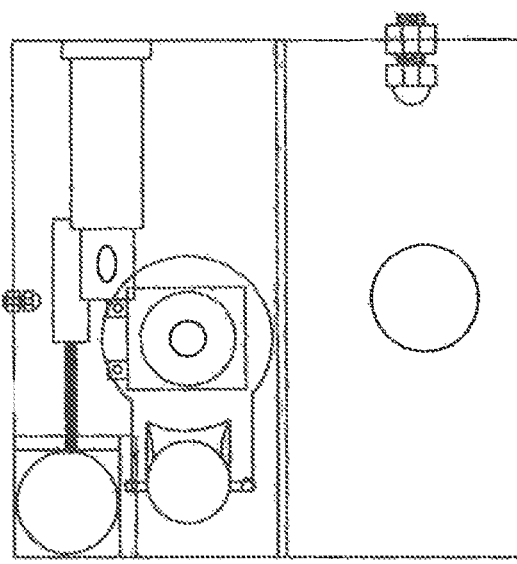
Figure 29A:
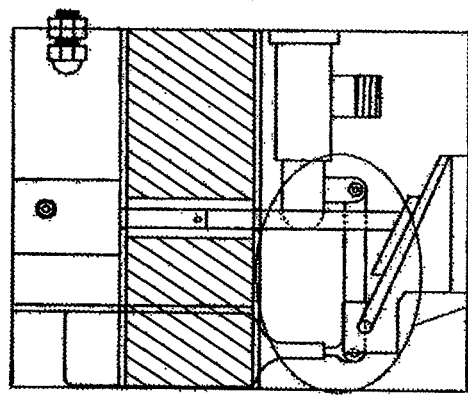
FIGS. 29A-C are a side view of the float box using the solenoid and timer of FIG. 28, and expanded views of coupling elements, respectively, in accordance with an embodiment of the invention.
Figure 29B:
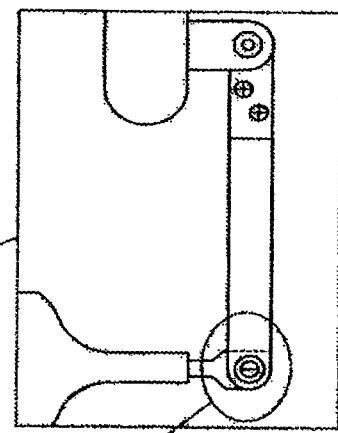
Figure 29C:
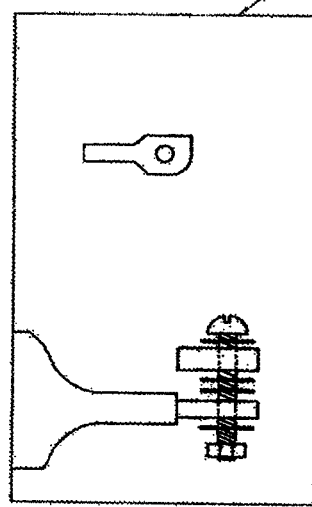
Figures 31C, 31D:
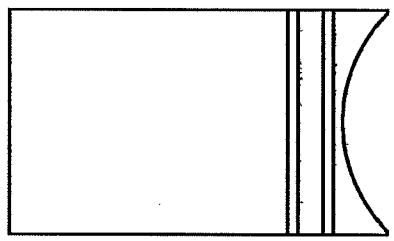
FIGS. 31A-E show side views of elements of the fuel cell unit, in accordance with an embodiment of the invention.
Figure 31E:
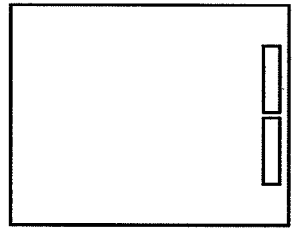
Figure 31C:
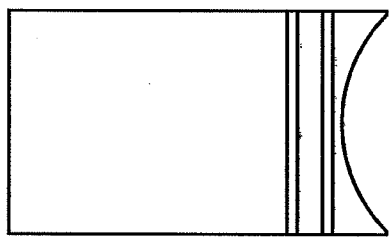
Figure 31A:
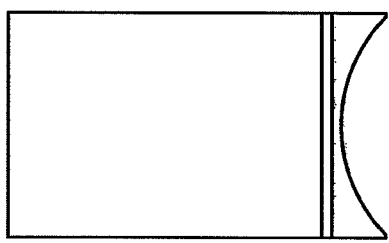
Figure 31B:
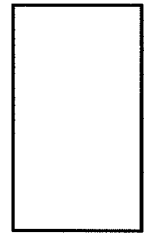
Figure 32C:
FIGS. 32A-E show bottom views of elements of the power unit, in accordance with an embodiment of the invention.
Figure 32B:
Figure 32A:
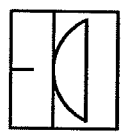
Figure 32D:
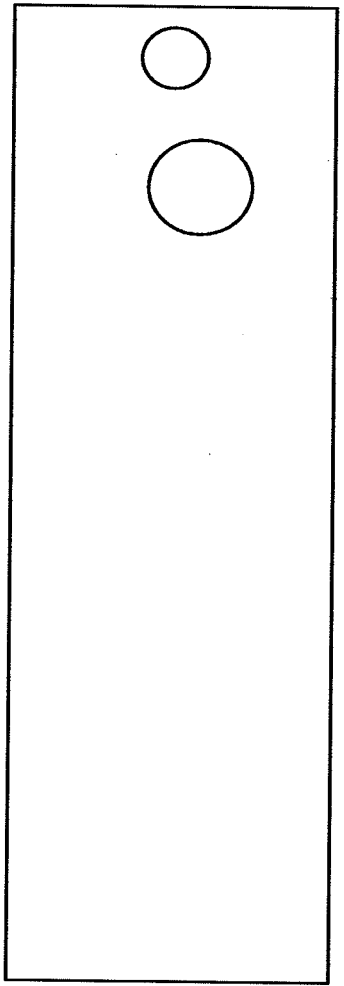
Figure 32E:
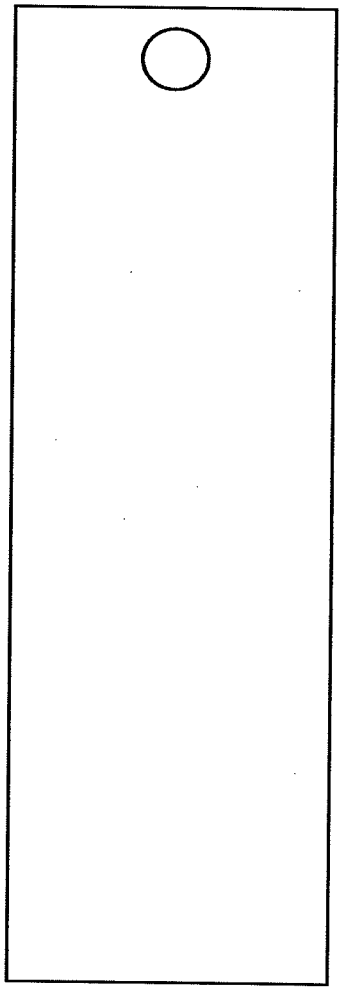
Figures 33C, 33E:
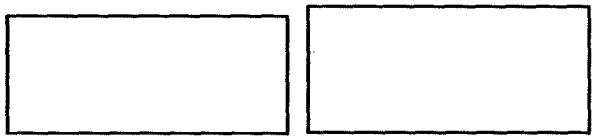
FIGS. 33A-E show various elements of the float box using the solenoid and timer of FIG. 28, in accordance with an embodiment of the invention.
Figures 33B, 33D:
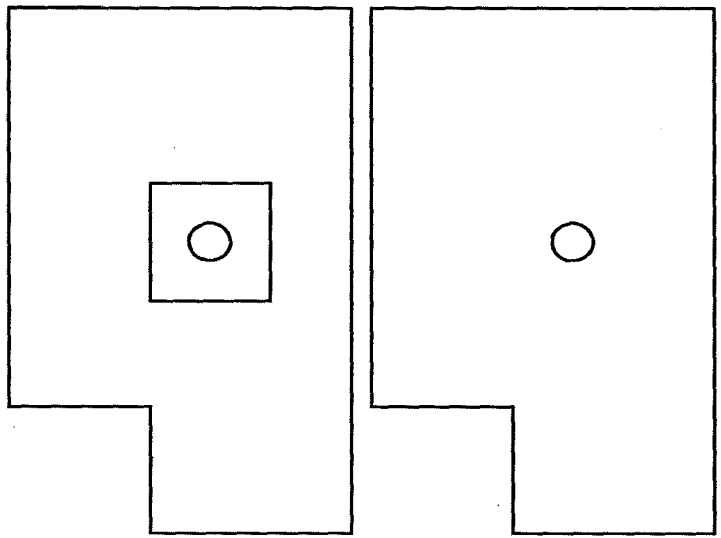
Figure 33A:
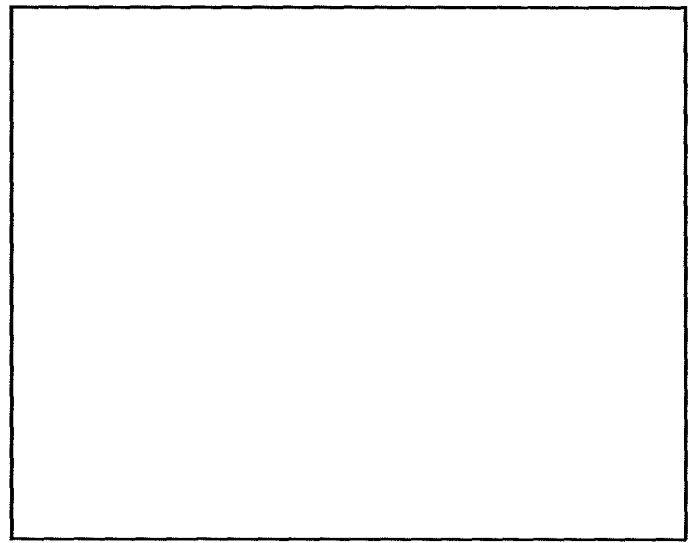
Figure 35A:
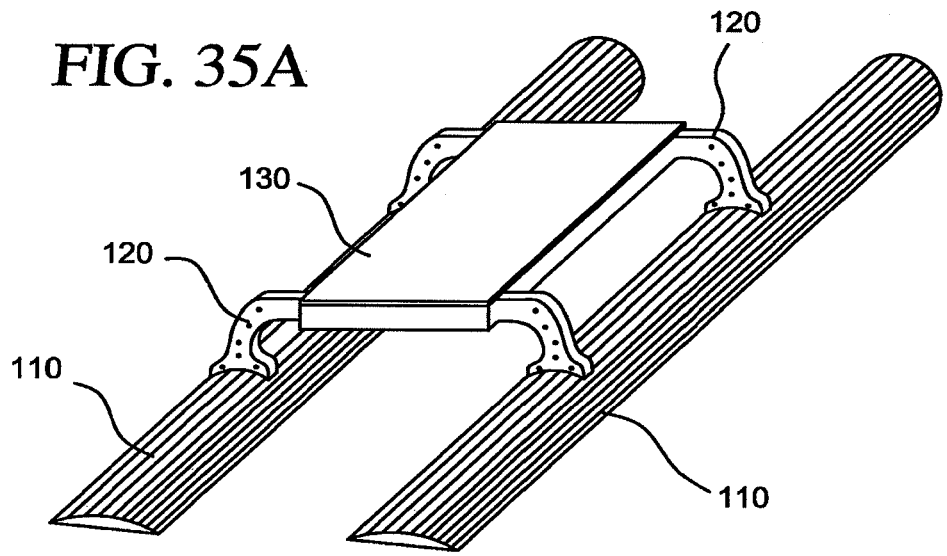
FIGS. 35A-D show perspective, overhead, side, and rear views, respectively, of basic parts of an autonomous aquatic surface vehicle, in accordance with another embodiment of the invention.
Figure 35C:
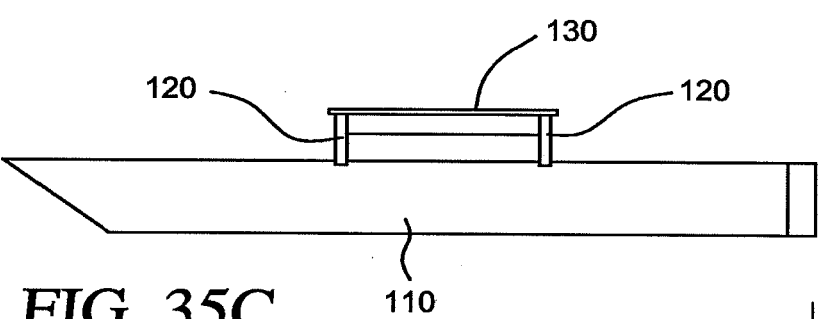
Figure 35D:
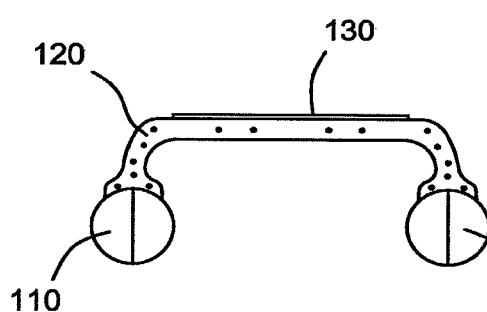
Figure 35B:
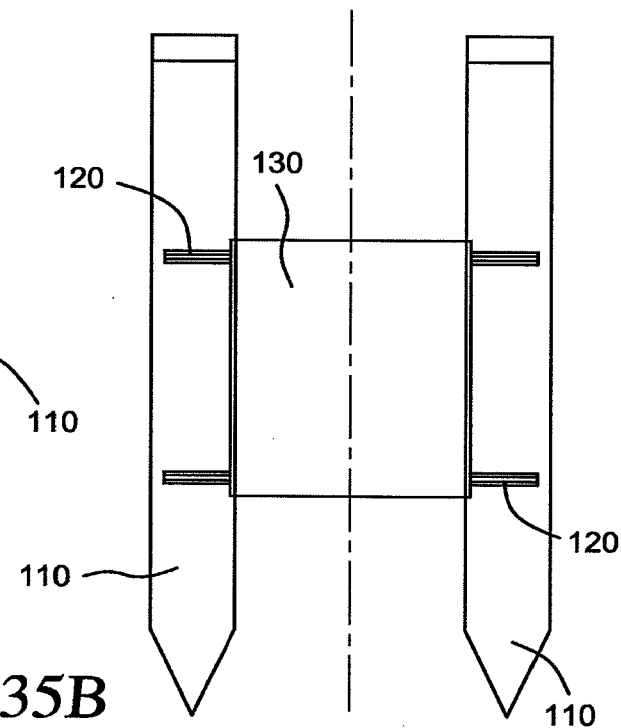
Figure 36A:
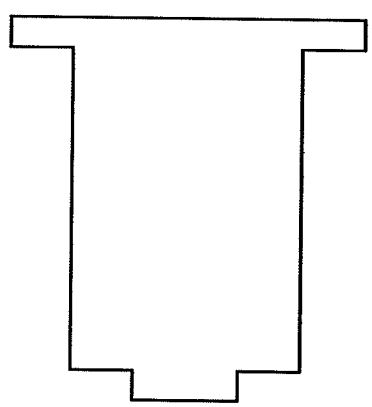
FIGS. 36A-E show an anode for use in the power unit, in accordance with an embodiment of the invention.
Figure 36B:
Figure 36C:
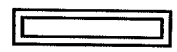
Figure 36D:
Figure 36E:
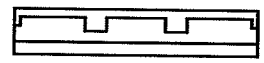

As an alternative a float box which uses a solenoid and timer may be used in place of the weep 156 and fill tube 155. FIGS. 28-30 show an example of a suitable float box.

Figure 54:
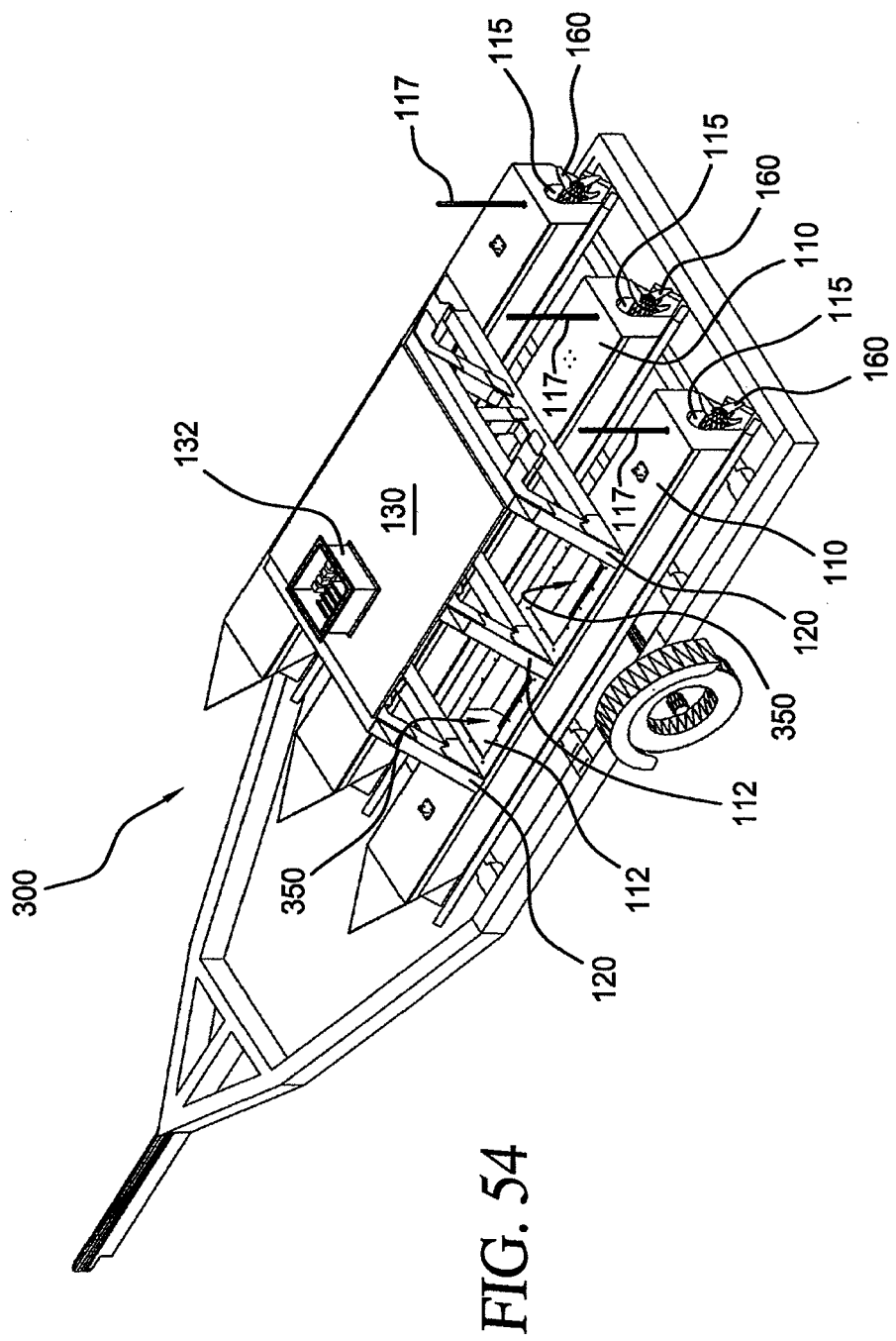
FIG. 54 is an overhead, rear perspective view of an aquatic surface vehicle, in accordance with yet another embodiment of the present invention.
Figure 55A:
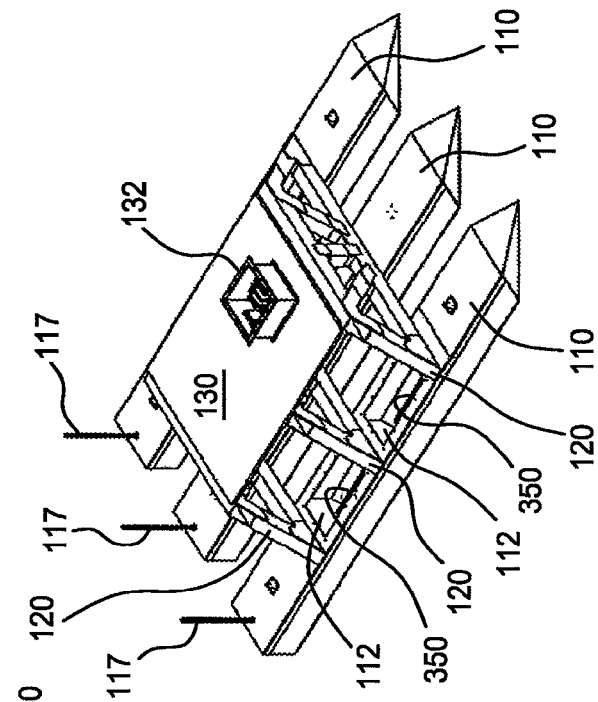
FIGS. 55A-B are front, overhead perspective and overhead views, respectively, of the aquatic surface vehicle of FIG. 54, in accordance with yet another embodiment of the present invention.
Figure 55B:
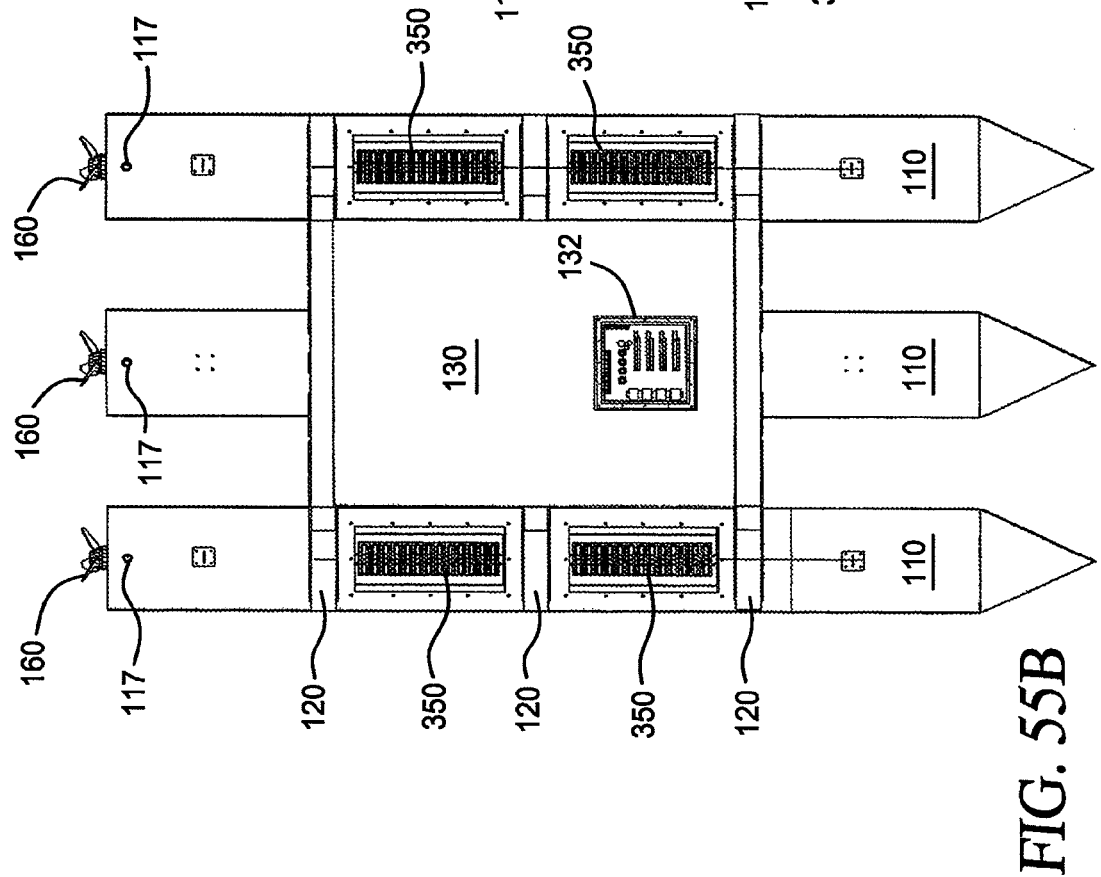

An aquatic vehicle or vessel 300 according to yet another embodiment of the present invention is shown in FIGS. 54, 55A, and 55B. Generally speaking, the vehicle 300 includes fuel cells that are placed in hull sections 110 such that seawater can freely enter a reaction portion of the fuel cell via apertures in the bottom of the hull sections 110, while keeping the exterior side of the cathode dry and in the necessary open air environment. In an alternative embodiment, anodes of fuel cells of outer hull sections 110 may be supplied with seawater by a pump, for example, located in the same hull section 110. Optionally, both a pump and apertures in the bottom of the hull section may be used to supply seawater.

As can be seen from FIGS. 54, 55A, and 55B, vehicle 300 is similar to vehicles 100 and 200 described above, but has three hull sections 110 and corresponding motors and propellers 160, as well as three trusses 120 coupled to the hull sections 110 and that support deck 130. Deck 130 supports control component 132, which is shown with its top cover removed. Stored in component 132 are electrical and electronic components, such as a controller, to control the vehicle 300 and/or receive signals from various vehicle sensors (sensors not explicitly shown). In addition, the hull design of vehicle 300 is pentagonal in cross-section to allow for increased submersed area of the hull, as well as for decreased draft of the vehicle 300. The hull can be made of any suitable material, such as thermoformed and/or welded thermoplastic resin, such as polymerized vinyl chloride (i.e., PVC).

The middle hull section 110 can house one or more batteries (not explicitly shown). Access to the one or more batteries may be provided via a door or panel with a water-proof or water resistant seal to prevent unwanted moister or water from entering. The middle hull section 110 also may have a semi-permeable membrane or other access means that allows air or oxygen into the battery compartment. An interior of the middle hull section can be filled with a buoyant material, such as foam, to assist with keeping the vehicle 300 afloat. Optionally, the middle hull section can include a ballast system, also to assist with buoyancy and/or stability. At a back end of the middle hull section 110, a rod member 117 extends from the top of the hull section 110 through the hull section and is coupled to an electric motor and propeller 160.

Figure 60:
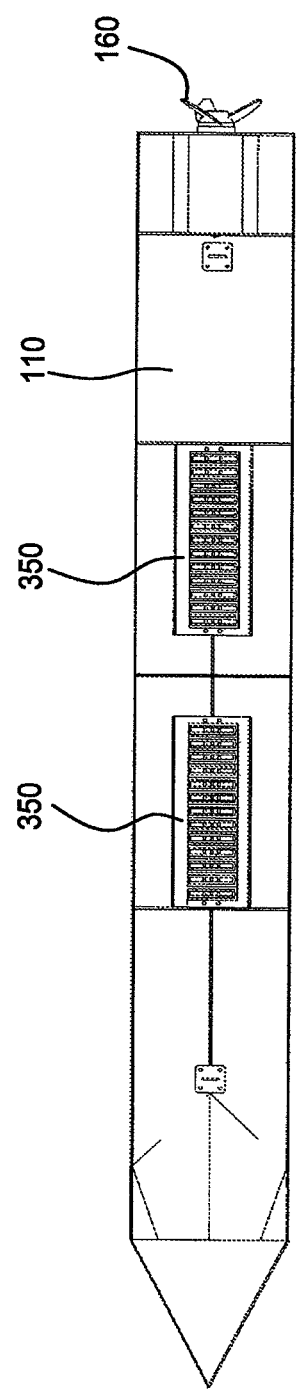
FIG. 60 is an overhead view of a hull with a plurality of power units arranged therein, in accordance with an embodiment of the present invention.

Outer hull sections 110, shown in FIG. 60, for example, are similar in shape to the inner hull section. The outer hull sections 110, however, differ from the inner hull section in that each includes at least one power unit 350. Each of the outer hull sections 110 may have one or more ring or loop mechanisms arranged thereon (shown but not explicitly numbered). Such rings or loop mechanisms may be used to couple equipment to the hull sections 110. Each of the outer hull sections 110 of the vehicle 300 includes two power units 350, as can be seen from FIGS. 54, 55A, and 55B. Access to the power units 350 is provided via openings 112 in the top side of the hull sections 110. The openings can be covered by respective panels similar to the panel 113 shown in FIGS. 34B and 34C. The panel 113 can have one or more semi-permeable membranes 13, such as diaphragms, that selectively allow a material to enter the inner cavity of the hull section 110 where the power unit 350 resides, but disallow another material from entering the inner cavity. For example, the semi-permeable membrane 13 may allow air or oxygen to enter the cavity for operation of the fuel cells (i.e., for use by the cathodes of the fuel cells), but can disallow moisture or water, such as seawater from entering. FIG. 34B shows three semi-permeable membranes 13, but any suitable number of membranes can be implemented. Means other than a membrane may be used to allow air or oxygen to reach the cathodes of the fuel cells.

Each motor and propeller 160 may be moveable such that it can be extended and retracted. Specifically, each motor 160 may be moved upward by way of rod member 117 into a hollowed out portion 115 of its corresponding hull section 110, for example. The motors and propellers 160 may be locked into this retracted position. Such feature may be advantageous for storage and transport of the vehicle 100. When in the water and ready for operation, the motors and propellers 160 can be moved downward to an extended position and locked into place for operation. The motors and propellers shown in FIG. 54, for example, are in the retracted position.

Figure 56:
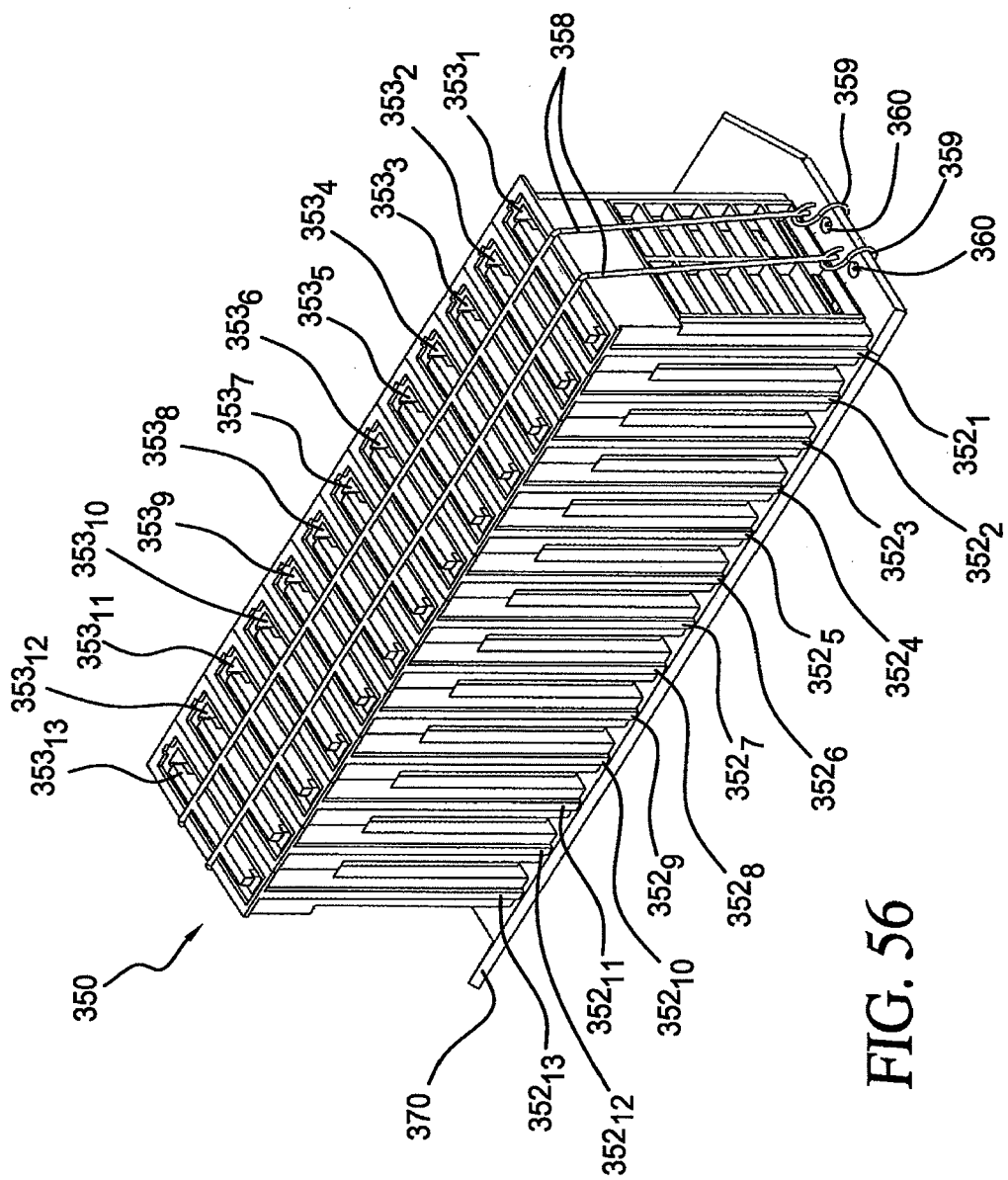
FIG. 56 is a perspective view of a power unit with support tray and retaining bracket configured for normal use, in accordance with an embodiment of the present invention.
Figure 57:
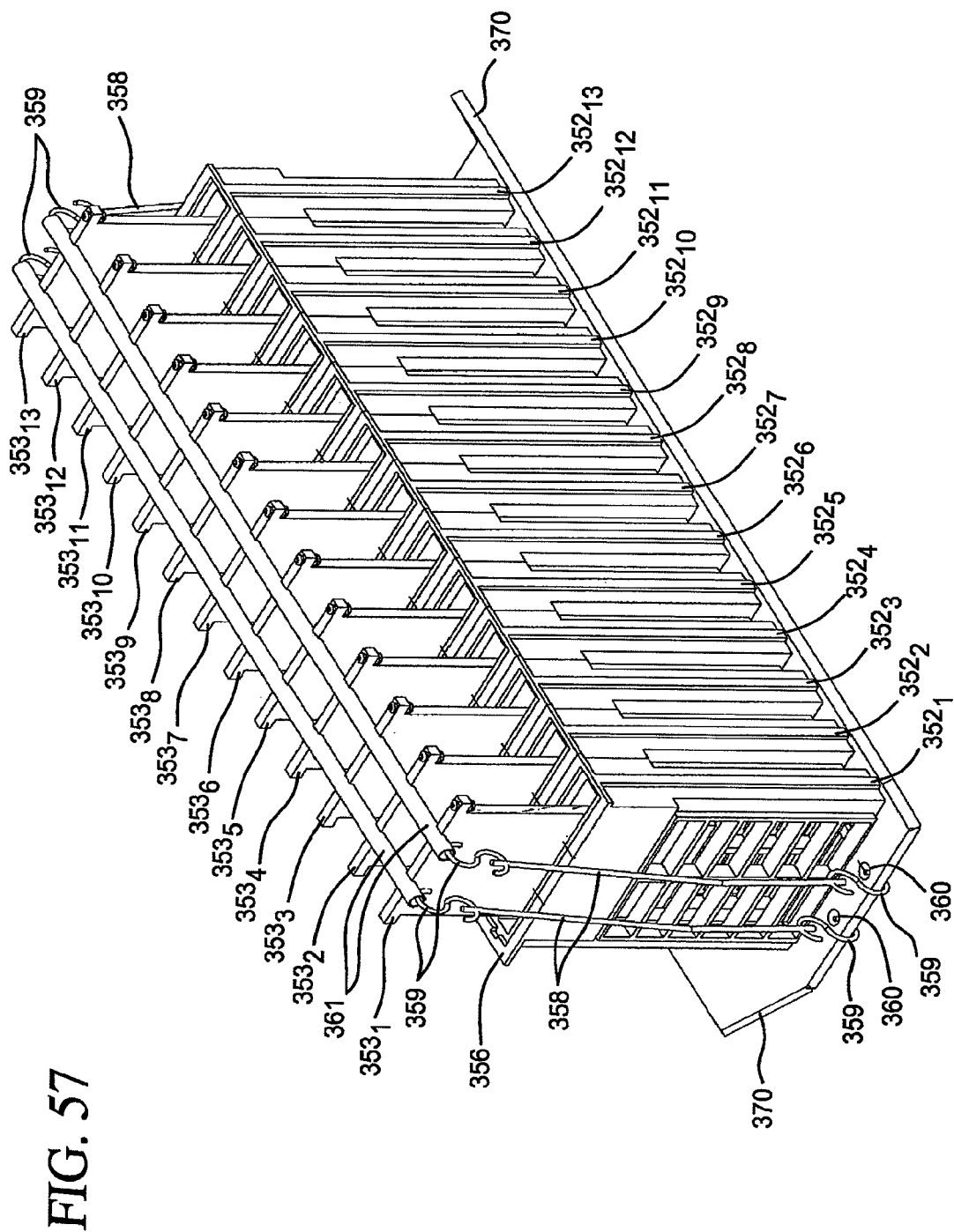
FIG. 57 is an overhead perspective view of a power unit configured for extended use, in accordance with an embodiment of the present invention.
Figure 58B:
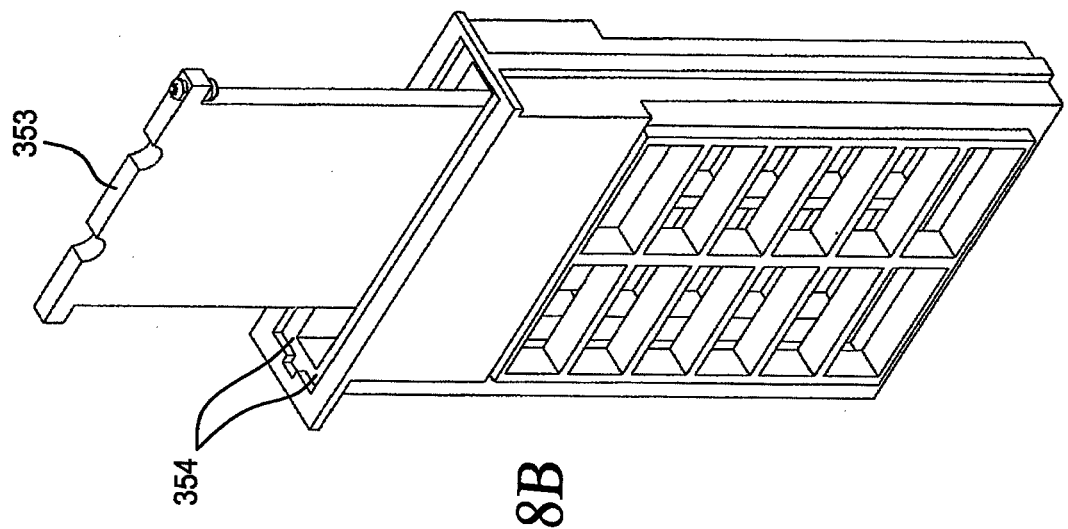
FIGS. 58A-B show an individual fuel cell arrangement showing normal and extended use anodes, respectively, in accordance with an embodiment of the present invention.
Figure 58A:
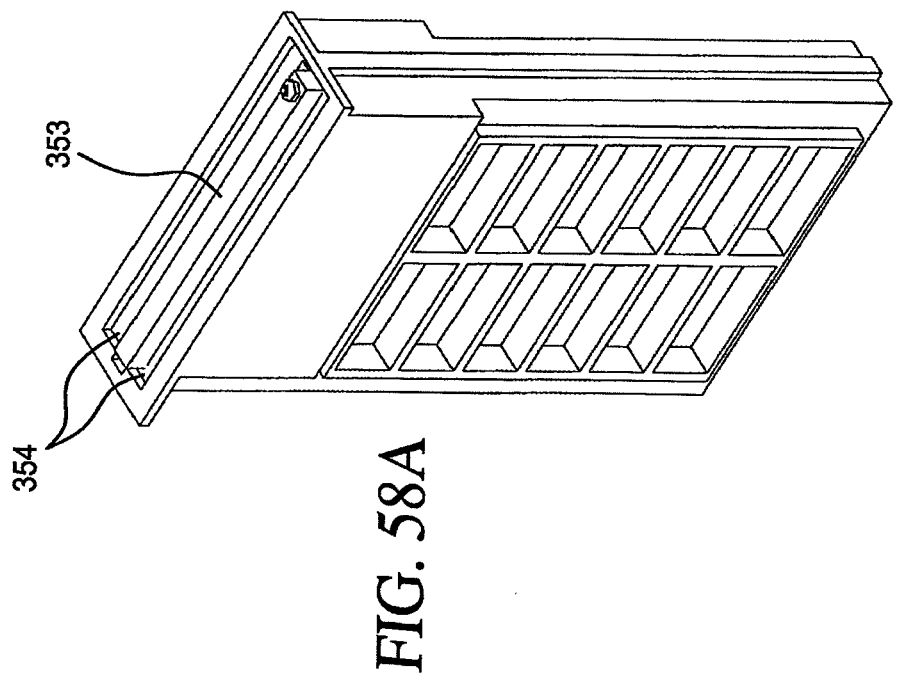

FIG. 56 is an overhead perspective view of a power unit 350 with support tray 370 and retaining bracket 358 configured for normal use, in accordance with an embodiment of the present invention. FIG. 58A also shows an individual fuel cell for normal use. FIGS. 57 and 58B show a power unit 350 configured for extended use and an individual cell for extended use, respectively.

Power unit 350, in the form of a fuel cell, for example, includes a plurality of anode-cathode pairs $352_{1-13}$. The anodes are shown at $353_{1-13}$ and surrounded by cathodes 354. Each individual fuel cell is sealed to hold seawater in an inner void portion into which the anode 353 is placed for operation and interaction with the seawater. A top portion of each fuel cell is open to permit air to contact the cathode 354.

Optionally, the top of the fuel cell (or each individual fuel cell) may be covered after placement of the anodes into the respective inner void portions. Such capping can be done using a semi- or selectively-permeable membrane that still allows air to reach the cathodes, but prevents seawater in the inner void portion from exiting the top of the fuel cell and contacting the cathodes or other portions of the fuel cell not intended to be exposed to seawater. If a semi-permeable membrane is not implemented, a pump, such as bilge pump, may be implemented in each of the outer hull sections 110 to remove seawater that inadvertently exits from the top of the fuel cell and into the fuel cell compartment of the hull section 110.

Preferably, the sea water level in the inner void portions of the fuel cells will not rise above the top of the fuel cells. The buoyancy of the hull sections 110, and thus the point to which the water is preferred to rise, can be modified by adding additional buoyant material to the interior of the hulls (e.g., foam material, air, etc.), or, if a ballast system is implemented, ballast may be added or removed to modify the water level of the fuel cells. The ballast system can be implemented in only the middle hull section, only the outer hull sections, or in all three hull sections 110.

Each fuel cell includes a plurality of contact terminals associated with the anode and cathode respectively (not explicitly shown in FIGS. 56-58). The fuel cell is electrically coupled to one or more batteries of the vehicle 300 via the contact terminals and provides power to the battery or batteries to charge, recharge, and/or maintain a desired output level of the battery or batteries. Less than all of the fuel cells may be coupled to a particular battery for supply of power thereto. Alternatively, all of the fuel cells may be coupled to a particular batter for supply of power thereto.

Figure 61:
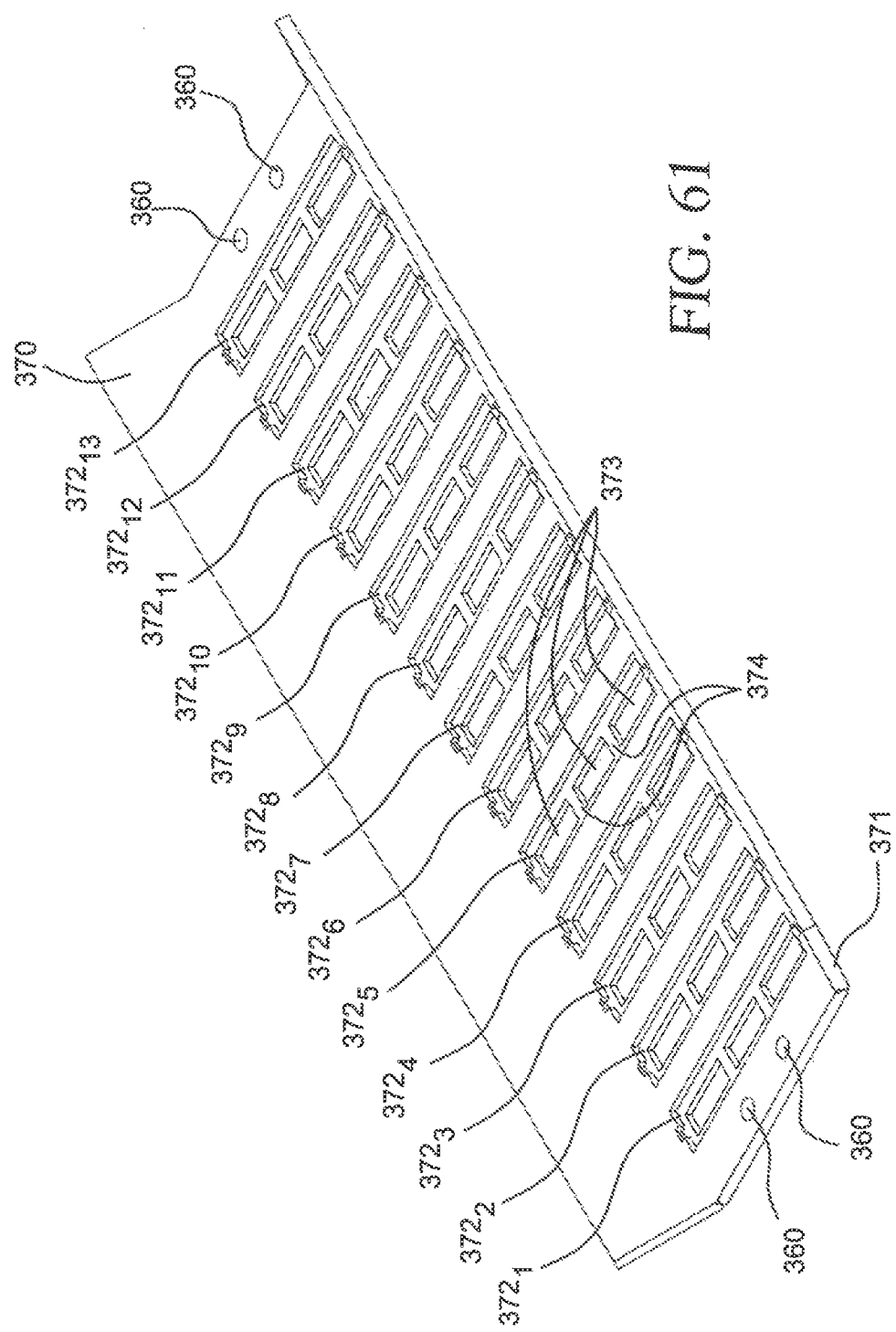
FIG. 61 is an overhead perspective view of a support tray for a power unit, in accordance with an embodiment of the present invention.

Turning to FIG. 61, the support tray 370 includes a plurality of openings 360 and support portions $372_{1-13}$. Support portions 372 are configured to allow the individual fuel cells to be seated therein. The support portions 372 also include a plurality of apertures 373 formed by a plurality of ribs 374. The apertures allow seawater to access the inner void portions of the fuel cells and thus the anodes 353 lying therein. The ribs 374 can provide a support area upon which the anode 353 can rest. Holes 360 are configured to receive coupling means 359 to couple the support tray 370 to the retaining means 358. The retaining means 358 can be used to prevent the anodes 353 from exiting the top end of the fuel cell. The retaining means 358 can be any suitable means for retaining the anodes, such as an elastic rope, a wire, a string, a cover, a semi-permeable membrane, etc.

FIG. 56, for example, shows two wires arranged over the top of the fuel cells and coupled at opposite ends of the support tray 370 via respective holes 360 and coupling means 359. The coupling means 359 are shown as S-clips, but any suitable coupling means may be used to secure the retaining means 358 to the support tray 370, such as posts, latches, etc. A semi- or selectively-permeable cap or cover (not shown) may be placed over the top of the fuel cell either before or after the retaining means 358 is implemented. Furthermore, the anodes may be coupled to the fuel cells using a screw or other suitable fastening means, such that they are arranged in respective inner void portions of the fuel cells. Alternatively, the anodes may merely rest on the ribs of the support tray 370.

FIG. 57 is an overhead perspective view of a power unit configured for extended use, in accordance with an embodiment of the present invention. The power unit shown in FIG. 57 is similar to that shown in FIG. 56, but includes anodes 353 of greater length. As can be seen, the anodes project from the top of the fuel cells. This particular configuration is referred to as extended use because of the anodes length. Because more anode is provided, the anode will take longer to fully react and dissolve in the seawater and, thus, the longer output for the fuel cell. The anodes are held in place and forced, i.e., biased, downward as they are gradually spent by a tension means. In this instance, the tension means includes elastic retaining means 358 coupled to the support tray 370 via respective holes 360 and coupling means 359. Across the tops of the anodes are hollow, non-conductive rods 361. As the anodes 353 are used up, the elastic retaining means 358 provides a constant downward force by the rods 361 on the anodes to feed the anodes downward into the fuel cell. A body portion of the anode can rest on the ribs 374 of the support tray 370 until sacrificial ablation makes the anode small enough to exit through the apertures 373.

Figure 59:
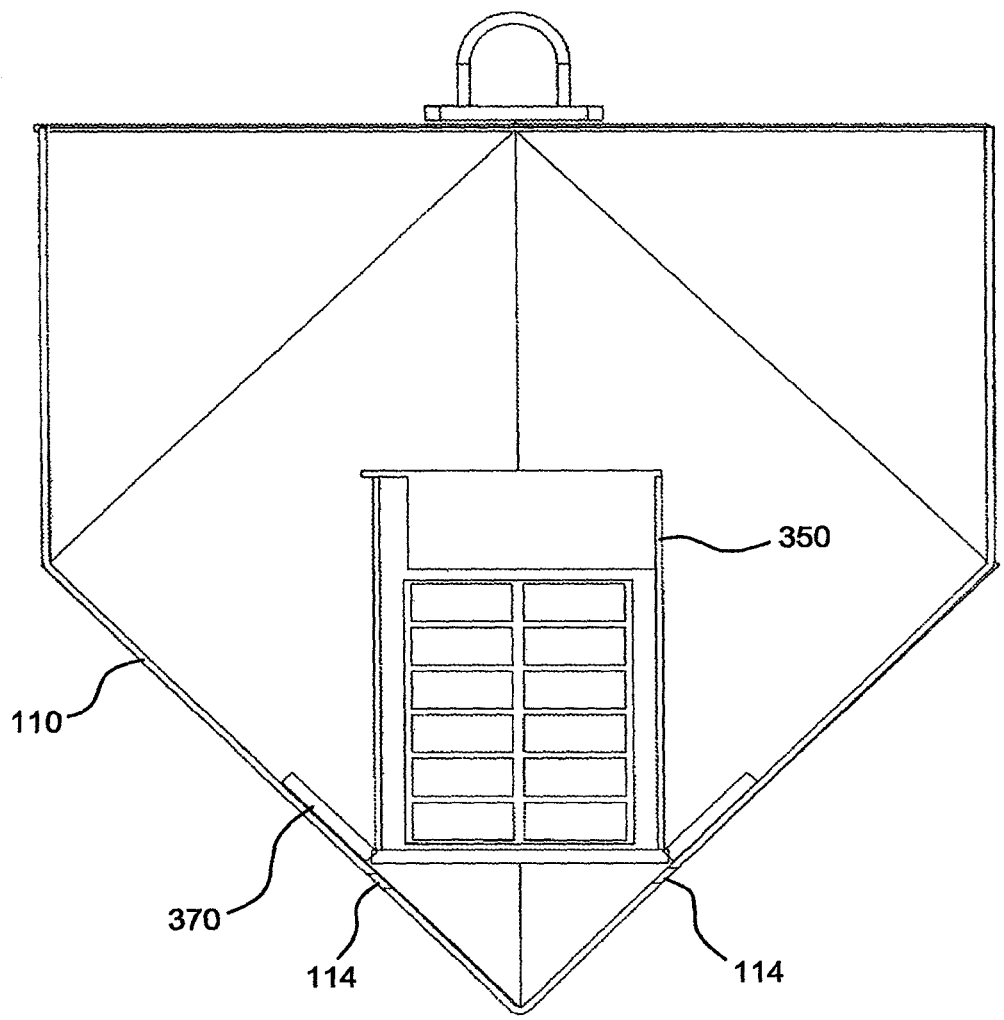
FIG. 59 is a cross sectional view of a hull with a power unit and support tray arranged therein, in accordance with an embodiment of the present invention.

Turning to FIG. 59, which shows a cross section of an outer hull section 110, the power unit 350 is coupled to the support tray 370 and flared edges 371 of the support tray are coupled to the an interior portion of the hull section 110. The flared edges 371 can be sealingly affixed to the hull section 110 by welding, for example. Such sealingly affixing the support tray 370 to the hull section 110 can create a water-tight seal in which seawater can only enter the fuel cells via the central inner void portion of each cell where the anode resides.

Hull section 110 includes one or more holes, openings, or apertures 114. The apertures 114 can be of any suitable number, of any suitable configuration, and of any suitable arrangement. For example, though not explicitly shown, in FIG. 59, a plurality of apertures 114 are located on each side of the bottom vertex of the hull section 110. Furthermore, the apertures 114 run linearly from front to back along the hull section 114 and correspond in number to the number of fuel cells (e.g., thirteen). Some or all of the apertures 114 can be the same size and configuration.

Apertures 114 are configured to allow seawater to enter into a desired inner portion of the hull section 100. The seawater then passes through the apertures 373 of the support tray 370 and up into the inner central voids of the fuel cells for interaction with the anodes arranged therein. Apertures 114 are further configured to allow a byproduct or waste product created by the interaction between the seawater and the anodes to exit the hull section 114.

Apertures 114 may be configured to facilitate entry of seawater into the hull section 110. For example, one or more of the apertures 114 may be configured as a scoop or a funnel to direct seawater into the desired portion of the interior of the hull section 110. Similarly, one or more of the apertures may be configured to facilitate the removal of the byproduct or waste. For example, the hull and/or an aperture 114 thereof may be configured to create a vortex, whirlpool, or other dynamic fluid pattern to facilitate removal of byproduct or waste.

Optionally, the hull section 110 may include a regulator (not shown) for the apertures 114. The regulator may permit seawater to enter through the corresponding aperture, but prevent unwanted foreign objects, such as seaweed, fish, rocks, shells, etc. from entering. The regulator also allows the waste or byproduct of the anodes to exit through the aperture 114. Examples of a regulator include a loose mesh sheet, a wire filter, etc. The regulator may be placed on the inside or outside of the hull in correspondence with the aperture 114.

Figure 62A:
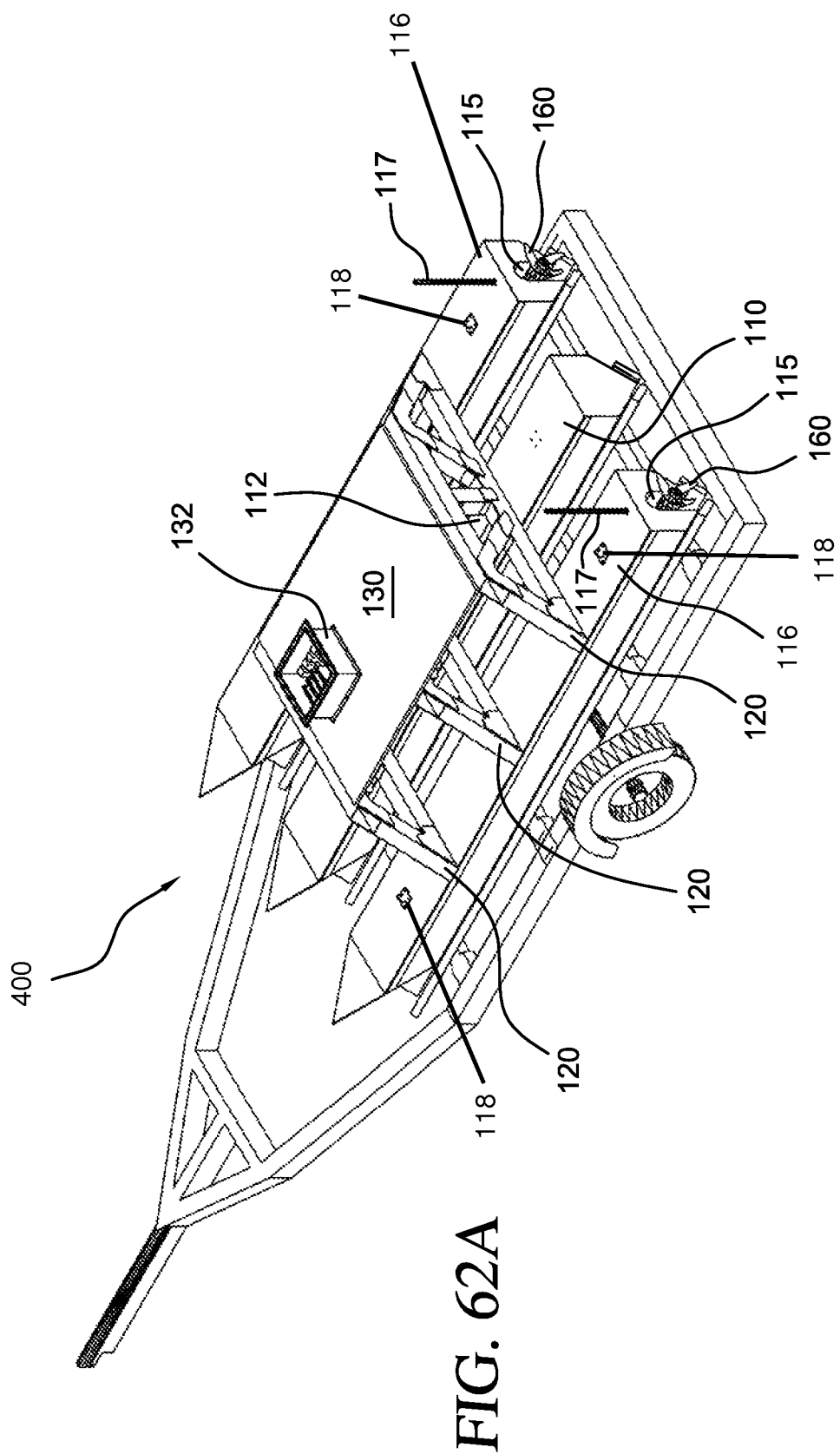
FIG. 62A is an overhead, rear perspective view of an aquatic surface vehicle on a trailer in accordance with yet another embodiment of the present invention.
Figure 63:
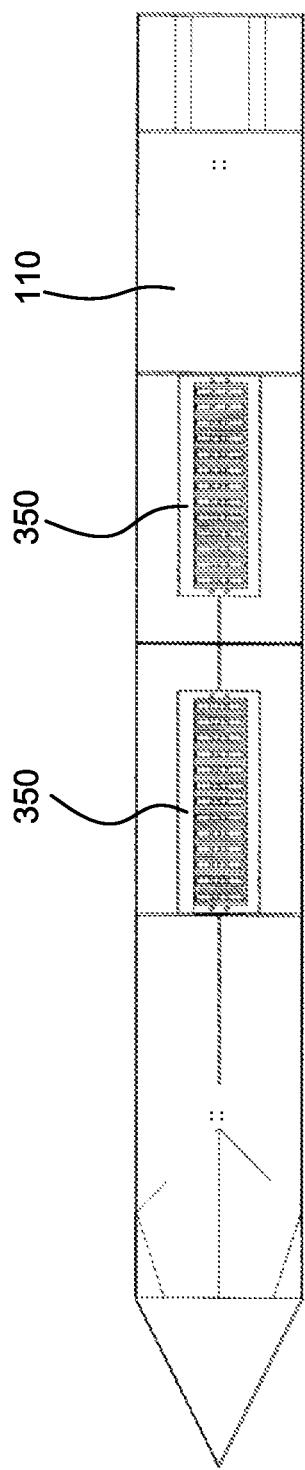
FIG. 63 is an overhead view of a hull with a plurality of power units arranged therein, in accordance with another embodiment of the present invention.

FIGS. 62A-63 show an aquatic vehicle or vessel 400 according to yet another embodiment of the present invention, with FIG. 62A showing an overhead, rear perspective view of an aquatic surface vehicle on a trailer in accordance with yet another embodiment of the present invention, FIGS. 62B and 62C showing overhead and front, overhead perspective views, respectively, of the aquatic surface vehicle of FIG. 62A, and FIG. 63 showing an overhead view of a hull with a plurality of power units arranged therein.

Generally speaking, the vehicle 400 includes fuel cells that are placed in the middle hull of the hull sections 110 shown in FIGS. 62A-62C such that seawater can freely enter a reaction portion of the fuel cell via apertures in the bottom of the middle hull section, while keeping an exterior side of the cathode dry and in an open air environment. In an alternative embodiment, anodes of fuel cells of the middle hull section 110 may be supplied with seawater by a pump, for example, located in the middle hull section 110 or in either or both outer hull sections 116. Optionally, both a pump and apertures in the bottom of the middle hull section 110 may be used to supply seawater.

As can be seen from FIGS. 62A-62C, vehicle 400 is similar to vehicle 300 described above in relation to FIGS. 54, 55A and 55B, but does not include a motor and corresponding propulsion apparatus (e.g., a propeller) operatively coupled to the middle hull section 110. Only the outer hull sections 116 have motors and corresponding propulsion apparatuses. Additionally, the outer hull sections 116 do not have fuel cells as set forth herein. Only the middle hull section 110 has fuel cells, corresponding apertures in the hull, etc. as set forth herein. Further, optionally, only middle hull section 110 can have the prime movers, e.g., the batteries and fuel cells. Alternatively, one or more batteries may be in the outer hull sections 116 and one or more fuel cells in the middle hull section 110.

Deck 130 supports control component 132, which is shown with its top cover removed. Stored in component 132 are electrical and electronic components, such as a controller, to control the vehicle 400 and/or receive signals from various vehicle sensors (sensors not explicitly shown). In addition, the hull design of vehicle 400 is pentagonal in cross-section to allow for increased submersed area of the hull, as well as for decreased draft of the vehicle 400. Of course other configurations are contemplated, for example, but not limited to, the hull configuration shown in FIG. 1 or a variation thereof. The hull can be made of any suitable material, such as thermoformed and/or welded thermoplastic resin, such as polymerized vinyl chloride (i.e., PVC). Moreover, optionally, middle hull section 110 can be of a different size and/or shape from outer hull sections 116. For instance, middle hull section 110 may be longer and/or wider than outer hull sections 116. For example, the middle hull section 110 may be at or about six inches longer than outer hull sections 116.

The middle hull section 110 can house one or more batteries (not explicitly shown). Optionally or alternatively, one or more of the outer hull sections 116 can also house one or more batteries, for example 150A marine batteries. Access to the one or more batteries may be provided via a door or panel with a water-proof or water resistant seal to prevent unwanted moister or water from entering. The hull sections 110, 116 also may have a semi-permeable membrane or other access means that allows air or oxygen into the battery compartment. An interior of the hull sections 110, 116 can be filled with a buoyant material, such as foam, to assist with keeping the vehicle 400 afloat. Optionally, one or more of the hull sections 110, 116 can include a ballast system, also to assist with buoyancy and/or stability.

Outer hull sections 116, shown in FIG. 62B, for example, are similar in shape to the inner hull section. The outer hull sections 116, however, differ from the inner hull section in that each does not include at least one power unit 350, whereas the middle hull section does include at least one power unit 350. Each of the outer hull sections 110 may have one or more ring or loop mechanisms arranged thereon 118. Such rings or loop mechanisms may be used to couple equipment to the outer hull sections 116. The middle hull section 110 of the vehicle 400 can include multiple power units 350, such as two power units 350, as can be seen from FIGS. 62B and 63. Access to the power units 350 may be provided via corresponding openings in the top side of the middle hull section 110. The openings can be covered by respective panels similar to the panel 113 shown in FIGS. 34B and 34C. The panel 113 can have one or more semi-permeable membranes 13, such as diaphragms, that selectively allow a material to enter the inner cavity of the middle hull section 110 where the power unit 350 resides, but disallow another material from entering the inner cavity. For example, the semi-permeable membrane 13 may allow air or oxygen to enter the cavity for operation of the fuel cells (i.e., for use by the cathodes of the fuel cells), but can disallow moisture or water, such as seawater from entering. FIG. 34B shows three semi-permeable membranes 13, but any suitable number of membranes can be implemented. Means other than a membrane may be used to allow air or oxygen to reach the cathodes of the fuel cells.

Each motor and propeller 160 may be moveable such that it can be extended and retracted. Specifically, each motor 160 may be moved upward by way of rod member 117 into a hollowed out portion 115 of its corresponding hull section 110, for example. The motors and propellers 160 may be locked into this retracted position. Such feature may be advantageous for storage and transport of the vehicle 400. When in the water and ready for operation, the motors and propellers 160 can be moved downward to an extended position and locked into place for operation. The motors and propellers shown in FIG. 62A, for example, are in the retracted position.

Each fuel cell can include one or more contact terminals associated with the anode and cathode respectively. The fuel cell is electrically coupled to one or more batteries of the vehicle 400 via the contact terminals and provides power to the battery or batteries to charge, recharge, and/or maintain a desired output level of the battery or batteries. Less than all of the fuel cells may be coupled to a particular battery for supply of power thereto. Alternatively, all of the fuel cells may be coupled to a particular batter for supply of power thereto.

FIG. 63 shows a top view of the middle hull section 110 according for use with vehicle 400. As can be seen, middle hull section 110 can have two power units 350. Alternatively, middle hull section 110 can have one or more than two power units 350. Middle hull section 110 includes one or more holes, openings, or apertures of any suitable number, of any suitable configuration, and of any suitable arrangement. For example, though not explicitly shown, in FIG. 63, a plurality of apertures, similar to or the same as apertures 114 in FIG. 59, may be located on each side of the bottom vertex of the middle hull section 110. Furthermore, the apertures can run linearly from front to back along the middle hull section and correspond in number to the number of fuel cells (e.g., thirteen). Some or all of the apertures can be the same size and configuration.

The apertures are configured to allow seawater to enter into a desired inner portion of the middle hull section 110. The seawater then passes through the apertures of a support tray, for instance, and up into the inner central voids of the fuel cells for interaction with the anodes arranged therein. Some or all of the apertures are further configured to allow a byproduct or waste product created by the interaction between the seawater and the anodes to exit the middle hull section 110.

Some or all of the apertures may be configured to facilitate entry of seawater into the middle hull section 110. For example, one or more of the apertures may be configured as a scoop or a funnel to direct seawater into the desired portion of the interior of the middle hull section 110. Similarly, one or more of the apertures may be configured to facilitate the removal of the byproduct or waste. For example, the middle hull and/or one or more of the apertures thereof may be configured to create a vortex, whirlpool, or other dynamic fluid pattern to facilitate removal of byproduct or waste.

Optionally, the middle hull section 110 may include a regulator (not shown) for the apertures. The regulator may permit seawater to enter through the corresponding aperture, but prevent unwanted foreign objects, such as seaweed, fish, rocks, shells, etc. from entering. The regulator also allows the waste or byproduct of the anodes to exit through the apertures. Examples of a regulator include a loose mesh sheet, a wire filter, etc. The regulator may be placed on the inside or outside of the middle hull section in correspondence with one or more of the apertures.

Optionally, the middle hull section 110 may be removably coupled to corresponding truss portions 120. For instance, the middle hull section 110 may be removably coupled via bolts, a sliding locking mechanism, such as a rail or rails snap fit mechanisms, etc., and/or latches that may rotate 180 degrees, for instance, to form "permanent" latches (until, of course the middle hull section 110 is to be removed). The middle hull section 110 may be removed from the vessel, for instance, when the anode or anodes have been partially or fully depleted or need to be substituted for a longer or shorter mission or for another reason, such as a component or components of the middle hull section are malfunctioning or inoperable. The middle hull section 110 may be removed within a predetermined time period, for instance, within thirty minutes or less. Further, the middle hull section 110 may be replaced with another middle hull section 110 or the same configuration or a different configuration. In embodiments, the removal and replacement of middle hull sections may be within thirty minutes or less, within twenty minutes or less, within fifteen minutes, or within ten minutes or less.

In accordance with an embodiment of the present invention, an autonomous surface vehicle as substantially shown and described herein.

In accordance with another embodiment of the present invention, an autonomous surface vehicle system as substantially shown and described herein.

In accordance with an embodiment of the present invention, an autonomous surface vehicle method as substantially shown and described herein.

In accordance with an embodiment of the present invention, an autonomous surface vehicle means as substantially shown and described herein.

The invention having been described in certain embodiments, it will be apparent to those skilled in the art that many changes and alterations can be made without departing from the spirit or essential characteristics of the invention. Accordingly, Applicant intends to embrace all such alternatives, modifications, equivalents and variations that are within the spirit and scope of this invention.

What is claimed is:

1. A buoyant autonomous aquatic vehicle comprising:
a base portion;
a controller to control autonomous operations of the aquatic vehicle, said controller being arranged on said base portion;
one or more sensors;
a power source to supply power for the aquatic vehicle;
a fuel cell device to supply power to said power source for recharging said power source, said fuel cell device including a plurality of anode/cathode pairs;
a first partially submersible hull;
a second partially submersible hull, said fuel cell device being housed by said second hull, and said second hull having a plurality of apertures arranged on a bottom side thereof to allow entry of seawater to react with anodes of said fuel cell device;
a third partially submersible hull;
and first and second electric motors respectively coupled to said first and third hulls to propel the aquatic vehicle,
wherein said second hull is configured to allow air from outside the second hull to access and interact with the cathodes of said fuel cell device, and said second hull is configured substantially to prevent seawater passed through said plurality of apertures from contacting the cathodes of said fuel cell device, and
wherein said plurality of apertures are configured to allow byproduct produced by reactions between the seawater and corresponding anodes to exit therethrough to outside the second hull.

2. The buoyant autonomous aquatic vehicle according to claim 1, wherein the byproduct is substantially environmentally neutral.

3. The buoyant autonomous aquatic vehicle according to claim 1, wherein the fuel cell device is configured to facilitate extended-use anodes, the extended-use anodes initially being substantially longer than corresponding cathodes, and wherein the extended-use anodes are physically biased by a biasing means for biasing the anodes.

4. The buoyant autonomous aquatic vehicle according to claim 1, wherein said first electric motor is canted from the longitudinal axis of said second hull, and wherein said second electric motor is canted from the longitudinal axis of said third hull.

5. The buoyant autonomous aquatic vehicle according to claim 4, wherein said first electric motor is canted at five degrees inward, toward said second hull, and said second electric motor is canted at five degrees inward, toward said third hull.

6. The buoyant autonomous aquatic vehicle according to claim 1, wherein the autonomous aquatic vehicle is configured to be controlled based on an off-vehicle controller.

7. The buoyant autonomous aquatic vehicle according to claim 1, wherein the autonomous aquatic vehicle is configured to be controlled based on a signal received from outside the vehicle.

8. The buoyant autonomous aquatic vehicle according to claim 1, wherein said fuel cell device is configured to supply power for components of the aquatic vehicle other than said power source.

9. The buoyant autonomous aquatic vehicle according to claim 1, wherein each anode is fixedly attached to a support structure of the corresponding fuel cell device.

10. The buoyant autonomous aquatic vehicle according to claim 1, wherein each anode rests on a support structure of the corresponding fuel cell device.

11. The buoyant autonomous aquatic vehicle according to claim 1, wherein said fuel cell device includes a first fuel cell device portion and a second fuel cell device portion physically separated from said first fuel cell device portion, wherein the first fuel cell device portion has a first support tray having a plurality of apertures formed by ribs to allow passage therethrough of the seawater having entered through a first set of said plurality of apertures of the second hull, the first support tray being sealingly coupled to said second hull to create a water-tight seal therewith and to create a first void therebetween, and
wherein the second fuel cell device portion includes a second support tray having a plurality of apertures formed by ribs to allow passage therethrough of the seawater having entered through a second set of said plurality of apertures of said second hull, the second support tray being sealingly coupled to said second hull to create a water-tight seal therewith and to create a second void therebetween.

12. The buoyant autonomous aquatic vehicle according to claim 1, wherein said second hull is removably attached to said base portion such that said second hull can be removed from said base portion and replaced with another second hull.

13. The buoyant autonomous aquatic vehicle according to claim 1, wherein at least one aperture of the plurality of apertures is configured to facilitate intake of seawater, and at least one aperture of the plurality of apertures is configured to facilitate removal of the byproduct from the second hull therethrough.

14. The buoyant autonomous aquatic vehicle according to claim 13, wherein the at least one aperture of the plurality of apertures configured to facilitate intake of seawater is configured as a scoop.

15. The buoyant autonomous aquatic vehicle according to claim 1, wherein a filter extends over the opening of each of the apertures of the plurality of apertures to prevent unwanted foreign objects from entering the second hull and to allow the byproduct to exit the second hull.

16. The buoyant autonomous aquatic vehicle according to claim 1, wherein each individual fuel cell of said fuel cell device is sealed to hold the seawater, but open at a top portion thereof to permit air to contact the cathode.

17. A method for operating a buoyant aquatic vehicle having a base, a controller to control operations of the vehicle, at least one sensor, a battery, at least one fuel cell apparatus coupled to the battery, a first motor, and a second motor, a first hull that houses the at least one fuel cell apparatus, the method comprising:
providing seawater to anodes of the at least one fuel cell apparatus through a plurality of openings in the first hull;
providing air to cathodes of the at least one fuel cell apparatus through a first air-permeable and water-proof opening of the first hull;
allowing discharge of a byproduct of the anodes of the at least one fuel cell apparatus through at least one of the openings of the plurality of openings; and
supplying to the battery, an output of the at least one fuel cell apparatus.

18. The method according to claim 17, wherein the at least one fuel cell apparatus includes a first support tray to support a plurality of housing apparatuses housing respective anode/cathode pairs of the at least one fuel cell apparatus, the first support tray including a plurality of openings associated with each anode/cathode pair, each opening being formed by rib portions, and said providing seawater to anodes of the at least one fuel cell apparatus further comprises providing the seawater through the plurality of openings of the first support tray.

19. The method according to claim 17, further comprising autonomously controlling the vehicle.

20. The method according to claim 17, wherein said supplying to the battery further comprises one of charging or recharging the battery.

21. The method according to claim 17, wherein said supplying to the battery further comprises maintaining an output level of the battery.

22. A floating aquatic vessel comprising:
means for floating the vessel;
means for moving the vessel;
means for controlling the vessel;
means for sensing a characteristic of the vessel;
means for supplying power to the vessel;
means for supplying fuel to said power supplying means;
means for providing salt water to said fuel supplying means;
means for providing oxygen to said fuel supplying means; and
means for removing a waste product created by said fuel supplying means.

23. The vessel of claim 22, wherein the means for floating the vessel comprises: a first float, a second float, and a third float.

24. The vessel of claim 23, further comprising means for sensing a characteristic of the environment in which the vessel is situated.

25. The vessel of claim 22, wherein the means for moving the vessel comprises: a first motor operatively coupled to a first propulsion apparatus and a second motor operatively coupled to a second propulsion apparatus, said first motor and propulsion apparatus being operatively coupled to said first float, and said second motor and propulsion apparatus being operatively coupled to said third float.

26. The vessel of claim 22, further comprising means for supporting one or more anodes of said fuel supplying means.

27. The vessel of claim 22, wherein the fuel supplying means is provided in said second float.

28. The vessel of claim 22, wherein said means for providing salt water to said fuel supply means includes a scoop.

29. The vessel of claim 22, wherein said means for providing salt water to said fuel supplying means includes means for regulating unwanted objects with respect to said fuel supplying means and for regulating exit of the waste product thereof.

30. The vessel of claim 22, wherein said second float is removably attached to the vessel such that it can be removed within a first predetermined time period.

31. The vessel of claim 30, wherein said second float is removed and replaced with another second float within a second predetermined time period greater than the first predetermined time period.

* * * * *

UNITED STATES PATENT AND TRADEMARK OFFICE
CERTIFICATE OF CORRECTION

PATENT NO.        : 8,814,616 B2
APPLICATION NO.   : 13/406370
DATED             : August 26, 2014
INVENTOR(S)       : Allan Riggs It is certified that error appears in the above-identified patent and that said Letters Patent is hereby corrected as shown below:

On the Title Page:

In item (63), the Related U.S. Application Data information should read as follows:

(63) This application is a continuation-in-part of U.S. Patent 8,123,577 issued on February 28, 2012. This application also claims priority to U.S. Provisional Patent Application No. 61/079,432 filed July 9, 2008. The entire content of each of the foregoing applications is hereby incorporated by reference into the present application.

Signed and Sealed this
Twenty-seventh Day of January, 2015

Michelle K. Lee
*Deputy Director of the United States Patent and Trademark Office*